(12) United States Patent
Protopopov et al.

(10) Patent No.: US 9,817,832 B1
(45) Date of Patent: Nov. 14, 2017

(54) UNIFIED FRAMEWORK FOR POLICY-BASED METADATA-DRIVEN STORAGE SERVICES

(75) Inventors: Boris V. Protopopov, Acton, MA (US); Rossen Dimitrov, Nashua, NH (US); Arkady Kanevsky, Swampscott, MA (US); Patrick Eaton, Arlington, MA (US); Jurgen Leschner, Lexington, MA (US); David Cohen, Hull, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 12/658,635

(22) Filed: Feb. 9, 2010

Related U.S. Application Data

(63) Continuation-in-part of application No. 11/981,604, filed on Oct. 31, 2007, now abandoned.

(51) Int. Cl.
*G06F 17/30* (2006.01)

(52) U.S. Cl.
CPC .. *G06F 17/30082* (2013.01); *G06F 17/30088* (2013.01)

(58) Field of Classification Search
USPC .......................................................... 707/822
See application file for complete search history.

(56) References Cited

U.S. PATENT DOCUMENTS

| | | | |
|---|---|---|---|
| 5,764,953 A * | 6/1998 | Collins et al. ................. | 703/17 |
| 5,819,292 A | 10/1998 | Hitz et al. | |
| 6,085,223 A * | 7/2000 | Carino et al. ................. | 709/203 |
| 6,675,159 B1 * | 1/2004 | Lin et al. ............... | 707/999.003 |
| 7,340,489 B2 | 3/2008 | Vishlitzky et al. | |
| 7,747,742 B2 * | 6/2010 | Liu et al. ....................... | 709/224 |
| 7,937,420 B2 * | 5/2011 | Tabellion et al. ............. | 707/822 |
| 8,527,492 B1 * | 9/2013 | Issa ............................... | 707/707 |
| 2003/0212717 A1 * | 11/2003 | Kashyap ........................ | 707/203 |

(Continued)

OTHER PUBLICATIONS

Z. N. J. Peterson and R. C. Burns, "Ext3cow: The Design, Implementation, and Analysis of Metadata for a Time-Shifting File System," Technical Report HSSL-2003-03, Hopkins Storage Systems Lab, Dept. of Computer Science, John Hopkins University, 2003, pp. 1-14.

(Continued)

*Primary Examiner* — Belix M Ortiz Ditren
(74) *Attorney, Agent, or Firm* — Muirhead and Saturnelli, LLC

(57) ABSTRACT

Providing a service in a storage system includes using a predicate that corresponds to a subset of storage objects in a set of storage objects stored in the storage system. The predicate is used to select or reject the objects to which the service is to be provided. The predicate is applied to the set of storage objects to obtain the subset of storage objects. The service is then invoked for the subset of storage objects selected according to the predicate. A trigger event causes invocation of the service. The trigger event may be periodic and/or may be a storage object lifecycle event, a storage object access related event, an event corresponding to a state change of the storage system, or an event that is external to the storage system. The trigger event may include the predicate being modified.

15 Claims, 43 Drawing Sheets

(56) References Cited

U.S. PATENT DOCUMENTS

2005/0086294 A1\* 4/2005 Kodama ........... G06F 17/30067
                                                  709/203
2007/0022121 A1\* 1/2007 Bahar ................... G06F 9/5011
2008/0320033 A1\* 12/2008 Koistinen et al. ..... 707/999.103
2009/0112789 A1   4/2009 Oliveira et al.
2009/0165078 A1\* 6/2009 Samudrala et al. .............. 726/1

OTHER PUBLICATIONS

D. Hitz et al., "File System Design for an NFS File Server Appliance," NetApp Technical Report, 2005, 13 pp.

\* cited by examiner

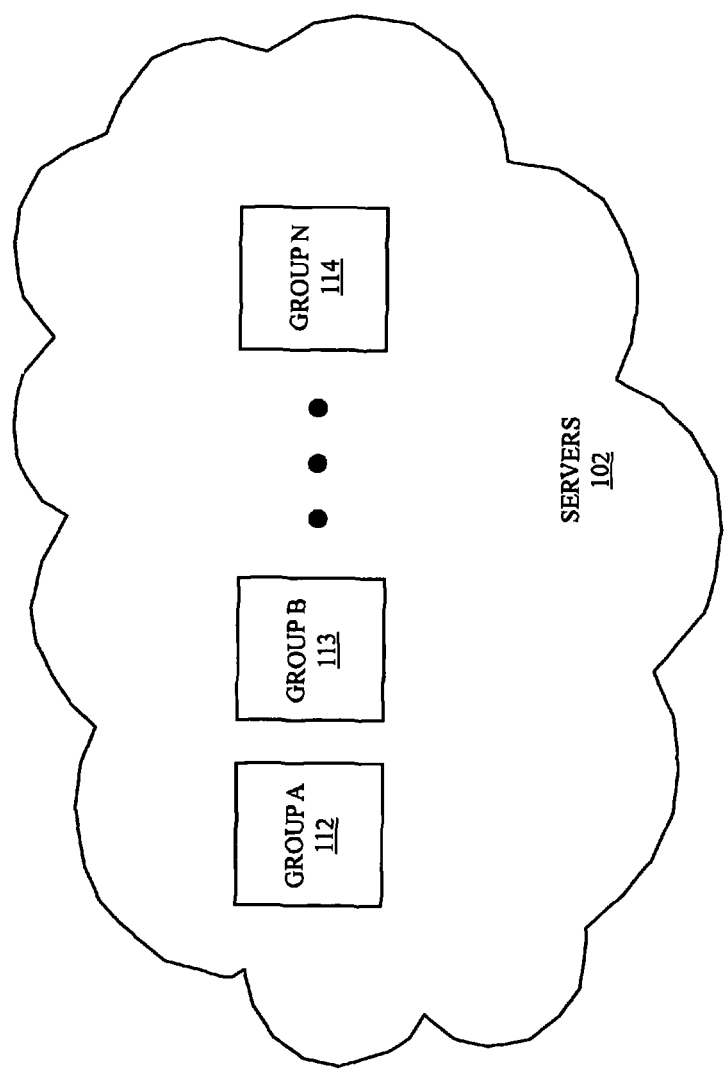

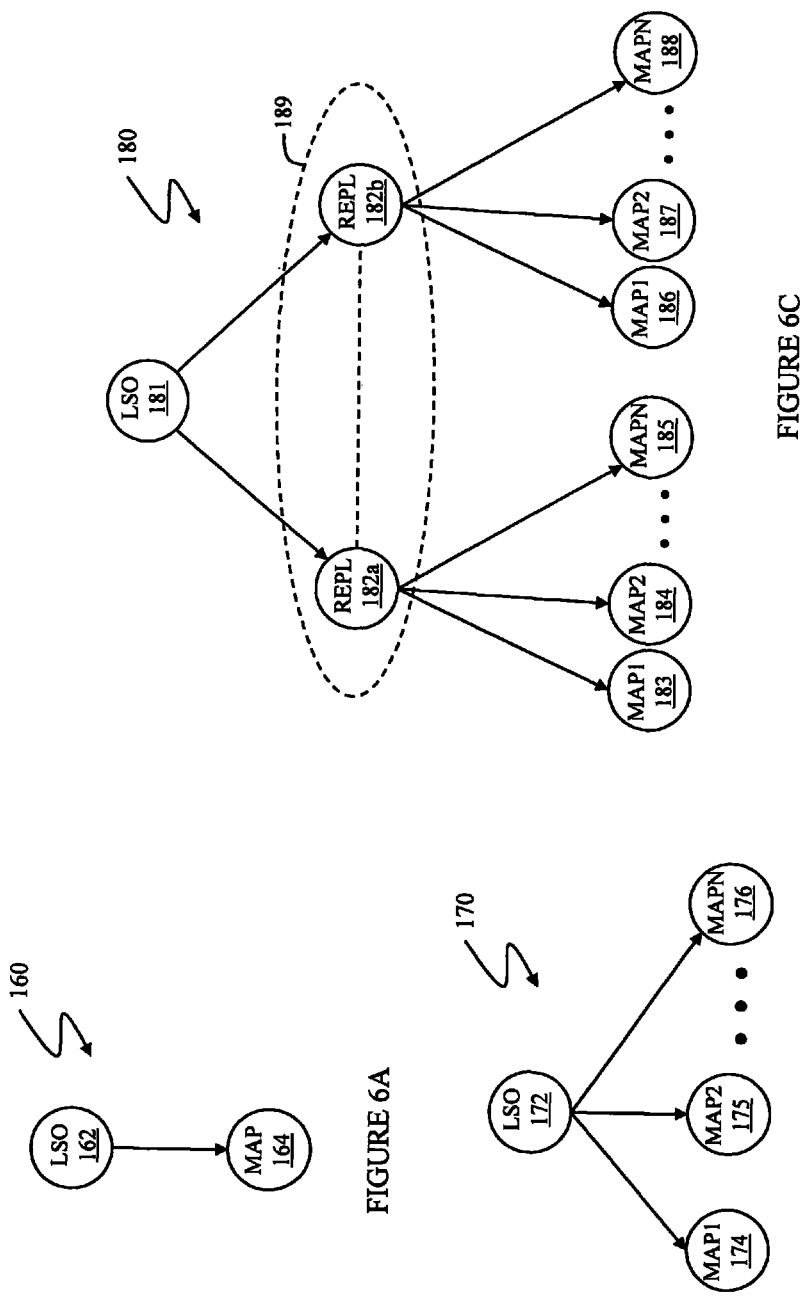

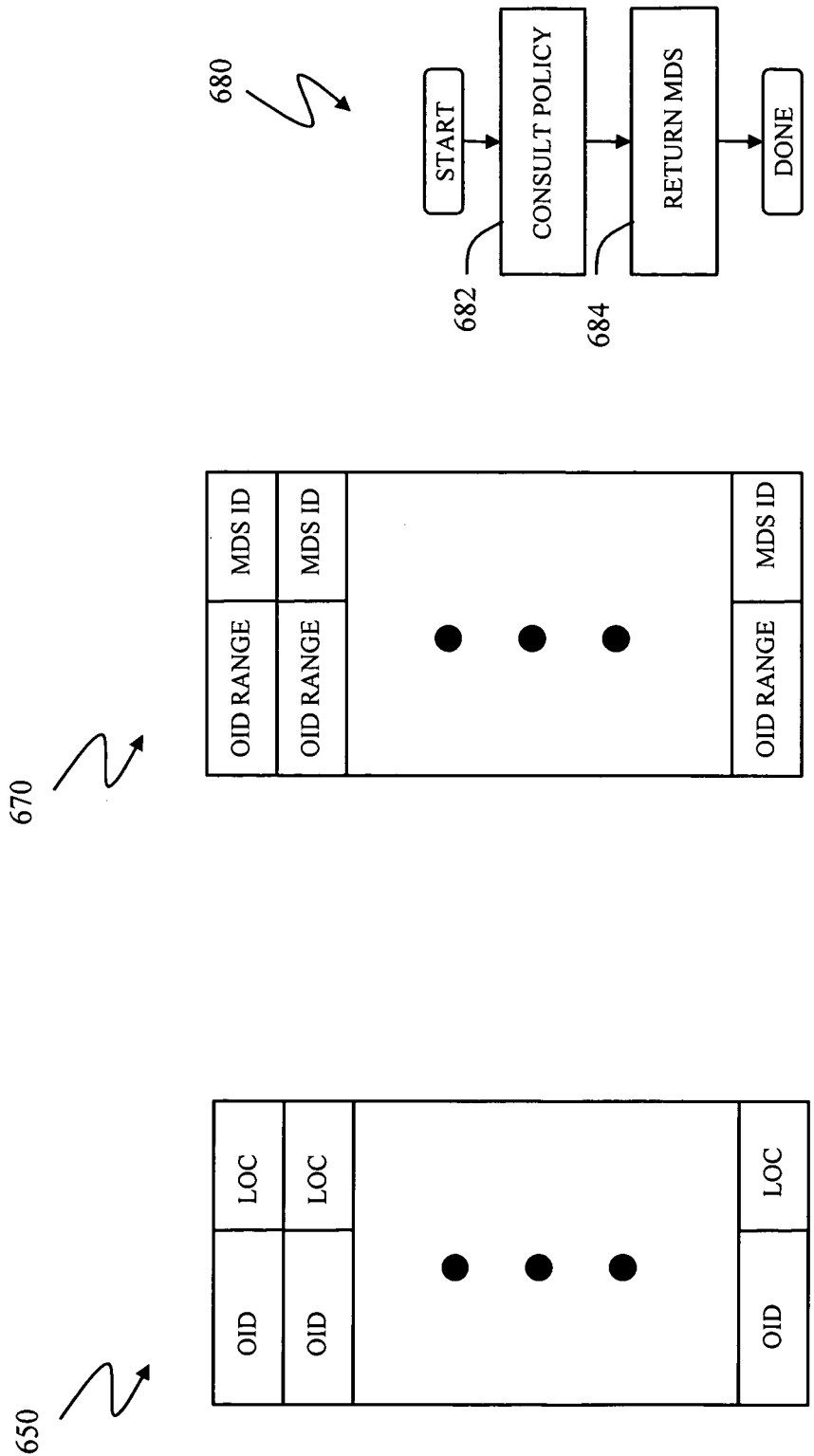

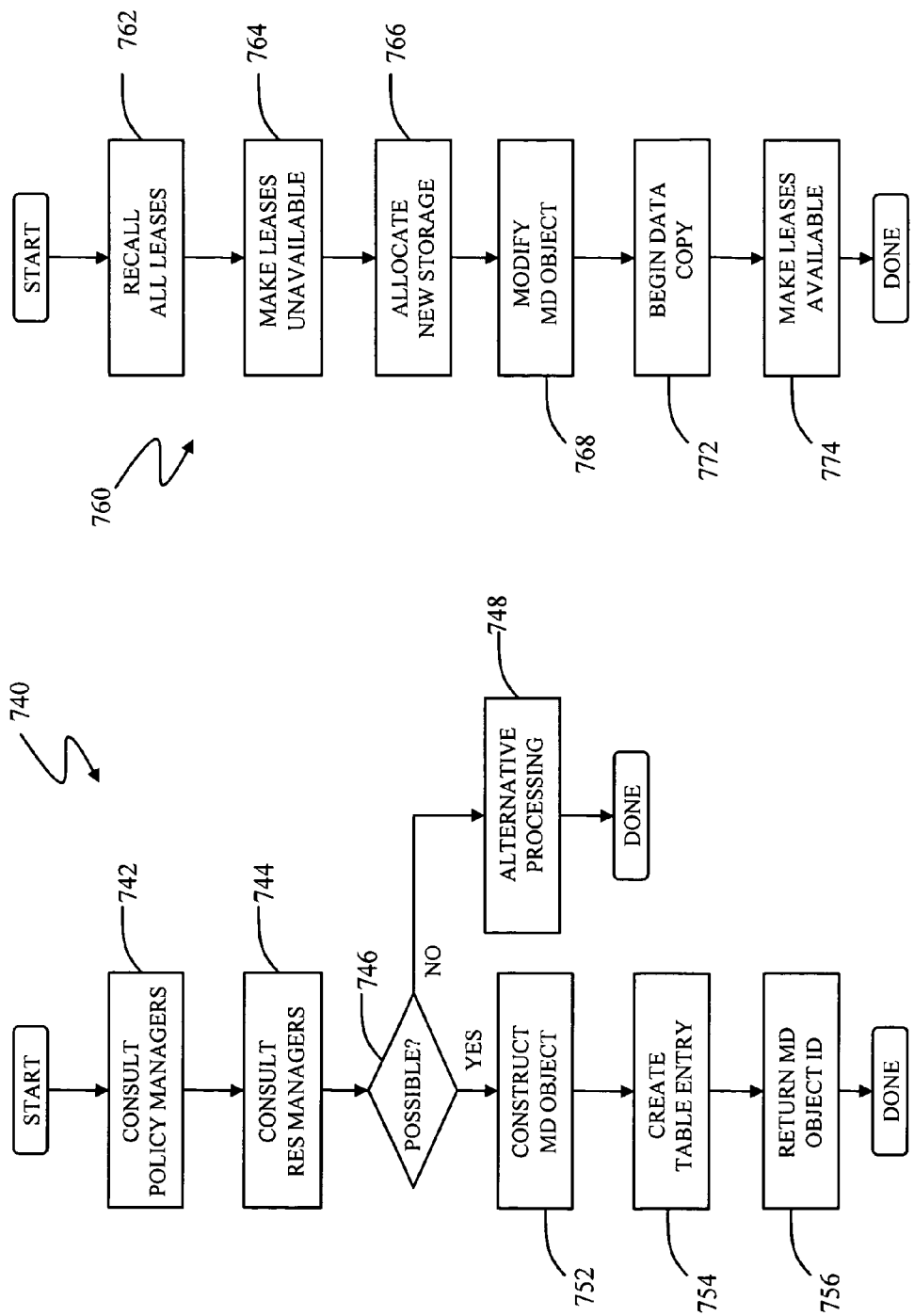

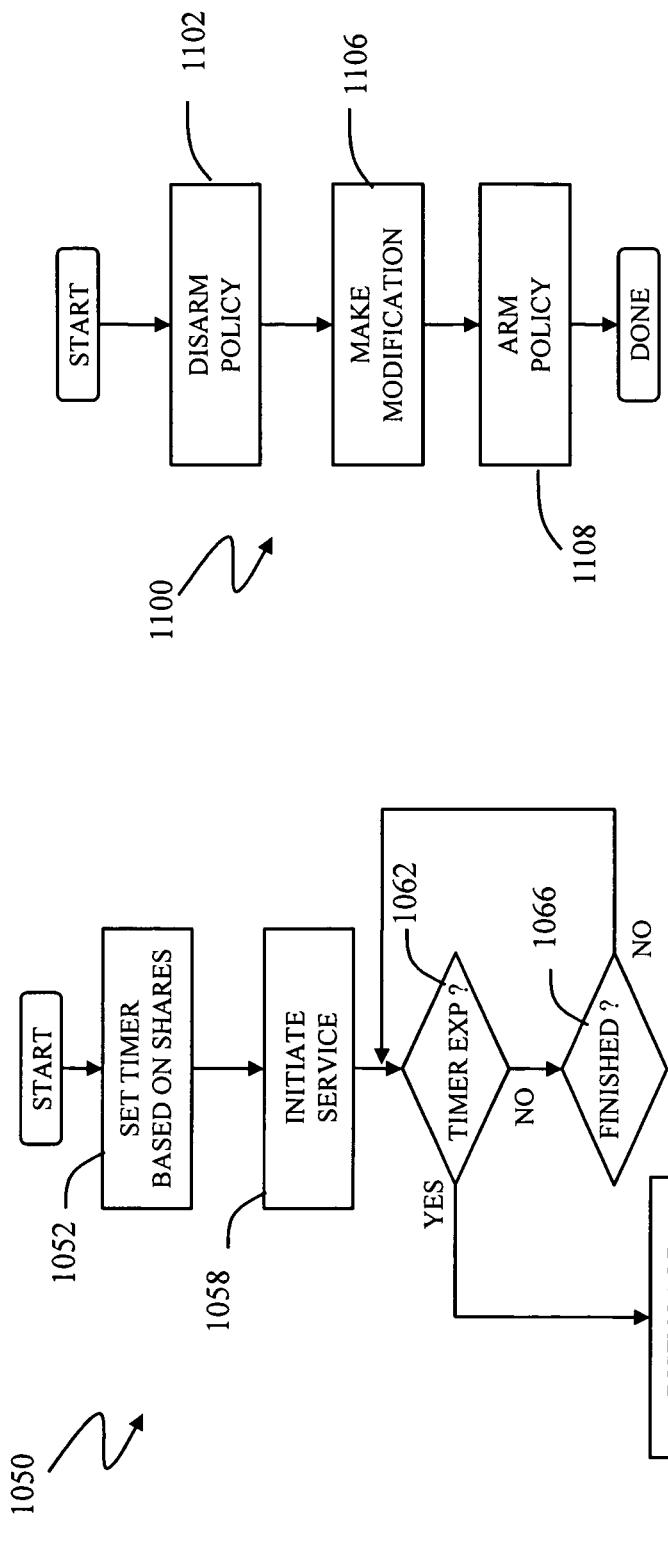

UNIFIED FRAMEWORK FOR POLICY-BASED METADATA-DRIVEN STORAGE SERVICES

CROSS-REFERENCE TO RELATED APPLICATIONS

This application is a continuation-in-part of U.S. patent application Ser. No. 11/981,604 filed on Oct. 31, 2007 now abandoned, which is incorporated by reference herein.

BACKGROUND OF THE INVENTION

1. Technical Field

This application relates to the field of storing data, and more particularly to the field of providing services in connection with data storage.

2. Description of Related Art

Modern storage systems aim to simplify and automate data management functions in storage systems in order to decrease the total costs of ownership. One approach is to incorporate in the storage system a set of data management services that cooperate to assure data integrity, availability, and durability in accordance with the specified Service Level Objectives (SLOs), as well as to provide other value-add services that take on some of the work done previously by standalone data management applications. The data management services range from ones focused on data protection, availability and integrity, e.g. synchronous replication, data immutability, RAID (including software erasure coding techniques), versioning, snapshots, backup, and asynchronous replication for Disaster Recovery (DR), to ones that improve application performance and take on some aspects of application functionality, e.g. asynchronous space reclamation, object encryption, and auto-deletion of objects based on object age.

Many system designers choose to implement the increasing number of such services in software, due to the ever increasing cheap CPU power and memory space/bandwidth in modern COTS clusters. With these design choices, comes the increased storage system software complexity and increased complexity of the management interfaces for controlling these distributed software storage services in a distributed (cluster-based) storage system. The system complexity increases costs, and the interface complexity contributes to errors in service configuration that might result in data loss.

Further, traditional storage services may be static in their functionality and are defined per device, file system, or a namespace sub-tree. This approach may be suboptimal, as the end user and applications does not have an option to adapt services to their needs. Moreover, the device or file system scope is often not directly visible to end user and/or application, and the namespace layout is often dictated by application-level requirements that are orthogonal to storage services concerns. Also, various types of services may offer custom ways to define object the service operates on, to configure/control service implementation mechanisms. Therefore, service management (definition, deployment, modification/re-deployment, retiring) may be hard to unify. In addition, the service management may be tightly coupled with the storage system so that it is difficult to manage services in environments that call for federation of several storage systems.

Accordingly, it is desirable to provide a system that addresses the issues set forth above.

SUMMARY OF THE INVENTION

According to the system described herein providing a service in a storage system includes providing a predicate that corresponds to a subset of storage objects in a set of storage objects stored in the storage system, applying the predicate to the set of storage objects to obtain the subset of storage objects and invoking the service for the subset of storage objects. A trigger event may cause invoking the service. The trigger event may be periodic. A routine may periodically determine if the service is to be invoked. The trigger event may be a storage object lifecycle event, a storage object access related event, an event corresponding to a state change of the storage system, or an event that is external to the storage system. The trigger event may include an event that corresponds to the predicate being modified. The predicate may be provided in a policy definition that includes the trigger event and a service level objective. Applying the predicate may include annotating metadata for the subset of storage objects.

According further to the system described herein, computer software provides a service in a storage system. The software is provided in a computer-readable storage medium and includes executable code that provides a predicate that corresponds to a subset of storage objects in a set of storage objects stored in the storage system, executable code that applies the predicate to the set of storage objects to obtain the subset of storage objects, and executable code that invokes the service for the subset of storage objects. A trigger event may cause the executable code that invokes the service to be executed. The trigger event may be periodic. The computer software may also include executable code that periodically determines if the service is to be invoked. The trigger event may be a storage object lifecycle event, a storage object access related event, an event corresponding to a state change of the storage system, or an event that is external to the storage system. The trigger event may include an event that corresponds to the predicate being modified. The predicate may be provided in a policy definition that includes the trigger event and a service level objective. Applying the predicate may include annotating metadata for the subset of storage objects.

According further to the system described herein, a data storage system includes a plurality of clients that access storage objects and a plurality of interconnected servers, coupled to the clients, at least one of the servers providing a predicate that corresponds to a subset of storage objects in a set of storage objects stored in the storage system, wherein at least one of the clients and the servers applies the predicate to the set of storage objects to obtain the subset of storage objects and invokes the service for the subset of storage objects. A trigger event may cause invoking the service. The predicate may be provided in a policy definition that includes the trigger event and a service level objective. The trigger event may include an event that corresponds to the predicate being modified. Applying the predicate may include annotating metadata for the subset of storage objects.

The system described herein de-couples the management framework from the storage system, and provides a structured method (framework) for defining and managing storage services in a distributed storage system. The service definition includes object sets, service type and service actions, the SLO for the service, and trigger events that initiate execution of the services as they apply to the objects. The service management is unified, and the service management complexities are hidden. The SLOs may define "soft" service objectives that express relative service priorities for the services that consume storage system excess resources/capacity. The proposed metadata-driven object set definition allows one to define object sets solely based on the requirements of a given application. It also enables end user self-service, as the users/applications are empowered to define services that meet their needs. A service definition can be expressed as a service policy that allows one to hide complexities of service mechanisms, and to enable verifiable compliance to business practices. The unified policy-based management framework also simplifies storage service management itself. Another consequence of unifying the management framework and de-coupling it from the storage system is that this enables the framework to manage services across several instances (and perhaps types) of storage systems.

The system described herein extends the set of services to include other known storage services (retention, deletion, de-duplication, encryption, etc.), allows for definition of new yet unknown storage services without storage system software modification or system downtime, extends the set of trigger events to include, in addition the 'create' event, other object-related, user-defined schedule-based, system-related, and external asynchronous events, includes SLOs in service definition to express relative service priorities, and formalizes the service definition in order to enable unified the service management and to reduce complexity and costs. Considered in the broader context, the system described herein is sufficient to enable management and execution of generic asynchronous computations (not necessarily related to storage services) against objects stored in the storage system while utilizing the excess system resource capacity without detracting resources from core storage system activities. The service management framework is simple, unified, and independent of the specifics of a given service. This approach affords the sought simplicity in managing varieties of storage service instances and applying those services on a specified schedule to earlier specified sets of objects.

The service definition brings the object set, the trigger events, the service type and functionality, and service SLO together, expressed as service policy. The service management framework, in cooperation with the storage system, then invokes the service function upon each occurrence of each trigger event, and provides the trigger event and references to one or more objects affected by the trigger event occurrence. The maximum number of object references per service function invocation can be specified in the service policy. The service function will then be invoked repeatedly by the service for all the objects affected by the event until the service iterates over the complete set of affected objects. In some instances, reference to more than one object may be passed to a service to invoke the service function for multiple objects at once.

BRIEF DESCRIPTION OF DRAWINGS

FIG. 1B is a diagram illustrating a plurality of servers according to an embodiment of the system described herein.

FIG. 6A is a diagram illustrating an example of a layout storage object tree for a file according to an embodiment of the system described herein.

FIG. 6B is a diagram illustrating an example of a layout storage object tree with multiple maps for a file according to an embodiment of the system described herein.

FIG. 6C is a diagram illustrating another example of a layout storage object tree with multiple maps and replication nodes for a file according to an embodiment of the system described herein.

FIG. 36 is a table illustrating data maintained by a metadata server to correlate object identifiers and data storage locations according to an embodiment of the system described herein.

FIG. 37 illustrates a table at a metadata location server that correlates object identifier ranges and metadata servers according to an embodiment of the system described herein.

FIG. 38 is a flow chart illustrating processing performed by a metadata location server in connection with returning a particular metadata server according to an embodiment of the system described herein.

FIG. 40 is a flow chart illustrating processing performed by a metadata server in connection with creating a file according to an embodiment of the system described herein.

FIG. 41 is a flow chart illustrating processing performed by a metadata server in connection with responding to a failed data write operation according to an embodiment of the system described herein.

FIG. 50 is a flow chart illustrating processing performed in connection with invoking and disengaging a service according to an embodiment of the system described herein.

FIG. 51 is a flow chart illustrating processing performed in connection with modifying a policy according to an embodiment of the system described herein.

DETAILED DESCRIPTION OF VARIOUS EMBODIMENTS

Figure 1A:
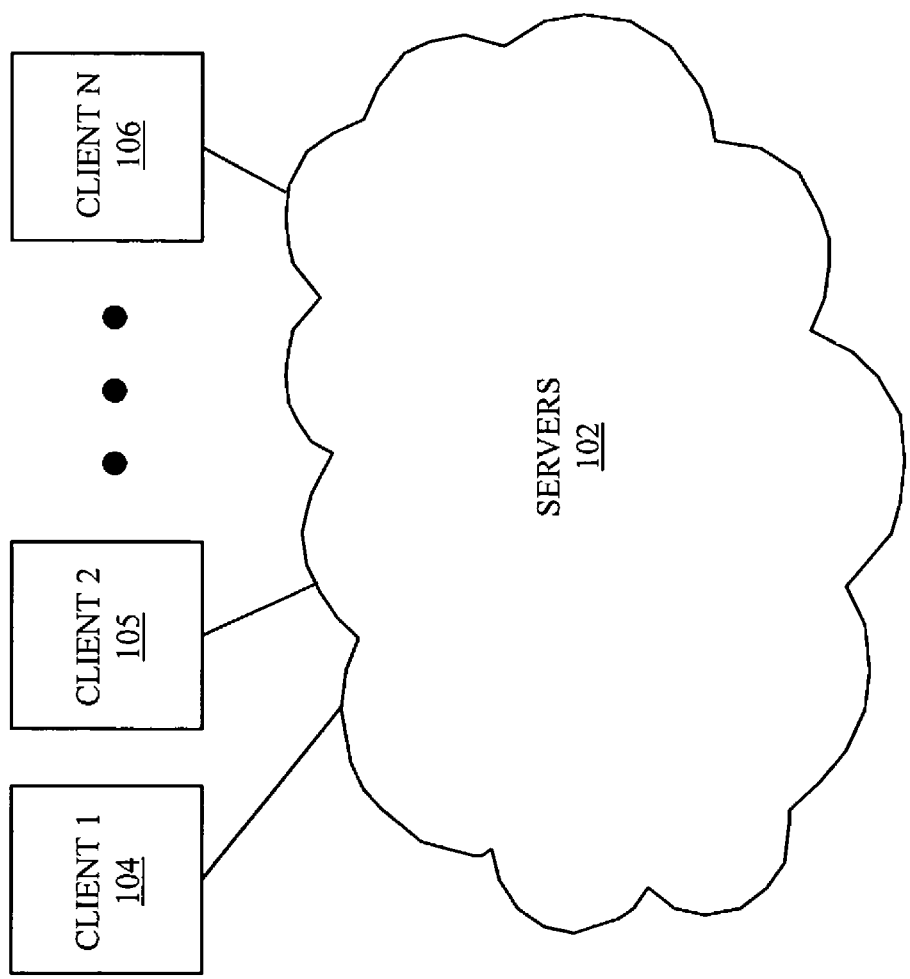
FIG. 1A is a diagram illustrating servers and clients according to an embodiment of the system described herein.

Referring to FIG. 1A, a diagram illustrates servers 102 coupled to a plurality of clients 104-106. Each of the clients 104-106 represents one or more processing devices that receives file services from the servers 102. Each of the clients 104-106 may or may not be independent of other ones of the clients 104-106. One or more of the clients 104-106 may be a multiprocessing/multiuser system and possibly have multiple independent users. The clients 104-106 represent any number of clients.

The file services provided by the servers 102 may include data storage and retrieval as well as related operations, such as data mirroring, cloning, etc. The servers 102 may be implemented using a plurality of services (and/or interconnected file servers including SAN components) that are provided by interconnected processing and/or storage devices. In an embodiment herein, each of the clients 104-106 may be coupled to the servers 102 using the Web, possibly in conjunction with local TCP/IP connections. However, it is possible for one or more of the clients 104-106 to be coupled to the servers 102 using any other appropriate communication mechanism and/or combinations thereof to provide the functionality described herein.

Referring to FIG. 1B, the servers 102 are shown in more detail as including a plurality of server groups 112-114, where each of the groups 112-114 may include one or more individual servers that may be managed together as a single data storage cloud. The terms "cloud", "data storage cloud", etc. should be generally understood herein as an integrated group of servers. Different ones of the groups 112-114 (clouds) may be managed separately from each other. As discussed in more detail elsewhere herein, the groups may be interconnected to transfer information using any appropriate means, including being interconnected through one or more of the clients 104-108, being interconnected through the Internet, a SAN, a private LAN or WAN, directly connected, and/or using any other appropriate interconnection to provide for information transfer as discussed elsewhere herein. For the discussion herein, one of the groups 112-114 may be a local cloud that is performing operations discussed herein while another one of the groups may be an external cloud that contains data accessed by the local cloud.

Figure 2B:
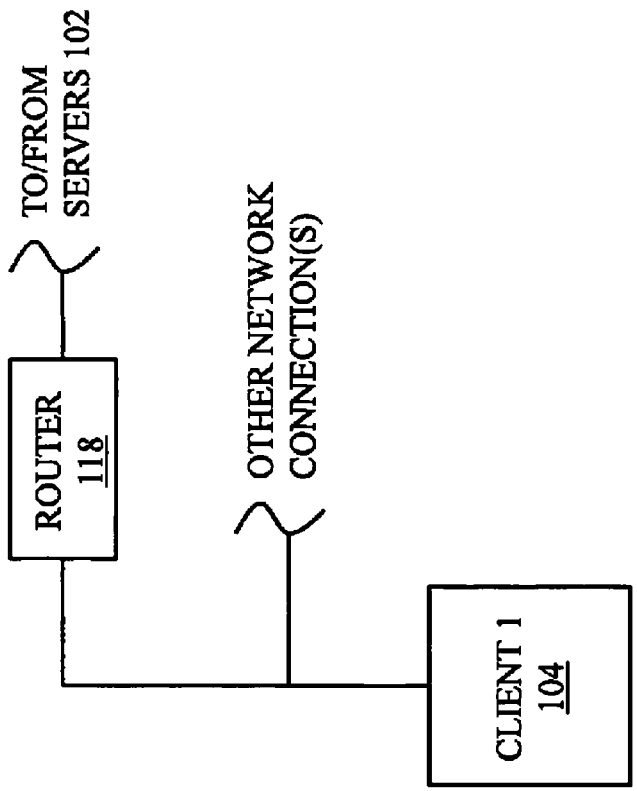
FIGS. 2A, 2B, 2C, and 2D are diagrams illustrating a client coupled to servers and to other network(s) according to embodiments of the system described herein.
Figure 2A:
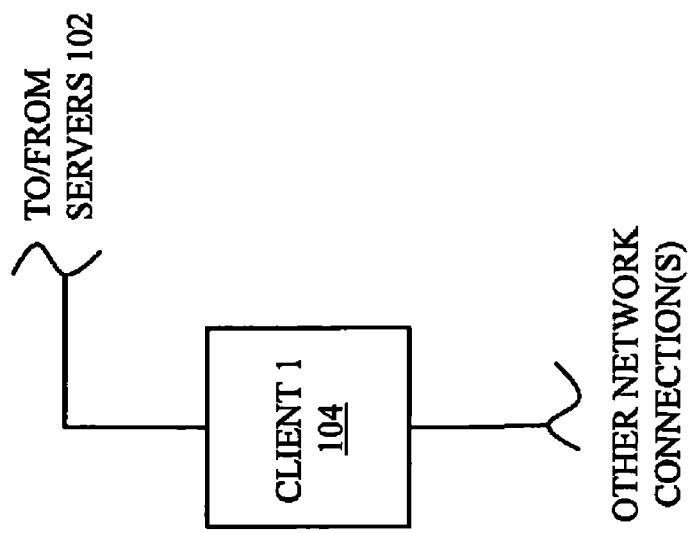

Referring to FIG. 2A, the client 104 is shown as being coupled to the servers 102 and to one or more other network(s). The other network(s) may include a local area network (LAN). Thus, the client 104 may be a gateway between the servers 102 and a LAN to which one or more other devices (not shown) may also be coupled. The client 104 may act as a local file server to the one or more other devices coupled to the LAN by providing data from the servers 102 to the one or more other devices. Of course, it is possible for one or more other clients to simultaneous act as gateways to the same or different other network(s). Generally, for the discussion herein, reference to a particular one of the clients 104-106 may be understood to include reference to any or all of the clients 104-106 coupled to the servers 102 unless otherwise indicated.

Referring to FIG. 2B, a diagram shows the client 104 being coupled to the servers 102 and one or more other network(s) (e.g., a LAN) in a configuration that is different from that shown in FIG. 2A. In the configuration of FIG. 2B, a router 118 is coupled between the servers 102 and the client 104. The router 118 may be any conventional router that may be accessed by the client 104. In the configuration of FIG. 2B, the client 104 uses only a single connection point to both the servers 102 and to the other network(s). In the configuration of FIG. 2B, the client 104 may act as local file server and gateway between the servers 102 and one or more other devices (not shown) coupled to the other network (s).

Figure 2D:
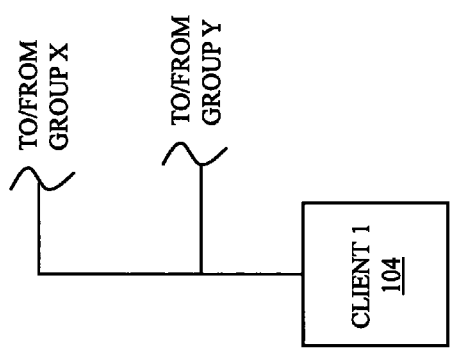
Figure 2C:
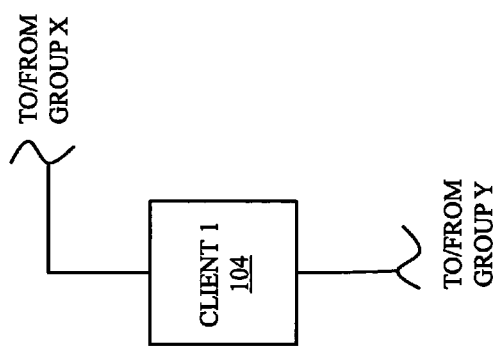

Referring to FIG. 2C, the client 104 as shown as being used to interconnect two server groups: Group X and Group Y. The connections to Group X and/or Group Y may or may not include a router, such as the router 118 shown in FIG. 2B and may or may not be direct or through other network configurations, as described elsewhere herein. In the embodiment of FIG. 2C, the client 104 may communicate with either the Group X servers and/or the Group Y servers, but communication from the Group X servers to the Group Y servers is through the client 104. One of Group X or Group Y may be a local cloud while the other is a foreign cloud.

Referring to FIG. 2D, the client 104 as shown as being connected to two server groups: Group X and Group Y. The connections to Group X and/or Group Y may or may not include a router, such as the router 118 shown in FIG. 2B and may or may not be direct or through other network configurations, as described elsewhere herein. In the embodiment of FIG. 2D, the client 104 may communicate with the Group X servers and/or the Group Y servers. However, unlike the embodiment of FIG. 2C, the Group X servers may communication with the Group Y servers without having to go through the client 104. Just as with FIG. 2C, one of Group X or Group Y may be a local cloud while the other is a foreign cloud.

Of course, any other appropriate connection configurations may be used by any of the client 104-106 coupled to the servers 102, the groups 112-114, and/or to any other network(s) and/or devices. In some embodiments, the clients 104-106 may access the metadata provided on one of the groups 112-114 and then may use the metadata to access data stored on another one of the groups 112-114. It is also possible for one of the groups 112-114 to access data from another one of the groups 112-114 by routing data requests through one of the clients 104-106. In such a case, the requests/data may pass through the client without any interpretation by the client.

Figure 3:
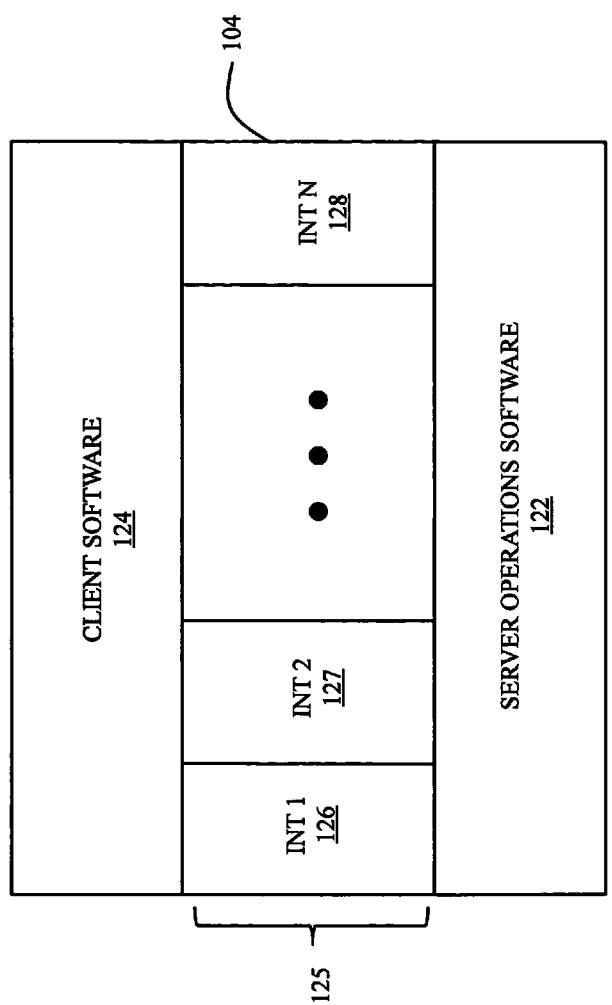
FIG. 3 is a diagram illustrating a client having server operations software, client software, and a plurality of interfaces therebetween according to an embodiment of the system described herein.

Referring to FIG. 3, the client 104 is shown in more detail having server operations software 122, client software 124, and an interface layer 125 that includes a plurality of interfaces 126-128 between the server operations software 122 and the client software 124. The server operations software 122 facilitates the exchange of information/data between the client 104 and the servers 102 to provide the functionality described herein. In some cases, the server operations software 122 may contain proxy servers (proxy services) for accessing external clouds. The server operations software 122 is described in more detail elsewhere herein.

The client software 124 represents any software that may be run on the client 104, including application software, operating system software, Web server software, etc., that is not part of the server operations software 122 or the interface layer 125. As described in more detail elsewhere herein, it is possible to have the client software 124 interact with the servers 102 through different ones of the interfaces 126-128 at the same time.

The file services described herein may be implemented by the servers 102 using a set of file objects (storage objects) where a data that is accessed by the client software includes a metadata file object which points to one or more data file objects that contain the data for the file. Accessing the file would involve first accessing the metadata file object to locate the corresponding data storage objects for the file. Doing this is described in more detail elsewhere herein. Note, however, that any appropriate storage object mechanism may be used for the system described herein. Also, in some embodiments, a metadata storage object may be provided on one of the groups of servers 112-114 (local cloud) while a corresponding one or more data storage objects are provided on another one of the groups of servers 112-114 (external cloud).

Figure 4:
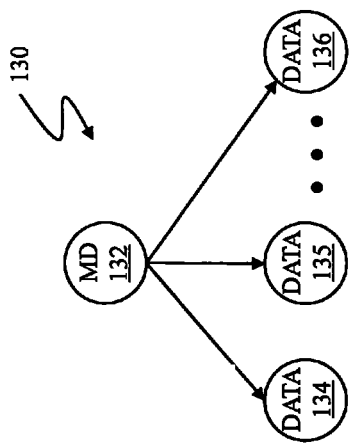
FIG. 4 is a diagram illustrating a file having a metadata file object and a plurality of data file objects according to an embodiment of the system described herein.

Referring to FIG. 4, a file 130 is shown as including a metadata file object 132 and a plurality of data file objects. The metadata file object 132 contains information that points to each of the data file objects 134-136. Accessing the file includes first accessing the metadata file object 132 and then using information therein to locate the appropriate one or more of the corresponding data file objects 134-136. As discussed elsewhere herein, in some cases, the metadata file object 132 may be provided on a different one of the groups of servers 112-114 (local cloud) than one or more of the corresponding data file objects 134-136 (external cloud).

Figure 5:
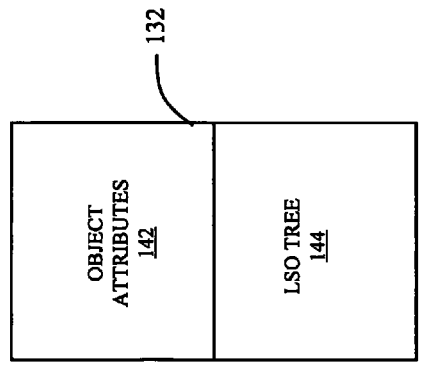
FIG. 5 is a diagram illustrating a metadata file object for a file according to an embodiment of the system described herein.

Referring to FIG. 5, the metadata file object 132 is shown in more detail as including an object attributes section 142 and a Layout Storage Object (LSO) tree section 144. The object attributes section contains conventional file-type attributes such as owner id, group id, access control list, last modification time, last access time, last change time, creation time, file size, and link count. Many of the attributes are self-explanatory. The last modification time corresponds to the last time that the data for the data objects 134-136 had been modified while the last change time corresponds to when the object metadata had last been changed. The link count indicates the number of other objects that reference a particular file (e.g., aliases that point to the same file). In an embodiment herein, a file and its related objects are deleted when the link count is decremented to zero.

The LSO tree section 144 includes a data structure that includes one or more maps for mapping the logical space of the file to particular data file objects. The LSO tree section 144 may also indicate any mirrors for the data and whether the mirrors are synchronous or asynchronous. LSO trees and mirrors are described in more detail elsewhere herein.

Referring to FIG. 6A, a simple LSO tree 160 is shown as including an LSO root node 162 and a single map 164. The LSO root node 162 is used to identify the LSO tree 160 and includes links to one or more map(s) used in connection with the file corresponding to the LSO tree 160. The map 164 maps logical locations within the file to actual data storage location. A process that accesses logical storage space of a file represented by the LSO tree 160 first uses the LSO root node 162 to find the map 164 and then uses the map 164 to translate logical addresses within the file to an actual data storage locations. As discussed in more detail elsewhere herein, the map 164 may point to physical storage space in the same one of the server groups 112-114 that contains the physical storage space for the LSO tree 160. Alternatively, the map 164 may point to objects in storage space in a different one of the server groups 112-114 than the one of the server groups 112-114 that contains the physical storage space for the LSO tree 160.

Referring to FIG. 6B, an LSO tree 170 is shown as including an LSO root node 172 and a plurality of maps 174-176. Each of the maps 174-176 may represent a different range of logical offsets within the file corresponding to the LSO tree 170. For example, the map 174 may correspond to a first range of logical offsets in the file. The map 174 may map logical locations in the first range to a first actual storage device. The map 175 may correspond to a second range of logical offsets in the file, different than the first range, which may be mapped to a different actual storage device or may be mapped to the same actual storage device as the map 174. Similarly, the map 176 may correspond to a third range of logical offsets in the file, different than the first range and the second range, which may be mapped to a different actual storage device or may be mapped to the same actual storage device as the map 174 and/or the map 175. Note that some of the maps 174-176 may or may not point to physical storage space in the same one of the server groups 112-114 that contains the physical storage space for the LSO tree 170 while other ones of the maps 174-176 may or may not point to objects in physical storage space in a different one of the server groups 112-114 than the one of the server groups 112-114 that contains the physical storage space for the LSO tree 170.

Referring to FIG. 6C, an LSO tree 180 is shown as including an LSO root node 181 and a pair of replication nodes 182a, 182b, which indicate that the underlying data is to be mirrored (replicated) and which indicate whether the mirror is synchronous or asynchronous. Synchronous and asynchronous mirrors are discussed in more detail elsewhere herein. The node 182a has a plurality of children maps 183-185 associated therewith while the node 182b has a plurality of children maps 186-188 associated therewith. The replication nodes 182a, 182b indicate that the data corresponding to the maps 183-185 is a mirror of data corresponding to the maps 186-188. In some embodiments, the nodes 182a, 182b may be implemented using a single node 189 to indicate replication.

A process accessing a file having the LSO tree 180 would traverse the tree 180 and determine that data is mirrored. As discussed in more detail elsewhere herein, depending upon the type of mirroring, the process accessing the LSO tree 180 would either write the data to the children of both of the nodes 182a, 182b or would provide a message to another process/server (e.g., the servers 102) that would perform the asynchronous mirroring. Mirroring is discussed in more detail elsewhere herein.

Note that, just as with the maps 164, 174-176, discussed above, some of the maps 183-189 may or may not point to physical storage space in the same one of the server groups 112-114 that contains the physical storage space for the LSO tree 180 while other ones of the maps 183-189 may or may not point to objects in physical storage space in a different one of the server groups 112-114 than the one of the server groups 112-114 that contains the physical storage space for the LSO tree 180. Note also, however, that it may be advantageous in some instances to have the maps 183-185 for the replication node 182a point to objects on one of the server groups 112-114 while the maps 186-189 for the other replication node 182b point to physical objects on another one of the server groups 112-114.

In some embodiments, it may be beneficial to provide physical storage for all LSO trees on a first one of the server groups 112-114 (e.g. a local cloud) while providing physical storage for some or all of the corresponding data on a second, different, one of the server groups 112-114 (e.g., an external cloud). The first one of the server groups 112-114 may be a private cloud accessed by a particular organization while the second one of the server groups 112-114 is a public cloud that is accessed by many organizations, such as the Amazon S3 public cloud. Alternatively, the first one of the server groups 112-114 may be a public cloud while the second one of the server groups 112-114 is a private cloud or both the first and the second one of the server groups 112-114 could be public clouds or could be private clouds. The LSO trees may be provided on an external cloud. In addition, the data may be provided on separate clouds so that a first portion is provided on one cloud and a second (or subsequent) portion is provided on a second (or subsequent) cloud where each of the clouds that contain data are separate from each other.

As described herein, the federation of a plurality of clouds allows the data to appear to a user (client) as if the data were provided on a single cloud. Note that since the LSO trees provide meaningful structure to the data, then maintaining the LSO trees in a private cloud provides some security even though some or all of the corresponding data may be provided in a public cloud. Note also that the physical storage space required for the LSO trees is expected to be much less than that required for the corresponding data. Accordingly, in instances where the LSO trees are provided in a private cloud while the corresponding data is provided in a public cloud, the physical storage space that needs to be maintained for the private cloud is much less than it would be otherwise while sensitive metadata may be maintained securely in the private cloud.

Figure 7D:
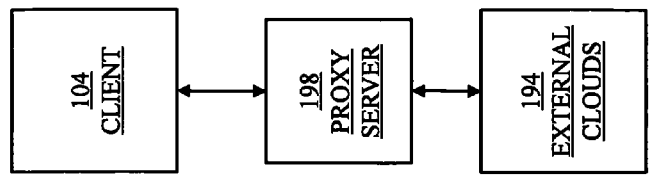
FIG. 7D is a diagram illustrating a client using a proxy server to access physical objects in an external cloud according to an embodiment of the system described herein.
Figure 7C:
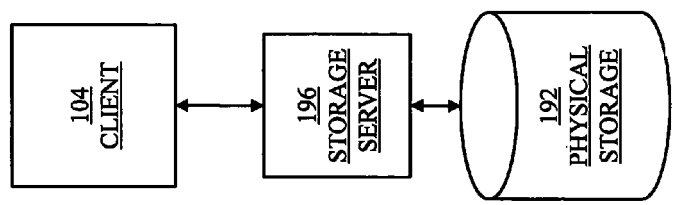
FIG. 7C is a diagram illustrating a client using a storage server to access a physical storage location in a local cloud according to an embodiment of the system described herein.
Figure 7A:
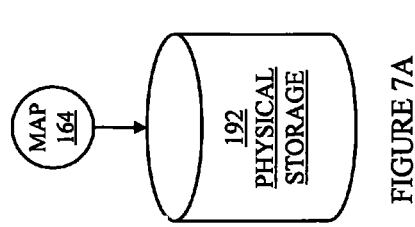
FIG. 7A is a diagram illustrating mapping to a physical storage location in a local cloud according to an embodiment of the system described herein.

Referring to FIG. 7A, the map 164 (described above in connection with FIG. 6A) is shown as pointing to a physical storage 192 that is provided on a local cloud. The map 164 may represent any of the other ones of the maps described herein and/or may represent any appropriate mapping mechanism for accessing physical storage on a local cloud. For example, the map 164 may contain an identifier for the physical storage 164 in addition to some type of offset and/or additional identifier to indicate a particular portion of the physical storage 192. There may also be a length (or similar) value indicating an amount of data that corresponds to the map 164. As discussed elsewhere herein, security for local cloud access may be handled by another mechanism, and thus it is not necessary for the map 164 to contain security information, although in some embodiments it may be useful to have security information be included with the map 164.

Figure 7B:
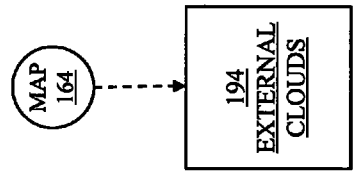
FIG. 7B is a diagram illustrating mapping to physical objects in an external cloud according to an embodiment of the system described herein.

Referring to FIG. 7B, the map 164 is shown as pointing to physical storage (objects) in one or more external clouds. In such a case, the map 164 may contain or point to information used to access the objects in the external cloud 194, which of course depends upon the particular access mechanism employed by the external cloud. For example, in some systems an account id and a password could be used. There may also be additional information, such as file/object identifier(s), subaccount information, etc. In an embodiment herein, once a connection to data in the external cloud 194 has been established, subsequent communications with the external cloud 194 may include at least some of the information (e.g., an account id) along with a shared secret. Other possible authentication/security techniques may be used, including RSA ID tokens, cryptographic certificates, etc.

In an embodiment herein, the map 164, as well as any other maps that are used, point to a single object provided on the external cloud 194 which corresponds to a single file in the file system of the external cloud 194. In other embodiments, it is possible to provide multiple objects in a single file in the file system of the external cloud 194. It is even possible to provide objects from different sources (e.g., different users, accounts, private clouds, etc.) into a single file. However, in that case, it may be necessary to handle any security issues that are created by this.

Referring to FIG. 7C, the client 104 is shown using a storage server 196 to access the physical storage 192 containing data from the local cloud, as discussed elsewhere herein. The storage server 196 provides data to the client 104 and may represent any combination of software and hardware (including at least a portion of the server operations software 122 that is part of the client 104, discussed above). The client 104 may represent any client or other device/mechanism that accesses the servers 102 to exchange data therewith. The storage server 196 may provide a specific interface to the client 104 and to software used by the client 104.

Referring to FIG. 7D, the client 104 is shown using a proxy server 198 to access the external clouds 194. The proxy server 198 provides data to the client 104 and may represent any combination of software and hardware (including at least a portion of the server operations software 122 that is part of the client 104, discussed above). The proxy server 198 may interact with the client 104 and to software used by the client 104 in a manner that is substantially similar (and possibly identical) to the interaction between the client 104 and the storage server 196. The proxy server 198 may exchange information with the external cloud 194 using a protocol based on principles of REST (Representational State Transfer) protocol, which are known. The proxy server 198 may be integrated with one or more other ones of the servers 102.

In some embodiments, it may be possible to have data provided in a local cloud and for that data to point to additional data in an external cloud.

In an embodiment herein, the map 164 includes a flag (or similar) to indicate whether the data pointed to by the map 164 is provided on a local cloud or an external cloud. In instances where the data is provided on a local cloud, the storage server 196 (or similar) is used. In instances where the flag indicates that the data is provided in an external cloud, the proxy server 198 is used. Once one of the servers 196, 198 is selected, operation of the client 104 and related components is identical, or nearly so. Accordingly, the system provided herein may provide a federation of clouds that is transparent to a client accessing the servers 102.

Figure 8:
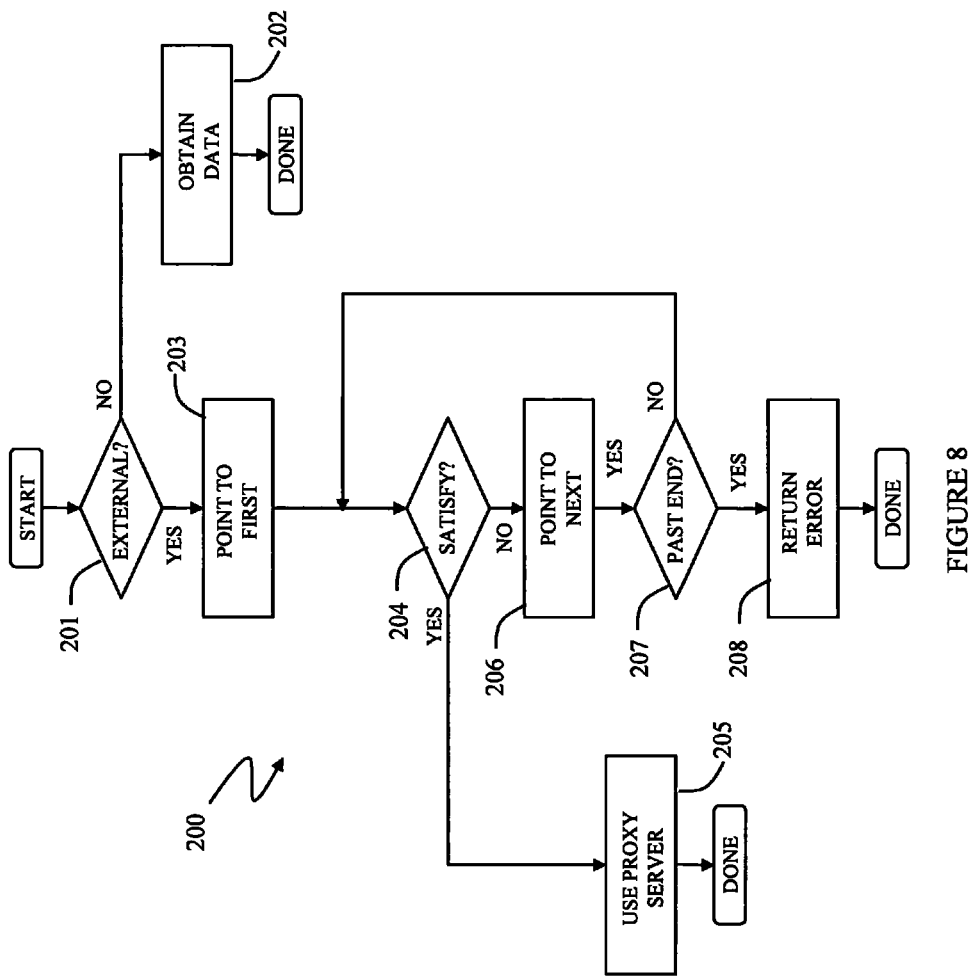
FIG. 8 is a flow chart illustrating steps performed in connection with obtaining data from a physical storage location according to an embodiment of the system described herein.

Referring to FIG. 8, a flow chart 200 illustrates in detail steps performed in connection with obtaining data from a physical storage location indicated by the map 164. Processing begins at a first step where it is determined if the data is part of a local cloud or stored in an external cloud, as discussed elsewhere herein. If the data is not external, then control transfers from the test step 201 to a step 202 where the storage server 196 is used to access the data according to the information provided in the map 164. Following the step 202, processing is complete.

If it is determined at the test step 201 that the data is located in an external cloud, then control transfers from the step 201 to a step 203 where an element used to iterate through the available proxy servers is set to point to the first one of the proxy servers. In an embodiment herein, each of the proxy servers may be provided with different capabilities so that, for example, one set of proxy servers can access external cloud X but not external cloud Y, another set of proxy servers can access external cloud Y but not external cloud X, yet another set can access both external clouds, etc. Furthermore, different proxy servers may have different capabilities such as speed, efficiency, cost, etc. that could make one proxy server more desirable than another in certain situations. Accordingly, there may be certain criteria imposed that render only some of the proxy servers suitable for accessing the external data. For example, is the external data is located on cloud X, then only proxy servers capable of accessing cloud X are suitable and satisfy the criteria. Note also that it is possible for a user/administrator to indicate that certain proxy servers are suitable/acceptable for certain types of accesses.

Following the step 203 is a test step 204 where it is determined if the proxy server pointed to by the element used to iterate through proxy servers satisfies whatever criteria that is imposed. If so, then control passes from the test step 204 to a test step 205 where the proxy server is used to access the data. As discussed elsewhere herein, the proxy server may provide an account id and password and/or an account id and shared secret in connection with accessing the data. In an embodiment herein, the external cloud does not rely on any security characteristics imposed by the cloud/client from which the request is generated. Thus, for example, an administrative user for one cloud may still need to provide the same security information as any other user when accessing an external cloud. Note also that the security information needed to access the external cloud may be stored with the map 164, pointed to by the map 164, or stored in some other location. Following the step 205, processing is complete.

If it is determined at the test step 204 that the proxy server indicated by the iteration pointer does not satisfy the criteria, then control transfers from the test step 204 to a step 206 where the iteration pointer is incremented to point to the next proxy server. Following the step 206 is a test step 207 where it is determined if the pointer points past the end of the proxy servers (i.e., all of the available proxy servers have been examined to determine if any of them meet the specified criteria). If all of the proxy servers have not been examined, then control passes from the test step 207 back to the step 204 for another iteration. Otherwise, control passes from the step 207 to a step 208 where error processing is performed. The error processing performed at the step 208 can be any appropriate processing, including returning an indicator that the data is not available. Note that there could be many reason why the data is not available, including the criteria being too restrictive (e.g., requiring a transfer speed that is not available), one or more of the proxy servers being off-line, etc. Following the step 208, processing is complete.

For the system described herein, file objects are accessed by one of the clients 104-106 by first requesting, and obtaining, a lease from the servers 102. The lease corresponds to the file objects for the particular file being accessed and to the type of access. A lease may be for reading, writing, and/or for some other operation (e.g., changing file attributes). In an embodiment herein, for objects corresponding to any particular file, the servers 102 may issue only one write lease at a time to any of the clients 104-106 but may issue multiple read leases simultaneously and may issue read lease(s) at the same time as issuing a write lease. However, in some embodiments it may be possible to obtain a lease for a specified logical range of a file for operations only on that range. Thus, for example, it may be possible for a first client to obtain lease for writing to a first logical range of a file while a second client may, independently, obtain a lease for writing to a second and separate logical range of the same file. The two write leases for different logical ranges may overlap in time without violating the general rule that the system never issues overlapping write leases for the same data.

The lease provided to the clients 104-106 from the servers 102 includes security information (security token) that allows the client appropriate access to the data. The security token may expire after a certain amount of time. In an embodiment herein, a client accesses data by providing an appropriate security token for the data as well as client users/ownership information. Thus, for example, a user wishing to access data would first obtain a lease and then would provide the access request to the servers 102 along with the security token and information identifying the owner (client) accessing the data. The servers 102 would then determine whether the access requested by the client was permissible. After the lease expires (the security token expires), the user requests the lease again. Data security may be implemented using conventional data security mechanisms.

After obtaining a lease for accessing a file, a client may then cache the corresponding metadata, including the LSO tree, into local storage of the client. The client may then use and manipulate the local cached version of the metadata and may use the metadata to obtain access to the data. As described in more detail elsewhere herein, a client does not directly modify metadata stored by the servers 102 but, instead, sends update messages to the servers 102 to signal that metadata for a file may need to be modified by the servers 102.

Figure 9:
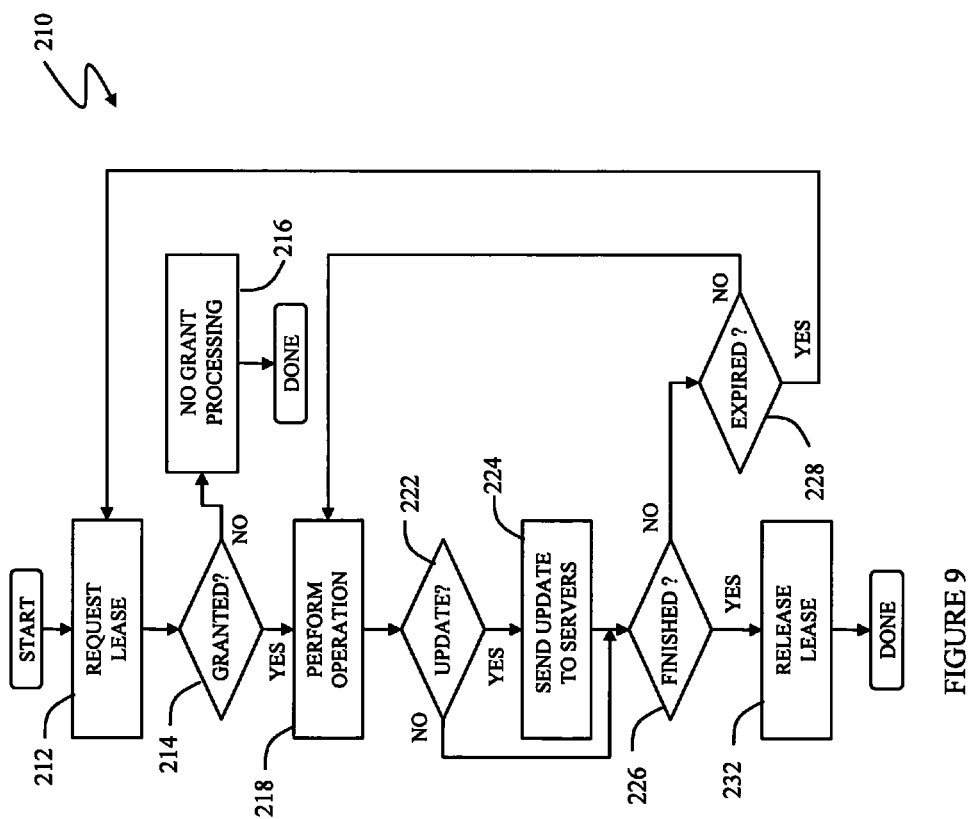
FIG. 9 is a flowchart illustrating a client obtaining a lease for and operating on a file according to an embodiment of the system described herein.

Referring to FIG. 9, a flowchart 210 illustrates steps performed by a client in connection with requesting a lease for a file (objects associated with a file) for performing operations thereon. Processing begins at a first step 212 where the client requests the lease for the file. As discussed in more detail elsewhere herein, a client requesting a lease includes specifying the type of access (e.g., read, write, etc.). Following the step 212 is a test step 214 where it is determined if the request has been granted. If not, then control transfers from the test step 214 to a step 216 where processing is performed in connection with the lease not being granted to the client. The particular processing performed at the step 216 may include, for example, providing an error message to the client process requesting access to the file corresponding to the lease and/or waiting for an amount of time and then retrying the request. Note that it is possible that a lease for a particular file is not available at one time is subsequently available at another time because, for example, the lease is released by another client in between the first request and the second request. In any event, any appropriate processing may be performed at the step 216. Following the step 216, processing is complete.

If it is determined at the test step 214 that the lease requested at the step 212 has been granted, then control transfers from the test step 214 to a step 218 where the client performs an operation using the file for which the lease was granted. Operations performed at the step 218 include reading data and/or writing data. Different types of processing that may be performed at the step 218 are described in more detail elsewhere herein.

Following the step 218 is a test step 222 where it is determined if the operations performed at the step 218 require an update. In some instances, a client may obtain a lease and perform operations that do not affect the file or the underlying file objects. For example, a client may acquire a lease for reading a file and the operation performed at the step 218 may include the client reading the file. In such a case, no update may be necessary since the file and corresponding file objects (metadata, data objects, etc.) have not changed. On the other hand, if the client obtains a lease for writing data the file and the operation performed at the step 218 includes writing data to the file, then the underlying file objects will have been changed and an update message needs to be sent the servers 102. If it is determined at the test step 222 that an update is necessary, then control passes from the test step 222 to a step 224 where an update message is sent by the client to the servers 102.

Following the step 224, or following the step 222 if no update is necessary, control passes to a test step 226 where it is determined if the client is finished with the file. In some instances, the client may perform a small number of operations on the file, after which the client would be finished with the file at the step 226. In other cases, the client may be performing a series of operations and may not yet have completed all of the operations.

If it is determined at the test step 226 that the client is not finished with the file, then control passes from the test step 226 to a test step 228 where it is determined if the lease for the file has expired. Note that a lease may be provided by the servers 102 to the client with a particular expiration time and/or the associated security token may expire. In addition, it may be possible for the servers 102 to recall leases provided to clients under certain circumstances. In either case, the lease may no longer be valid. Accordingly, if it is determined at the step 228 that the lease has expired (and/or has been recalled by the servers 102), then control passes from the test step 228 back to the step 212 request the lease again. Otherwise, if the lease has not expired, then control passes from the test step 228 back to the step 218 to perform another iteration.

If it is determined at the test step 226 that the client is finished with the file, then control passes from the test step 226 to a step 232 where the client releases the lease by sending a message to the servers 102 indicating that the client no longer needs the lease. Once the client releases the lease, it may be available for other clients. Following the step 232, processing is complete.

In an embodiment herein, data file objects may be indicated as having one of four possible states: current, stale, immutable, or empty. The current state indicates that the data object is up to date and current. The stale state indicates that the data is not valid but, instead, requires updating, perhaps by some other process. In some instances, the stale state may be used only in connection with mirror copies of data (explained in more detail elsewhere herein). Data may be stale because it is a mirror of other data that was recently written but not yet copied. The immutable state indicates that the corresponding data is write protected, perhaps in connection with a previous clone (snapshot) operation. The empty state indicates that no actual storage space has yet been allocated for the data.

Figure 10:
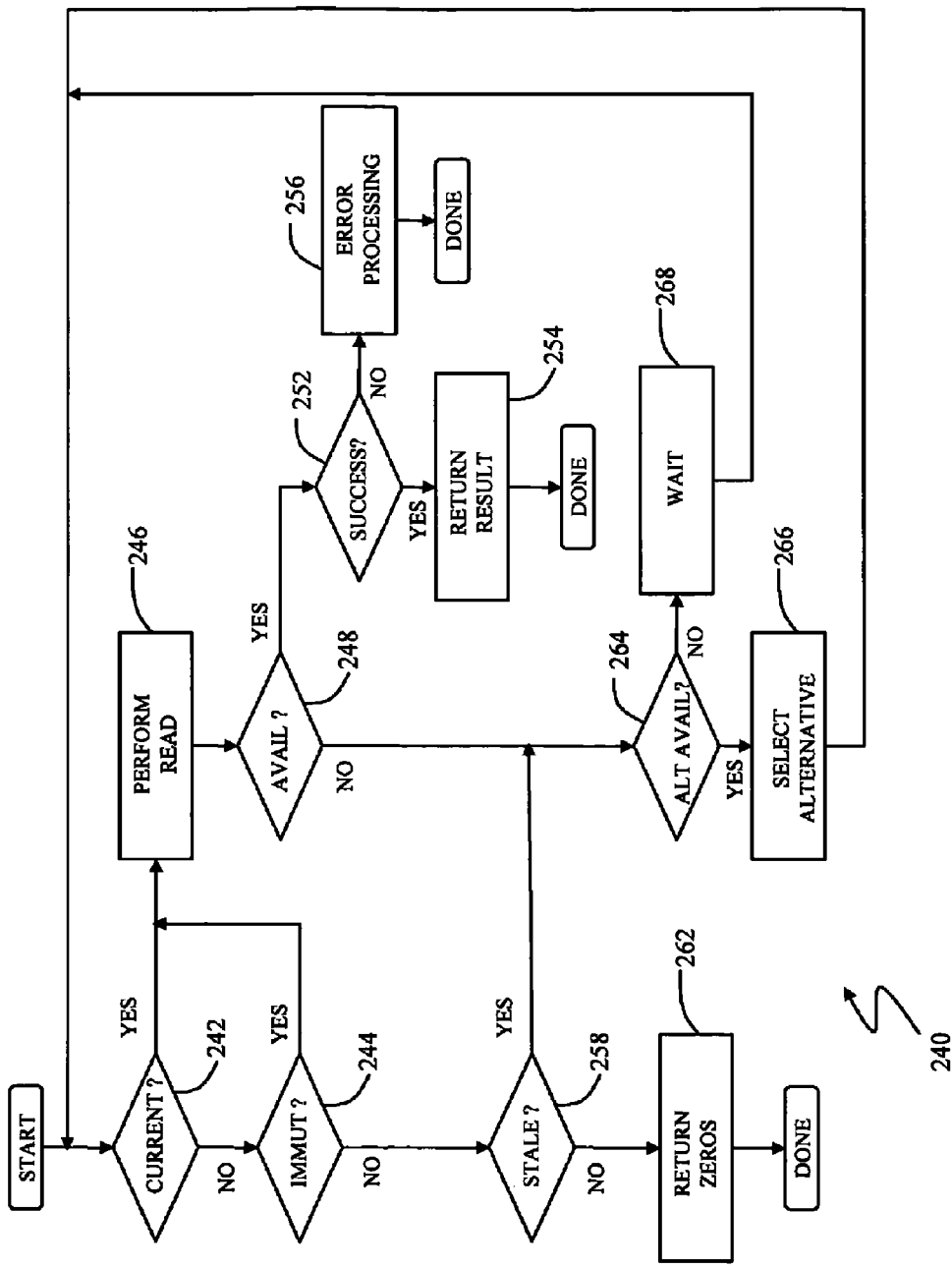
FIG. 10 is a flowchart illustrating a client reading data from a file according to an embodiment of the system described herein.

Referring to FIG. 10, a flow chart 240 illustrates steps performed by a client in connection with performing read operations after obtaining a read lease for a file. Processing begins at a first test step 242 where it is determined if the data object being read is in the current state. If not, then control transfers from the test step 242 to a step 244 where it is determined if the data object being read is in the immutable state. If it is determined at the step 244 that the data object being read is in the immutable state or if it is determined at the test step 242 that the data object being read is in the current state, then control transfers to a step 246 where the read operation is performed.

A client may read file data by providing the appropriate data file object identifier to the servers 102 as well as providing appropriate security credentials. Accordingly, the read operation performed at the step 246 includes the client sending an appropriate request to the servers 102 and waiting for a result therefrom. Alternatively, if the file data is stored in a different one of the groups 112-114 than the processor performing the processing illustrated by the flow chart 240, then performing a read operation at the step 246 may include providing a client ID, account info, and credentials to the different one of the groups 112-114.

Following the step 246 is a test step 248 where it is determined if the servers 102 have returned a result indicating that the data file object is unavailable. In some cases, a data file object that is otherwise current or immutable may nevertheless become unavailable. For example, the physical storage space that holds the data file object may become temporarily disconnected and/or temporarily busy doing some other operation or, if a data file object may be stored on a different one of the groups 112-114 that is unavailable. If it is determined at the test step 248 that the data file object is available, then control transfers from the test step 248 to a test step 252 where it is determined if the read operation was successful. If so, then control transfers from the test step 252 to a step 254 where the result of the read operation is returned to the process at the client that caused the read operation to be performed. The result may include the data that was read and a status indicator. Following the step 254, processing is complete.

If it is determined at the test step 252 that the read operation performed at the step 246 was not successful, then control transfers from the test step 252 to a step 256 where error processing is performed. The particular error processing performed at the step 256 is implementation dependent and may include, for example, reporting the error to a calling process and/or possibly retrying the read operation a specified number of times. Following the step 256, processing is complete.

If it is determined at the test step 244 that the data object being read is not in the immutable state, then control transfers from the test step 244 to a test step 258 where it is determined if the data object is in the stale state. If not, then, by virtue of the test steps 242, 244, 258 and process of elimination, the data object is in the empty state. In an embodiment herein, reading a data object in the empty state causes zeros to be returned to the calling process. Accordingly, if it is determined at the test step 258 that the data object is not in the stale state, then control transfers from the test step 258 to a step 262 where zeros are returned in response to the read operation. Following the step 262, processing is complete.

If it is determined at the test step 258 that the data file object is in the stale state, or if it is determined at the test step 248 that the data file object is not available, then control transfers to a test step 264 to determine if an alternative version of the data file object is available for reading. As discussed in more detail elsewhere herein, there may be multiple versions of the same data file objects that exist at the same time due to mirroring. Accordingly, if the data file object being read is in the stale state or otherwise unavailable, it may be possible to read a mirror copy of the data file object that may be in the current state. The test performed at the step 264 is described in more detail elsewhere herein.

If it is determined at the test step 264 that an alternative version of the data file object is available, then control transfers from the test step 264 to a step 266 where the alternative version of the data file object is selected for use.

Following the step 266, control transfers back to the test step 242 for another iteration with the alternative data file object.

If it is determined at the test step 264 that an alternative version of the data file object is not available, then control transfers from the test step 264 to a step 268 where the client process waits. In an embodiment herein, it may be desirable to wait for a data file object to become current and/or available. Following the step 268, control transfers back to the step 242 for another iteration. Note that, instead of waiting at the step 268, processing may proceed from the step 264 to the step 256 to perform error processing if there is no alternative data file object available. In other embodiments, it may be possible to perform the step 268 a certain number of times and then, if the data file object is still unavailable or in the stale state and there is no alternative data file object, then perform the error processing at the step 256.

Figure 11:
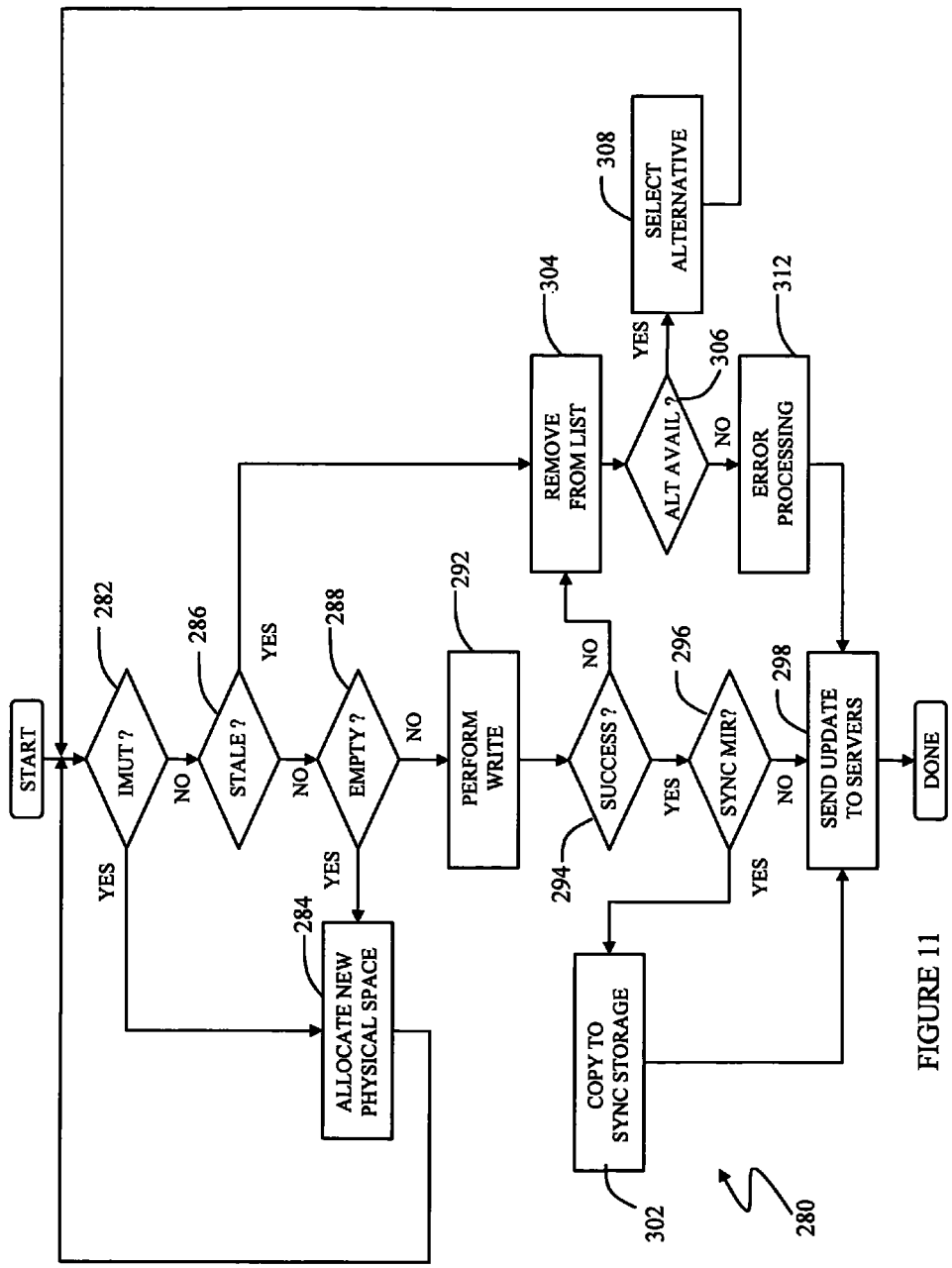
FIG. 11 is a flowchart illustrating a client writing data to a file according to an embodiment of the system described herein.

Referring to FIG. 11, a flow chart 280 illustrates steps performed by a client in connection with performing write operations after obtaining a write lease for a file. Processing begins at a first test step 282 where it is determined if the data file object to which the write is being performed is in the immutable state. If so, then control transfers from the step 282 to a step 284 where new actual storage space is allocated for the data file object to avoid overwriting the immutable data. Allocating new storage space for a data object may include providing an appropriate request to the servers 102. In instances where the file data is stored in a different one of the groups 112-114 than the processor performing the processing illustrated by the flow chart 280, then allocating new storage space at the step 284 may include providing a client ID, account info, and credentials to the different one of the groups 112-114. Following the step 284, control transfers back to the step 282 to begin the processing for the write operation again.

If it is determined at the step 282 that the data file object to which the write is being performed is not in the immutable state, then control transfers from the step 282 to a step 286 where it is determined if the data file object to which the write is being performed is in the stale state. If not, then control transfers from the test step 286 to a test step 288 where it is determined if the data file object to which the write is being performed is in the empty state. If so, then control transfers from the step 288 to the step 284, discussed above, where new physical storage space is allocated. Following the step 284, control transfers back to the step 282 to begin the processing for the write operation again.

If it is determined at the step 288 that the data file object to which the write is being performed is not in the empty state, then control transfers from the test step 288 to a step 292 where the write operation is performed. Note that the step 292 is reached if the data file object to which the write operation is being performed is not in the immutable state, not in the stale state, and not in the empty state (and thus is in the current state). A client writes file data by providing the appropriate data file object location identifier to the servers 102 as well as providing appropriate security credentials. Accordingly, the write operation performed at the step 292 includes the client sending an appropriate request to the servers 102 and waiting for a result therefrom. As with the read operation, discussed above, if the file data is stored in a different one of the groups 112-114 than the processor performing the processing illustrated by the flow chart 280, then performing a write operation at the step 292 may include providing a client ID, account info, and credentials to the different one of the groups 112-114. Note also that the write operation at the step 292 may also include marking any corresponding mirror data objects as stale in anticipation of subsequent mirror update processing, discussed elsewhere herein.

Following the step 292 is a test step 294 where it is determined if the write operation performed at the step 292 was successful. If so, then control transfers from the test step 294 to a test step 296 where it is determined if there are synchronous mirrors of the data file object to which the write is being performed. The test performed at the step 296 may include, for example, determining if a parent node of the data file object in the file LSO tree indicates replication. If not, then control transfers from the test step 296 to a step 298 where an update (message) is sent to the servers 102 indicating that the write had been performed. Following the step 298, processing is complete.

If it is determined at the test step 296 that there are synchronous mirrors of the data file object to which the write is being performed, then control passes from the test step 296 to a step 302 where the data that was written at the step 292 is also written to the synchronous mirror(s). The processing performed at the step 302 is discussed in more detail elsewhere herein. Following the step 302, control transfers to the step 298, discussed above, where an update (message) is sent to the servers 102. Following the step 298, processing is complete.

If it is determined at the test step 294 that the write operation performed at the step 292 was not successful, or if it is determined at the test step 286 that the data file object to which the write operation is being performed is in the stale state, then control transfers to a step 304 where the data file object to which the write is attempting to be performed is removed from the client's local copy of the LSO tree. At the end of the write operation illustrated by the flow chart 280, the client may inform the servers 102 (at the step 298) of the difficulty in writing to the data object so that the servers 102 can take appropriate action, if necessary.

Following the step 304 is a test step 306 where it is determined if an alternative version of the data is available. As discussed in more detail elsewhere herein, there may be multiple versions of the same data file objects that exist at the same time due to mirroring. Accordingly, if the data file object to which the write operation is being performed is stale or otherwise cannot be written to, it may be possible to write to a mirror copy of the data. The test performed at the step 306 is like the test performed at the step 264 and is described in more detail elsewhere herein. If it is determined at the test step 306 that an alternative version of the data corresponding to the data file object is available, then control transfers from the test step 306 to a step 308 where the alternative version is selected for writing. Following the step 308, control transfers back to the test step 282 for another iteration with the alternative data file object.

If it is determined at the test step 306 that an alternative version of the data corresponding to the data file object is not available, then control transfers from the test step 306 to a step 312 to perform error processing if there is no alternative available. The particular error processing performed at the step 312 is implementation dependent and may include, for example, reporting the error to a calling process and/or possibly retrying the write operation a specified number of times before reporting the error. Following the step 312, control transfers to the step 298, discussed above, to send update information to the servers 102. Following the step 298, processing is complete.

Figure 12:
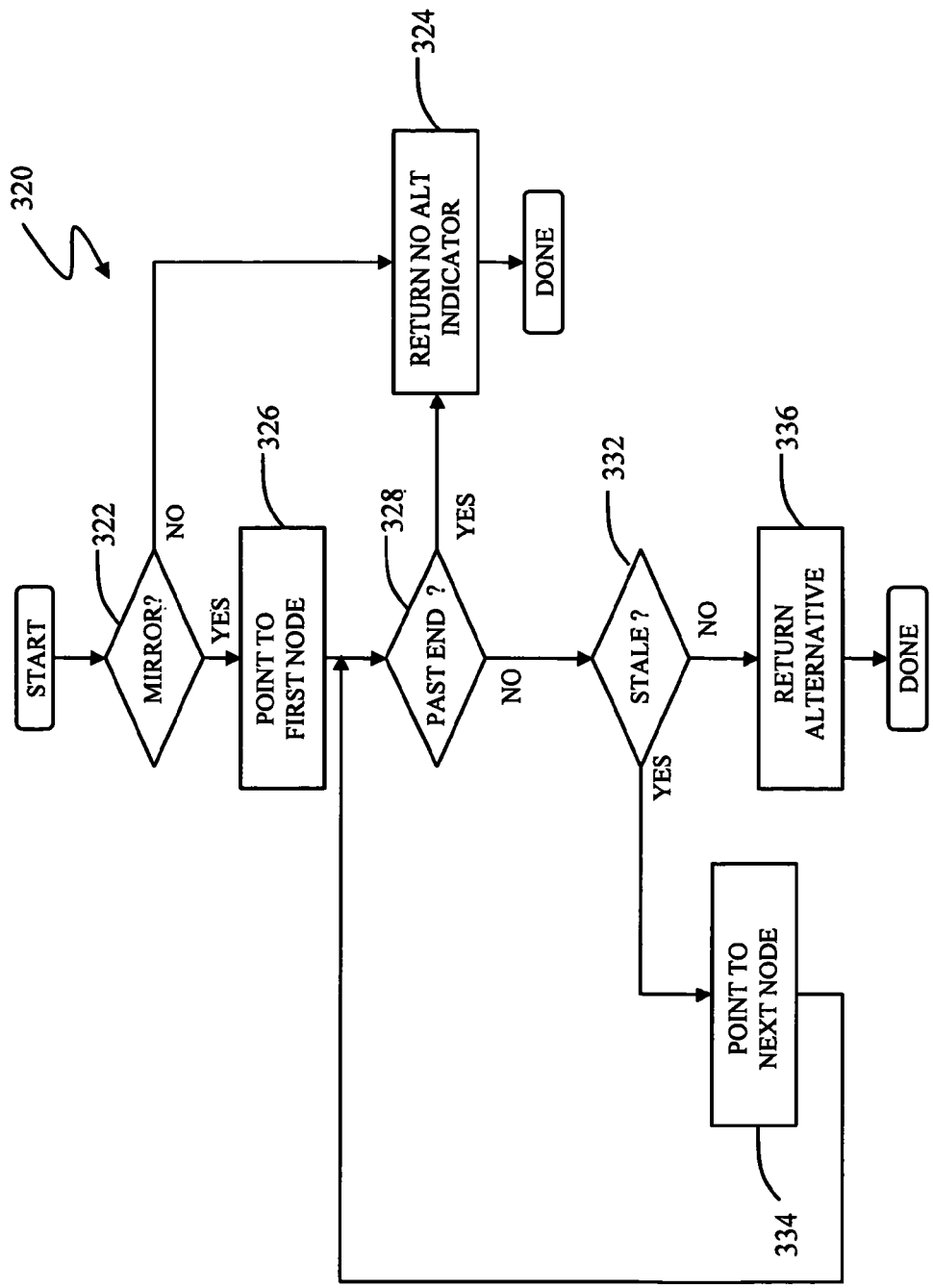
FIG. 12 is a flowchart illustrating steps performed by a client in connection with finding an alternative copy of data according to an embodiment of the system described herein.

Referring to FIG. 12, a flow chart 320 illustrates in more detail steps performed in connection with the alternative available test step 264 of FIG. 10 and/or the alternative available test step 306 of FIG. 11. Processing begins at a first test step 322 where it is determined if the file has any mirror data file objects at all. In some instances, a file may not use mirrors, in which case there would be no alternative copy available. Accordingly, if it is determined at the test step 322 that the file does not have any mirror data file objects, then control transfers from the test step 322 to a step 324 where a value is returned indicating that no alternative copies are available. Following the step 324, processing is complete.

If it is determined at the test step 322 that mirror copies are available, then control transfers from the test step 322 to a step 326 where a pointer is made to point to metadata for a first mirror data file object. For the processing discussed herein, a pointer may be used to iterate through metadata for mirror data file objects to find a useable data file object. Following the step 326 is a test step 328 where it is determined if the pointer is past the end of the list of mirror data file objects (has iterated through all of the metadata for mirror data file objects). If so, then control passes from the test step 328 to the step 324, discussed above, to return a value that indicates that no alternatives are available.

If it is determined at the test step 328 that the pointer is not past the end of a list of mirror data file objects, then control transfers from the test step 328 to a test step 332 where it is determined if the pointer points to metadata indicating that the corresponding data file object in a stale state. If so, then control transfers from the test step 332 to a step 334 where the pointer is made to point to metadata for the next data file object to be examined. Following the step 334, control transfers back to the step 328, discussed above, for another iteration. If it is determined at the test step 332 that the pointer does not point to metadata indicating that the corresponding data file object in the stale state, then control transfers from the test step 332 to a step 336 where the metadata indicating the data file object that is pointed to by the pointer is returned as an alternative data file object that may be used by the calling process. Following the step 336, processing is complete.

Figure 13:
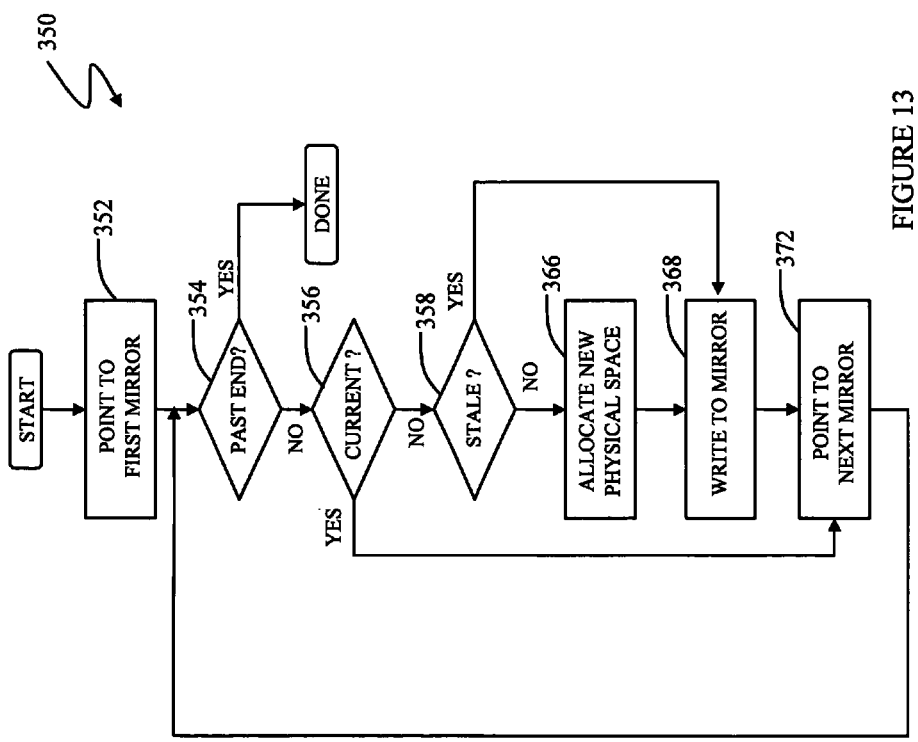
FIG. 13 is a flowchart illustrating a client writing to synchronous mirrors for data according to an embodiment of the system described herein.

Referring to FIG. 13, a flow chart 350 illustrates in more detail operations performed in connection with the step 302 of the flow chart 280 of FIG. 11 where data that has been written is copied to a number of synchronous mirrors (mirror data file objects). Processing begins at a first step 352 where a pointer that is used to iterate through metadata for the mirror data file objects is set to point to metadata for the first one of the mirror data file objects. Following the step 352 is a test step 354 where it is determined if the pointer used for iterating through the metadata for the mirror data file objects points past the end (i.e., if all of the mirror data file objects have been processed). If so, then processing is complete. Otherwise, control transfers from the test step 354 to a test step 356 where it is determined if the status indicated by metadata for the corresponding mirror data file object pointed to by the pointer indicates that the mirror data file object is current. If not, then control passes from the test step 356 to a test step 358 where it is determined if the status indicated by the metadata for the mirror data file object pointed to by the pointer indicates that the mirror data file object is in the stale state. Note that if a mirror data file object is neither in the stale state nor in the current state, then the mirror data file object is either in the empty state or in the immutable state. In either case, it may be necessary to allocate new space for a data file object to which the data is to be written. Accordingly, if it is determined at the test step 358 that metadata indicates that the corresponding data file object is not in the stale state, then control passes from the test step 358 to a step 366 where new space is allocated for the mirror data file object (similar to the step 284 of FIG. 11, discussed above). Following the step 366 is a step 368 where the data that is being copied across synchronous mirror data file objects is written to the mirror data file object pointed to by the pointer used to iterate through the metadata for the mirror data file objects (similar to the step 292 of FIG. 11, discussed above). Note that the step 368 may also be reached from the test step 358 if it is determined that the mirror data file object is stale. Following the step 368 is a step 372 where the pointer used to iterate through metadata for the mirror data file objects is made to point to the next one. Note that the step 372 may also be reached from the test step 356 if it is determined that the mirror data file object is current. Following the step 372, control transfers back to the test step 354 for another iteration.

The system described herein may access file objects using object identifiers. In an embodiment herein, each file object that is stored among the servers 102, including file objects from both local and external clouds, may be assigned a unique object identifier that identifies each file object and distinguishes each file object from other file objects in the system. However, many applications use a file naming structure and/or a hierarchical directory to access files and data therein. For example, a file name "C:\ABC\DEF\GHI.doc" indicates a file called "GHI.doc" stored in a sub-directory "DEF" that is stored in another directory "ABC" located on a root volume "C". A nested directory structure may be provided by implementing directories as special files that are stored in other directories. In the example given above, the sub-directory "DEF" may be implemented as a file stored in the directory "ABC".

The system described herein may present to applications a conventional naming structure and directory hierarchy by translating conventional file names into file object identifiers. Such a translation service may be used by other services in connection with file operations. In an embodiment herein, each directory may include a table that correlates file names and sub-directory names with file object identifiers. The system may examine one directory at a time and traverse sub-directories until a target file is reached.

Figure 14:
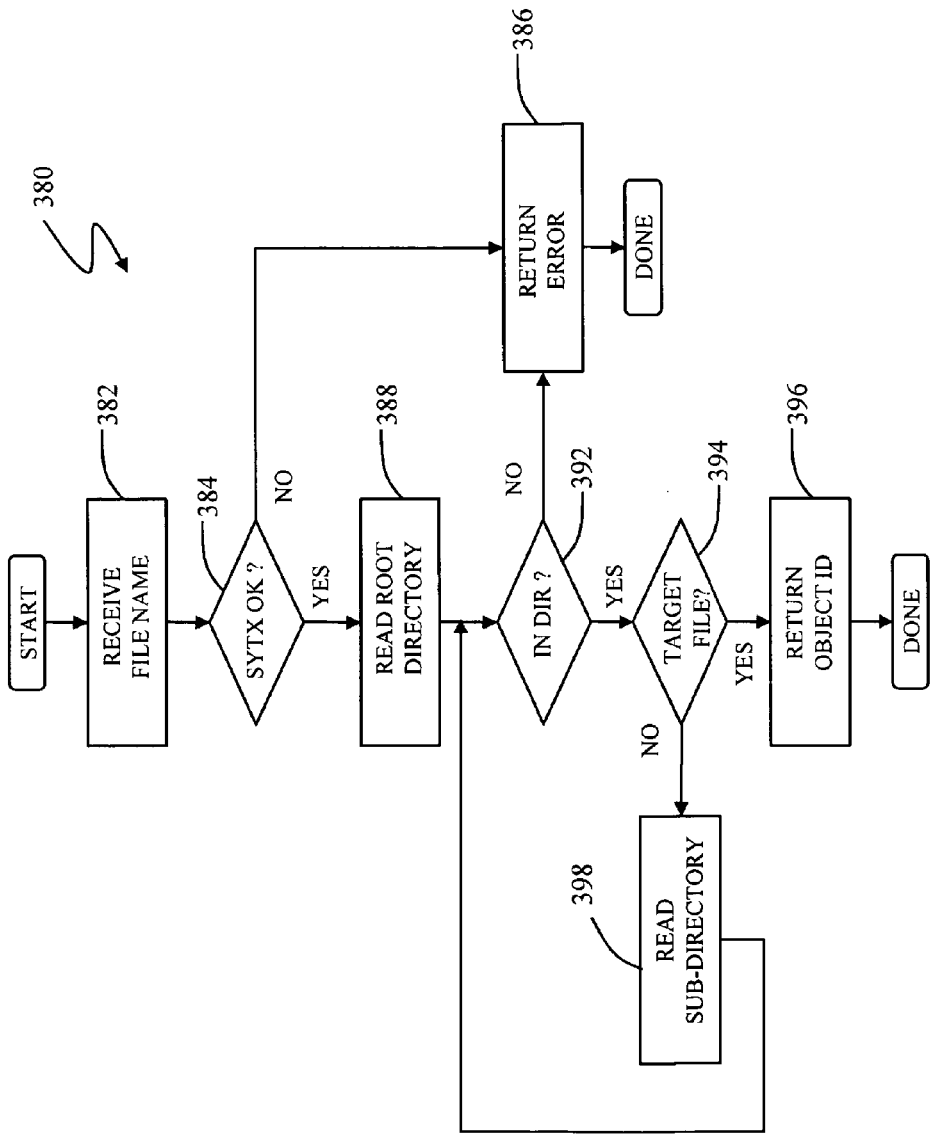
FIG. 14 is a flow chart illustrating a client converting file names to object identifiers according to an embodiment of the system described herein.

Referring to FIG. 14, a flow chart 380 illustrates steps performed in connection with providing a file name translation service (file name service) that translates a conventional hierarchical file name into a file object identifier. The file name service may receive a conventional hierarchical file name as an input and may return an object identifier (or, in some cases, an error). Processing begins at a first step 382 where the file name service receives a file name, such as a conventional hierarchical file name. Following the step 382 is a test step 384 where it is determined if the syntax of the file name is OK. Mechanisms for checking the syntax of a hierarchical file name are known in the art and include, for example, checking that only appropriate characters have been used. If it is determined at the test step 384 that the syntax is not OK, then control transfers from the test step 384 to a step 386 where an error indicator (error message) is returned to the calling process. Following the step 386, processing is complete.

If it is determined at the test step 384 that the syntax of the provided name is OK, then control transfers from the test step 384 to a step 388 where the root directory is read. In an embodiment herein, all file name paths begin at a single common root directory used for all file objects stored in the servers 102. In other embodiments, there may be multiple root directories where specification of a particular root directory may be provided by any appropriate means, such as using a volume identifier, specifically selecting a particular root directory, etc.

Following the step 388 is a test step 392 where it is determined if the target file (or sub-directory that is part of the file name path) is in the directory that has been read. If not, then control passes from the test step 392 to the step 386, discussed above, where an error is returned. In some embodiments, the file-not-found error that results from the test at the step 392 may be different from the syntax error that results from the test at the step 384.

If it is determined that the target file or a sub-directory that is part of the file name path is in the directory that has just been read, then control passes from the test step 392 to a test step 394 where it is determined if the directory that has just been read contains the target file (as opposed to containing a sub-directory that is part of the file name path). If so, then control passes from the test step 394 to a step 396 where the object identifier of the target file object is returned to the calling process. Following the step 396, processing is complete.

If it is determined at the test step 394 that the directory that has just been read contains a sub-directory that is part of the file name path, then control transfers from the test step 394 to a step 398 where the sub-directory is read so that the sub-directory becomes the directory being examined. In effect, processing at the step 398 traverses the chain of subdirectories to eventually get to the target file. Following the step 398, control transfers back to the step 392, discussed above, for a next iteration.

Figure 15:
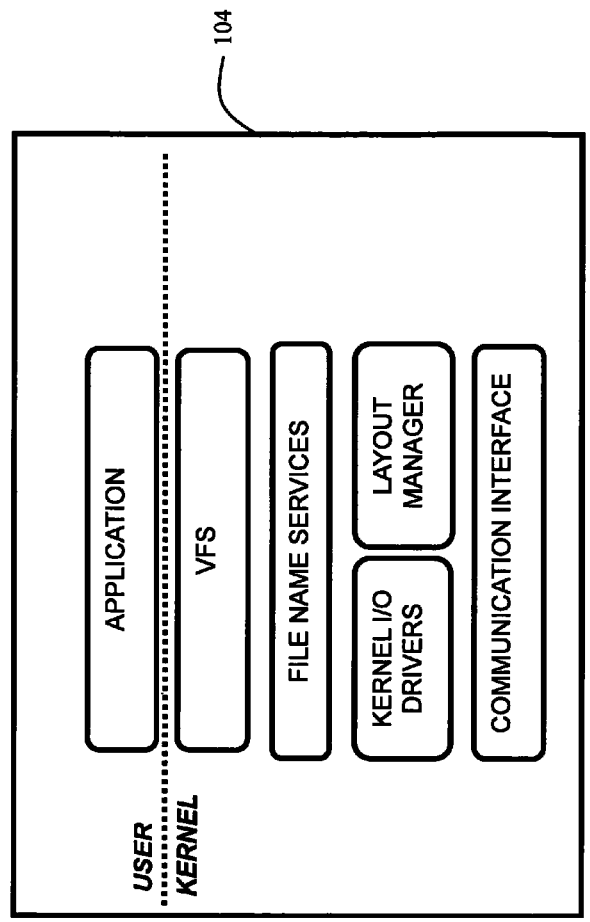
FIG. 15 is a diagram illustrating a client having an application in user memory address space and a having a VFS, file name services, kernel I/O drivers, layout manager, and a communication interface in kernel memory address space according to an embodiment of the system described herein.

Referring to FIG. 15, a diagram shows the client 104 as including user address memory space and kernel address memory space. In an embodiment herein, user address memory space is memory space that is generally used by user applications and related processes while kernel address memory space is memory space that is generally accessible only by system processes, such as an operating system kernel and related processes. As discussed in more detail herein, it is possible to have different portions of the system described herein reside and operate in the user memory space and/or the kernel memory space. In addition, it is possible for the client 104 to have multiple different interfaces to access file objects at the servers 102.

In FIG. 15, the client 104 is shown as including an application in the user memory address space and a virtual file system (VFS), file name services, kernel I/O drivers, a layout manager, and a communication interface in the kernel memory address space. The VFS is an abstraction layer on top of a more concrete file system. The purpose of a VFS is to allow client applications to access different types of concrete file systems in a uniform way. The VFS allows the application running on the client 104 to access file objects on the servers 102 without the application needing to understand the details of the underlying file system. The VFS may be implemented in a conventional fashion by translating file system calls by the application into file object manipulations and vice versa. For example, the VFS may translate file system calls such as open, read, write, close, etc. into file object calls such as create object, delete object, etc.

The VFS may use the file name services, described elsewhere herein, to translate file names into object identifiers. The kernel I/O drivers provide an interface to low-level object level I/O operations. The kernel I/O drivers may be modeled after, and be similar to, Linux I/O drivers. The layout manager may perform some of the processing on LSO trees corresponding to files, as discussed in more detail elsewhere herein. The communication interface provides communication between the client 104 and the servers 102.

The communication interface may be implemented using any appropriate communication mechanism. For example, if the client 104 communicates with the servers 102 via an Internet connection, then the communication interface may use TCP/IP to facilitate communication between the servers 102 and the client 104. In instances where objects from one of the groups 112-114 may be accessed by a client from another one of the groups 112-114, the communication interface may include an appropriate mechanism to formulate data accesses to a different group. For example, the communication interface may include a mechanism for providing a client ID, account info, and credentials to the different one of the groups 112-114.

The application of FIG. 15 may correspond to the client software 124 of FIG. 3. The VFS of FIG. 15 may correspond to one of the interfaces 126-128 of FIG. 3. The file name services, kernel I/O drivers, layout manager, and communication interface of FIG. 15 may correspond to the server operations software 122 of FIG. 3. Similar correlation between components of FIG. 3 and other figures may also be found.

Figure 16:
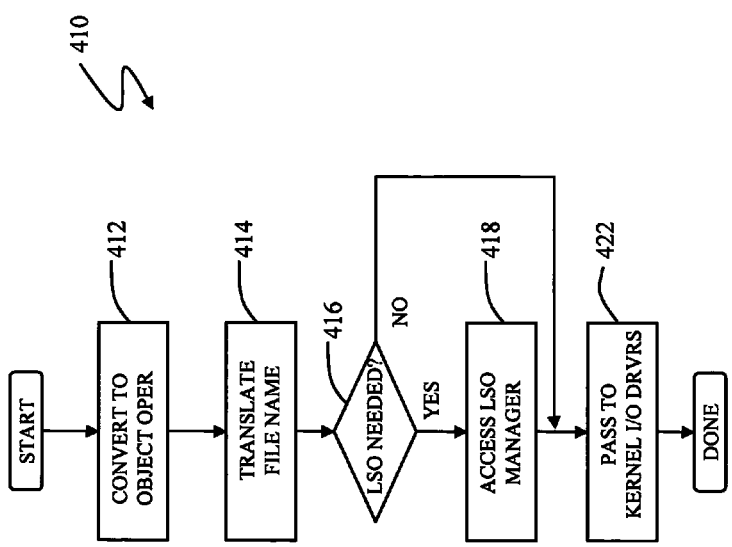
FIG. 16 is a flow chart illustrating operation of a VFS at a client according to an embodiment of the system described herein.

Referring to FIG. 16, a flow chart 410 illustrates steps performed by a VFS to provide file services in connection with an application running on the client 104. Processing begins at a first step 412 where a file system operation requested by an application may be translated into one or more object operations. For example, a file operation to open a file for reading may be converted to object operations that include obtaining an object lease for reading as discussed elsewhere herein. Following the step 412 is a step 414 where the VFS translates the file name into an object identifiers using the file name services discussed above in connection with FIG. 14. Operations that follow may be performed using the object identifiers obtained at the step 414.

Following the step 414 is a test step 416 where it is determined if the requested operation requires the LSO tree. As discussed elsewhere herein, operations such as read, write, etc. use LSO trees corresponding to file objects. However, some possible file operations may not require accessing a corresponding LSO tree. If it is determined at the test step 416 that the LSO tree is needed, then control transfers from the test step 416 to a step 418 where the VFS accesses the LSO manager to perform the necessary operations. For example, for a read operation, the LSO manager may perform processing like that illustrated in the flow chart 240 of FIG. 10. Following the step 418, or following the step 416 if the LSO is not needed, is a step 422 where the operations are passed to low level kernel I/O drivers (e.g., via one or more appropriate API's). The kernel I/O drivers use the communication module to communicate between the client 104 and the servers 102 in connection with performing the requested operation(s). In instances where the application running on the client 104 has requested data and/or other information from the servers 102 (in the same or a different one of the groups 112-114), the data and/or information may be passed back up through the communication interface, kernel I/O drivers, etc. to the VFS and ultimately to the application. As discussed elsewhere herein, the communication module may use and/or include one or more storage servers and/or one or more proxy servers.

Figure 17:
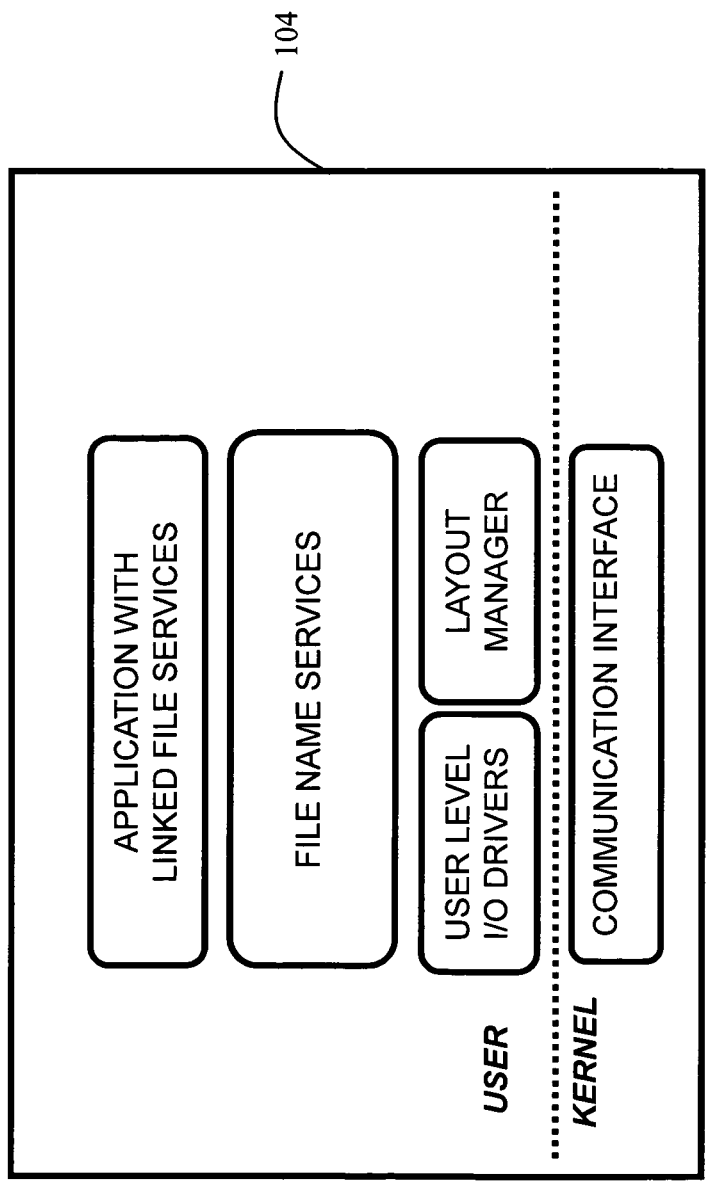
FIG. 17 is a diagram illustrating a client having an application, file name services, user level I/O drivers, and a layout manager in user memory address space and having a communication interface in kernel memory address space according to an embodiment of the system described herein.

Referring to FIG. 17, the client 104 is shown as having an application, file name services, user level I/O drivers, and a layout manager all provided in user memory address space. The functionality of the VFS that was shown in FIG. 15 and described above may be performed instead by library routines linked to the application, and thus are part of the application. These routines would provide functionality like that discussed above in connection with FIG. 16. Accordingly, it is the application that uses the file name services and makes calls to the user level I/O drivers (like the kernel I/O drivers) and to the layout manager. The communication interface is still maintained in the kernel memory address space.

Note that, for the configuration of FIG. 15, modifications are provided by modifying system processes (the operating system), which is disadvantageous for a number of reasons. For example, if the client 104 is a multiuser computing system, then modifying the operating system may involve restarting the entire system and thus disrupting all of the users. In contrast, the configuration of FIG. 17 is advantageous since it allows modification of the system in the application/user memory address space so that the operating system of the client 104 does not need to be modified. However, the configuration of FIG. 17 does not use a VFS, and thus does not obtain the advantageous separation of the application from the file system that is provided by the VFS in FIG. 15.

Figure 18:
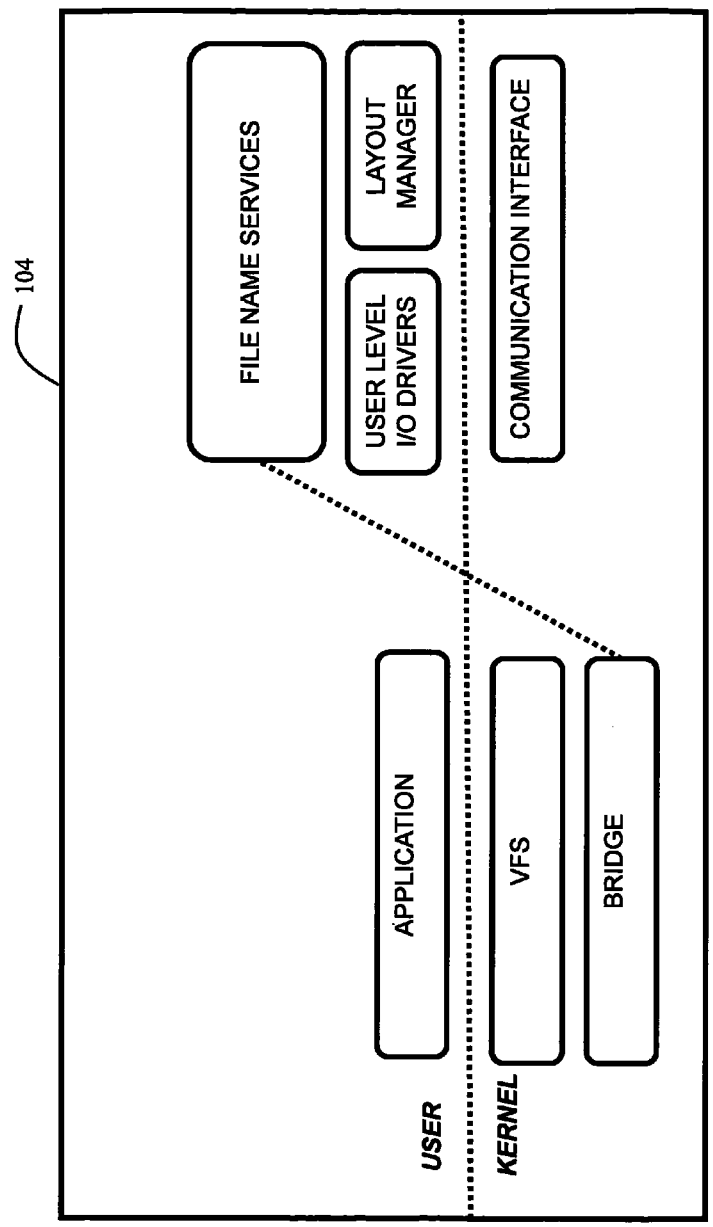
FIG. 18 is a diagram illustrating a client having an application, a file presentation layer, user level I/O drivers, and a layout manager in user memory address space and having a VFS and communication interface and a kernel memory address space to user memory address space bridge in kernel memory address space according to an embodiment of the system described herein.

Referring to FIG. 18, the client 104 is shown as having an application in user memory address space that accesses file objects through a VFS in kernel memory address space like that illustrated in FIG. 15. However, the file name services, I/O drivers, and the layout manager all reside in the user memory address space like the system illustrated in FIG. 17. The VFS communicates with components in the user memory address space through a bridge between kernel memory address space and user memory address space, such as a FUSE (or similar) interface. The bridge allows file system components to be provided in user memory space instead of kernel address memory space while still preserving the VFS in the kernel address memory space. Thus, the configuration illustrated by FIG. 18 provides the advantages of using a VFS, as illustrated in the configuration of FIG. 15, along with the advantages of having file system components in the user address memory space, as illustrated in the configuration of FIG. 17.

It is possible in some instances to have applications and/or other processing in the user memory address space of the client 104 access file objects directly, rather than through a file services layer like the VFS and/or equivalent functionality provided by user linkable libraries (e.g., the configuration illustrated in FIG. 17). Accessing file objects directly may include invoking routines that create objects, read objects, modify objects, delete objects, etc. Accessing file objects may also include, if the objects are stored in a different one of the groups 112-114, providing a client ID, account info, and credentials to the different one of the groups 112-114. If an application and/or other process in the user memory address space of the client 104 accesses file objects directly, the application would need to know how to interpret and/or manipulate the object data, which may not always be desirable. For example, an application that accesses file objects through the VFS may not need to take into account (or even know about) the structure of an LSO tree while an application that accesses objects directly may need to use the LSO tree. On the other hand, removing the file services layer may provide an opportunity for optimizations not otherwise available. Note that, since the servers 102 exchange object information/operations with the clients 104-106, the servers 102 may not need to distinguish or be able to distinguish between application on the clients 104-106 using a file system interface (file services like the VFS) and those that are not.

Figure 19:
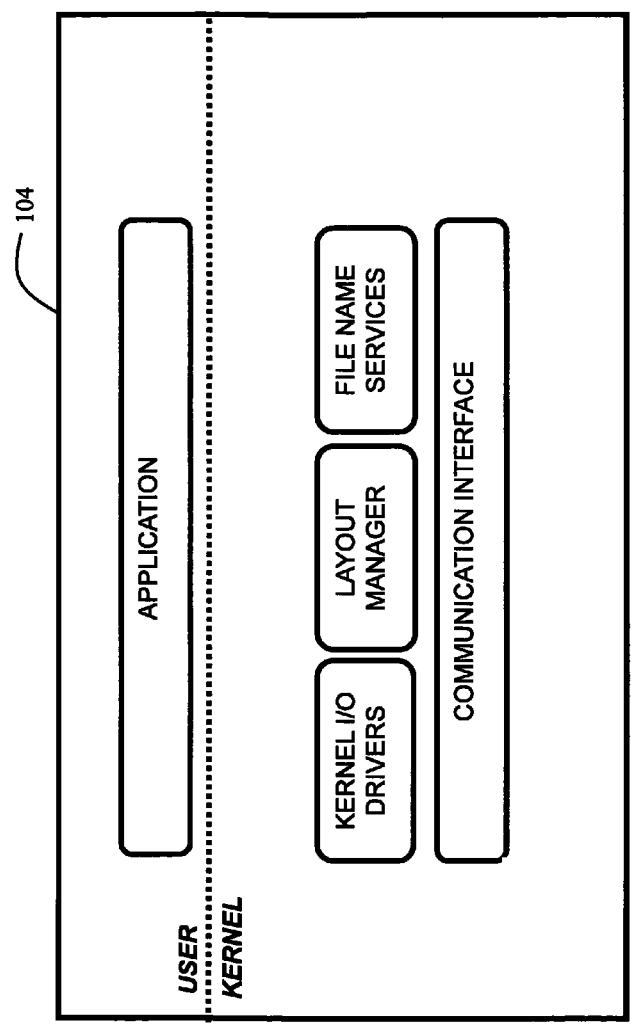
FIG. 19 is a diagram illustrating a client having an application in user memory address space and having file name services, kernel I/O drivers, a layout manager, and a communication interface in kernel address space according to an embodiment of the system described herein.

Referring to FIG. 19, the client 104 is shown as including an application in the user memory address space and kernel I/O drivers, a layout manager, and file name services in the kernel memory address space. The configuration illustrated in FIG. 19 is like that illustrated in FIG. 15, except that the VFS is not used. In the configuration illustrated in FIG. 19, the application could directly access the file name services, the kernel I/O drivers, and the layout manager. The communication interface in the kernel memory address space communicates with the servers 102 just as in other configurations. The direct access illustrated in FIG. 19 allows applications to manipulate file objects (via, for example, appropriate API's) while access via the VFS (or similar) allows applications to accesses file objects indirectly through file system calls to the VFS.

Figure 20:
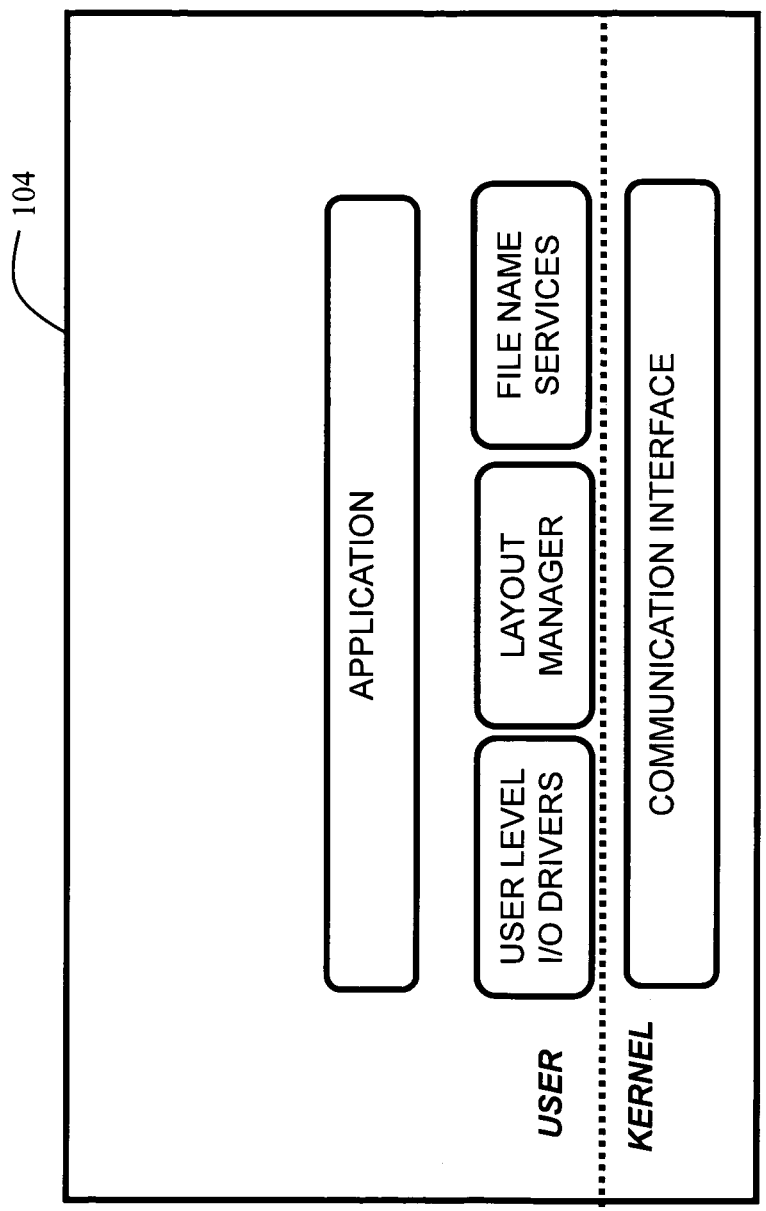
FIG. 20 is a diagram illustrating a client having an application, file name services, user level I/O drivers, and a layout manager in user memory address space and having a communication interface in kernel memory address space according to an embodiment of the system described herein.

Referring to FIG. 20, the client 104 is shown as having an application, user level I/O drivers, a layout manager, and file name services all provided in user memory address space. The configuration shown in FIG. 20 is like that shown in FIG. 17. However, as set forth above, the configuration of FIG. 17 includes file service libraries that are linked into, and thus part of, the application. In contrast, in the configuration of FIG. 20, the application is not linked into libraries with extensive file services. Instead, like the application of the configuration illustrated in FIG. 19, the application in the configuration of FIG. 20 uses minimal file services and, instead, uses and operates upon file objects directly using the user level I/O drivers, the layout manager and, if a file name translation is needed, the file name services.

Figure 21:
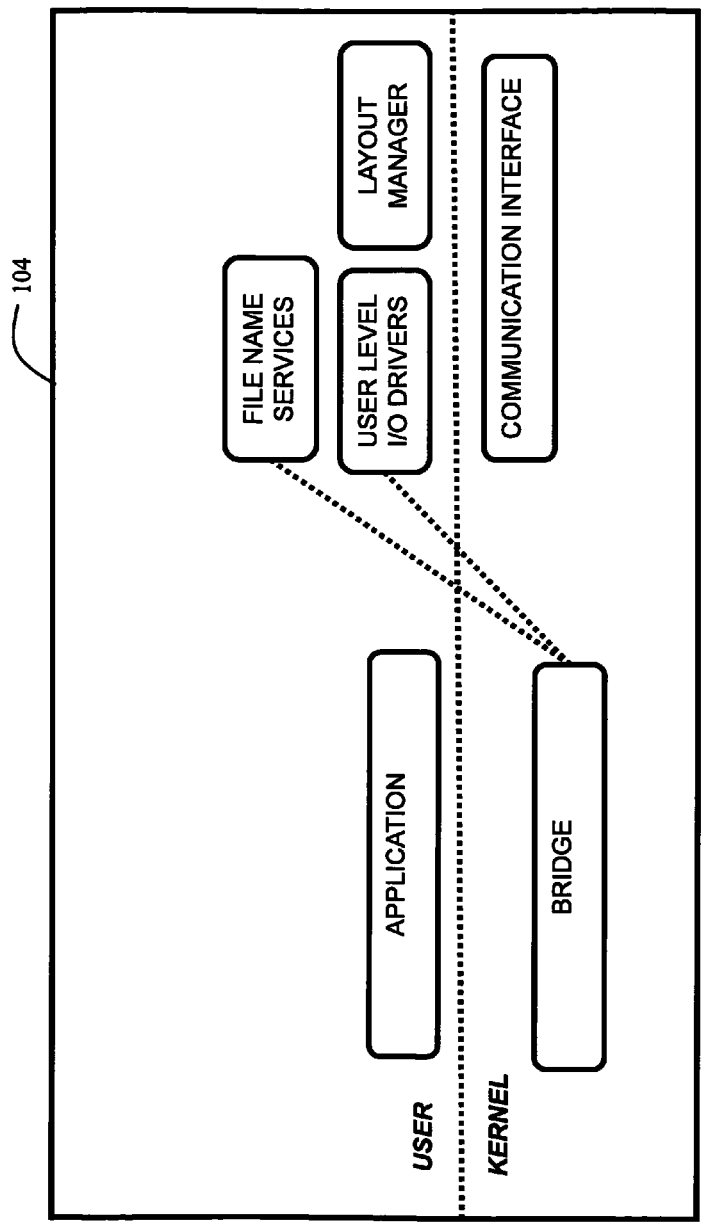
FIG. 21 is a diagram illustrating a client having an application, file name services, user level I/O drivers, and a layout manager in user memory address space and having a communication interface and a kernel memory address space to user memory address space bridge in kernel memory address space according to an embodiment of the system described herein.

Referring to FIG. 21, the client 104 is shown as having an application in user memory address space and a bridge in the kernel memory address space. File name services, user level I/O drivers, and a layout manager are provided in user memory address space. However, unlike the configuration of FIG. 20, the application does not make direct calls to the file system components in the user memory address space. Instead, the application calls the file system components indirectly through the bridge. Just as with the configuration illustrated in FIG. 18, the configuration of FIG. 21 advantageously locates file system components in the user memory address space and, at the same time, provides a kernel memory address space layer between the application and the file system components.

Figure 22:
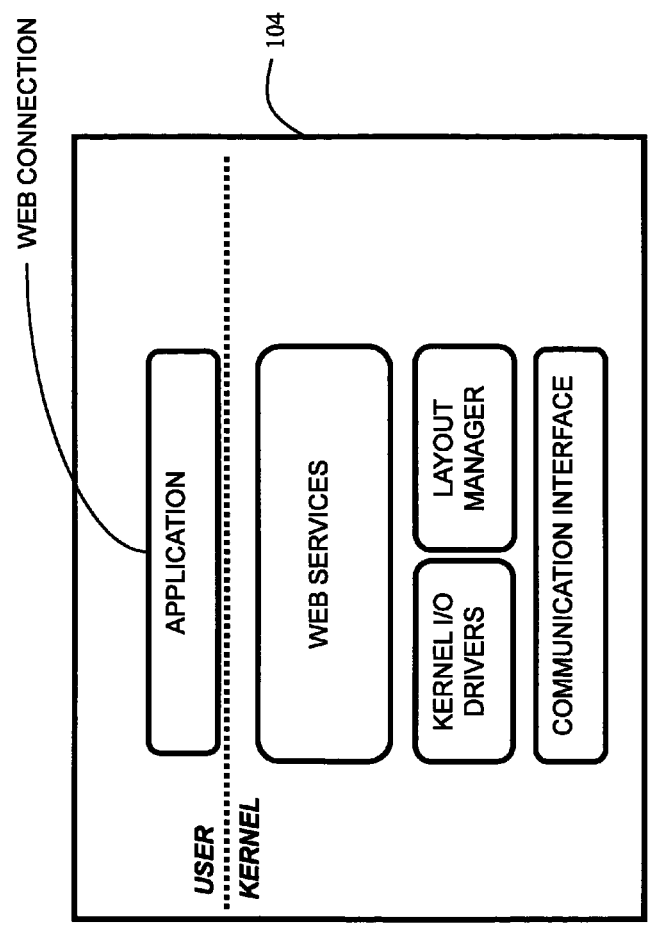
FIG. 22 is a diagram illustrating a client having an application in user memory address space and having a Web Services module, kernel I/O drivers, a layout manager, and a communication interface in kernel memory address space according to an embodiment of the system described herein.

Referring to FIG. 22, the client 104 is shown as having an application in user memory address space and a Web Services module in kernel memory address space. The application may be a Web server application or any application that handles communication with the Web. In an embodiment herein, the application allows communication with the client 104, which acts as a Web server to other computing devices (not shown) that access the client 104 through a Web connection.

The configuration illustrated in FIG. 22 provides Web Services in a manner similar to the file services and/or file object access provided by other configurations. However, the Web Services receives requests/data via a Web data protocol, such as HTTP, and provides responses/data also in a Web data protocol, which may be the same or different from the protocol used for requests/data. Operations handled by the Web Services may include object-level operations such as create object, delete object, read object, modify object, modify object metadata, etc. It is also possible to provide more file system level operations, via the Web Services, that open files, read data from files, etc. by including at least some of the functionality of the file services, described elsewhere herein, with the Web Services. The Web Services may present to the other computing devices a conventional well-known Web Services protocol, such as REST or SOAP, or may provide any other appropriate protocol.

Figure 23:
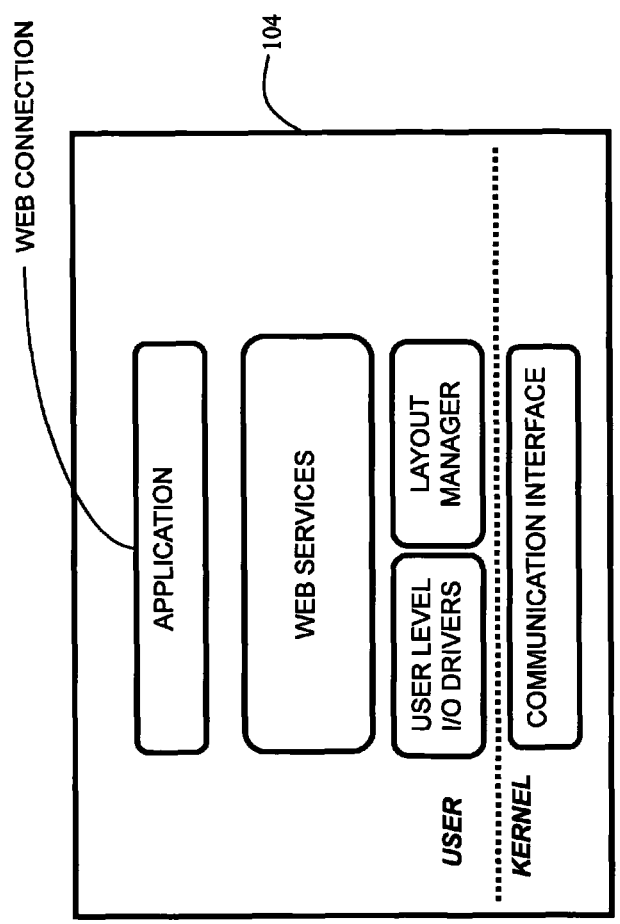
FIG. 23 is a diagram illustrating a client having an application, a Web Services layer, user level I/O drivers, and a layout manager in user memory address space and having a communication interface in kernel memory address space according to an embodiment of the system described herein.

Referring to FIG. 23, the client 104 is shown as having an application, Web Services, user level I/O drivers, and a layout manager in user memory address space. The application may include a Web connection that allows communication with the client 104, which acts as a Web server to other computing devices (not shown) that access the client 104 through the Web connection. The configuration of FIG. 23 is like that of FIG. 17 and FIG. 20. The advantages of the configuration shown in FIG. 23 over the configuration shown in FIG. 22 is that, generally, changes to the configuration shown in FIG. 23 do not require reconfiguring kernel memory address space processes.

Figure 24:
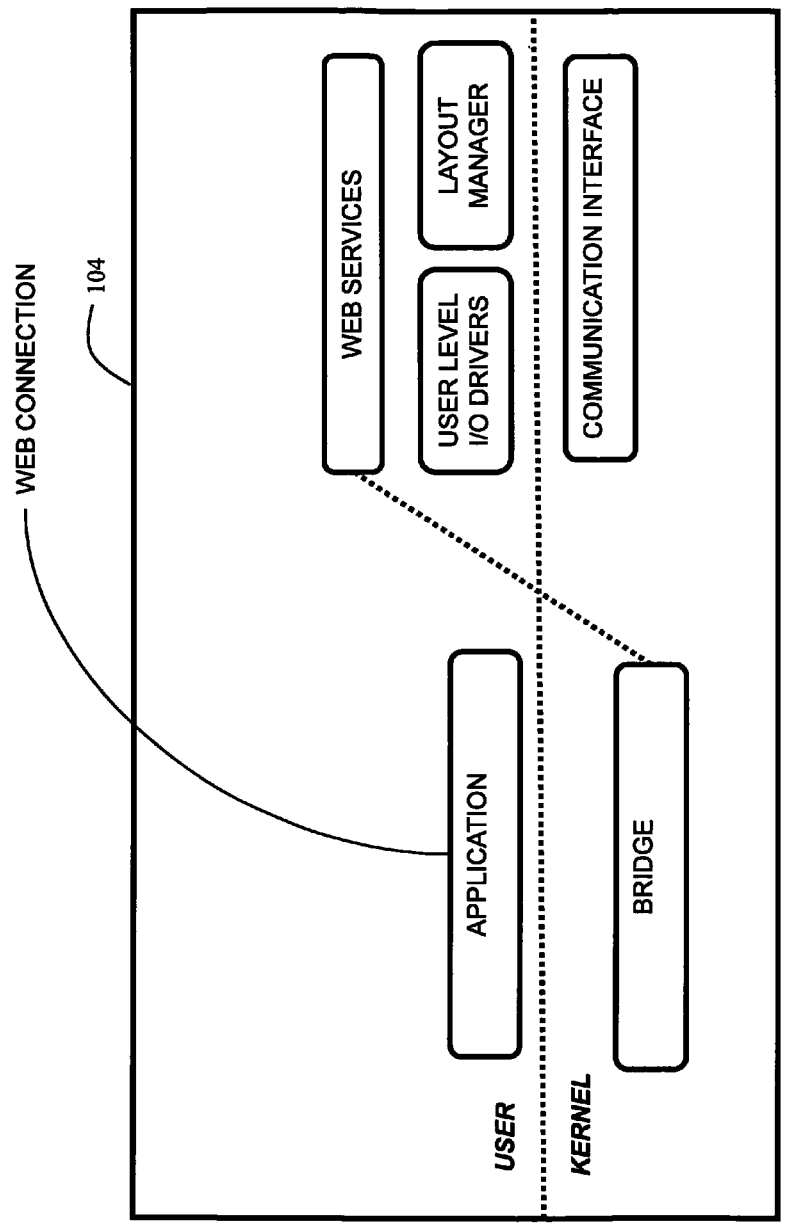
FIG. 24 is a diagram illustrating a client having an application, a Web Services layer, user level I/O drivers, and a layout manager in user memory address space and having a communication interface and a kernel memory address space to user memory address space bridge in kernel memory address space according to an embodiment of the system described herein.

Referring to FIG. 24, the 104 is shown as having an application, Web Services, user level I/O drivers, and a layout manager in user memory address space. The application may include a Web connection that allows communication with the client 104, which acts as a Web server to other computing devices (not shown) that access the client 104 through the Web connection. A bridge is provided in the kernel memory address space. The configuration of FIG. 24 has similar advantages to the configuration shown in FIG. 23, but also has the advantages provided by providing the bridge, discussed elsewhere herein.

Figure 25:
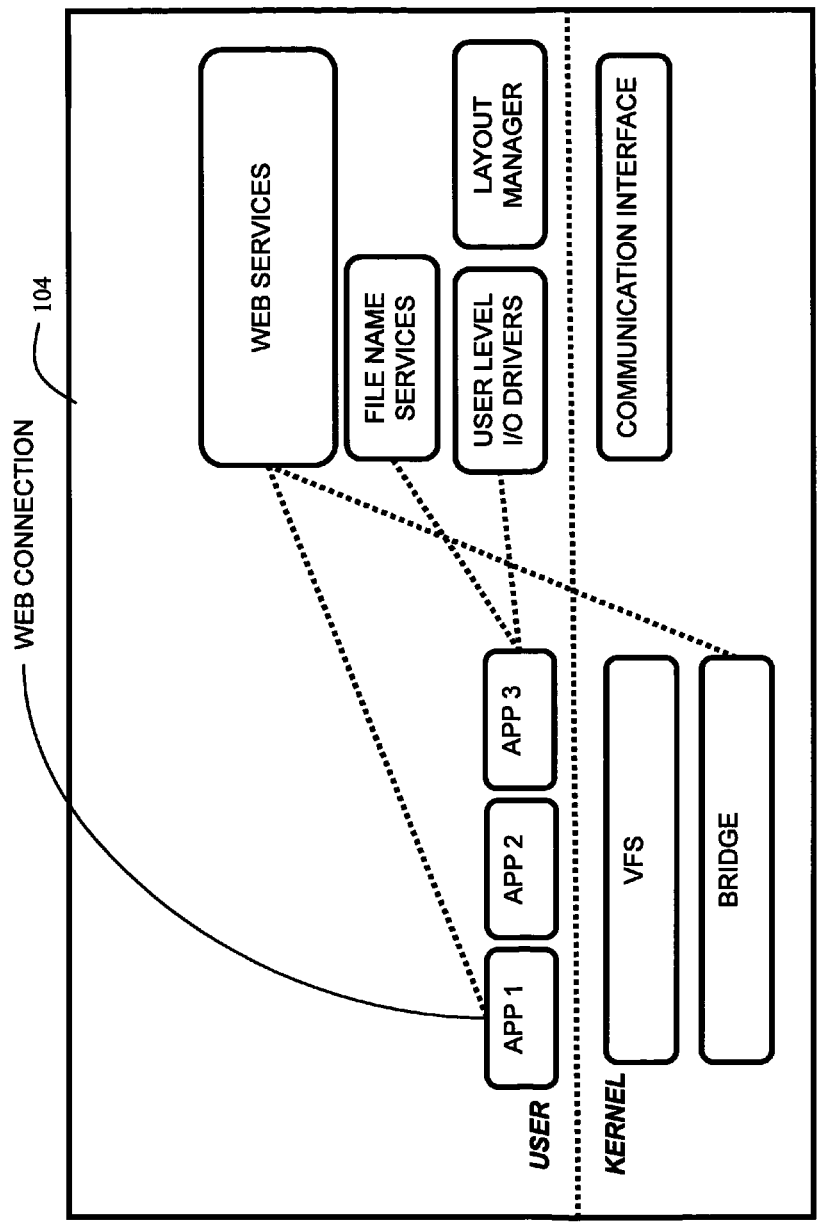
FIG. 25 is a diagram illustrating a client having a plurality of applications, a Web Services layer, file name services, user level I/O drivers, and a layout manager in user memory address space and having a VFS, a communication interface and a kernel memory address space to user memory address space bridge in kernel memory address space according to an embodiment of the system described herein.

Referring to FIG. 25, the client 104 is shown as having a plurality of applications in user memory address space, each of which may use a different interface to access file objects of the servers 102. Each of the applications shown in FIG. 25 is meant to represent one or more applications. Accordingly, APP1 may present one or more applications that access file objects at the servers 102 using a Web Services interface. The APP1 application may include a Web connection that allows communication with the client 104, which acts as a Web server to other computing devices (not shown) that access the client 104 through the Web connection. APP2 may represent one or more applications that access file objects at the servers 102 using the VFS, and APP3 may represent one or more applications that directly operate on file objects at the servers 102. The different interfaces may operate at the client 104 at the same time.

Note that may other combinations of configurations, including illustrated configurations, are possible so that the client 104 may simultaneously present to applications thereon different interfaces. For example, it is possible to combine the configurations illustrated in FIGS. 15, 19, and 22 and/or combine the configurations of FIGS. 17, 20, and 23. Other combinations, including combinations of only two illustrated configurations, are also possible. The servers 102 provide the file objects to the clients 104 provided: 1) the requesting client has appropriate authorization for whatever operation is requested for the file objects; and 2) there is no conflict with any previous request. For example, in systems where only one client is allowed to write to an object at any one time, the servers 102 would not allow one of the clients 104-106 to modify a particular object while another one of the clients 104-106 is also modifying the object.

Figure 26:
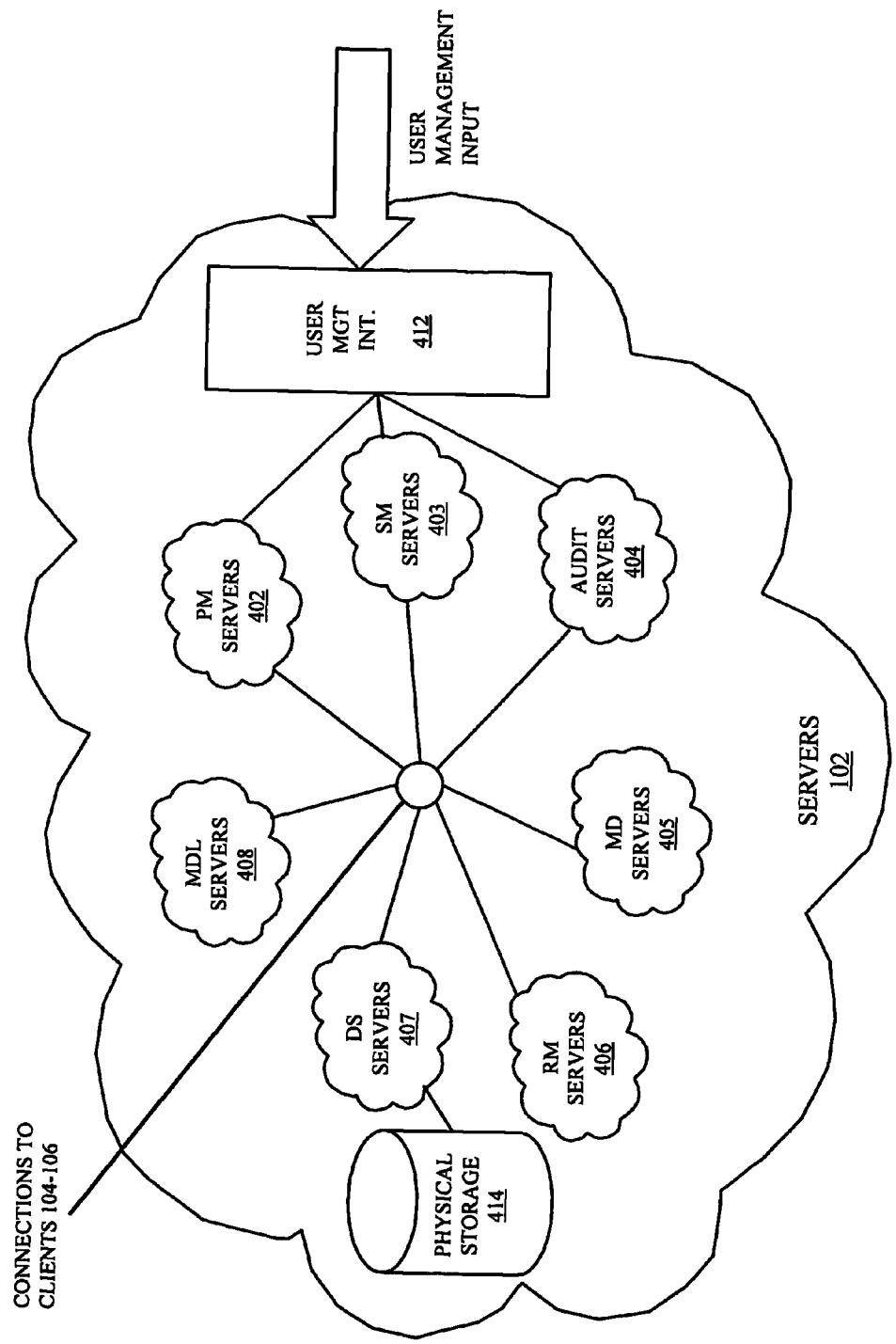
FIG. 26 is a diagram illustrating different types of servers and a user management interface according to an embodiment of the system described herein.

Referring to FIG. 26, the servers 102 are shown in more detail as including one or more policy manager servers 402, one or more security manager servers 403, one or more audit servers 404, one or more metadata servers 405, one or more resource manager servers 406, one or more data storage servers 407, and one or more metadata location servers 408. Each of the servers 402-408 may be implemented as one or more unitary processing devices capable of providing the functionality described herein. For the discussion herein, reference to servers should be understood as a reference to one or more servers. The servers 402-408 may be interconnected using any appropriate data communication mechanism, such as TCP/IP, and may be coupled to the clients 104-106 (not shown in FIG. 26) using any appropriate data communication mechanism, such as TCP/IP. As discussed elsewhere herein, the servers 102 may be provided by different server groups having varying degrees of independence from each other.

The servers 102 may include a user management interface 412 that facilitates system management. The user management interface 412 exchanges data with the policy management servers 402, the security management servers 403, and the audit servers 404 to affect how the servers 102 interact with the clients 104-106 and corresponding users. The data may be provided through the user management interface 412 in any one of a number of ways, including conventional interactive computer screen input and data file input (e.g., a text file having user management commands). The data may include information that correlates classes of users and storage parameters such as Quality of Service (QOS), RAID protection level, number and geographic location(s) of mirrors, etc. For example, an administrator may specify through the user management interface 412 that users of a particular class (users belonging to a particular group) store data file objects on storage devices having a particular RAID level protection.

The servers 102 also include physical storage 414 coupled to the data storage servers 407. Although the physical storage 414 is shown as a single item in FIG. 26, there may be any number of separate physical storage units that may be geographically dispersed and distributed among different groups of servers. In addition, there may be different types of physical storage units having different capabilities. Accordingly, the physical storage 414 generically represents one or more instances of physical data storage for the system that is managed by the data storage servers 407 (or possibly multiple data storage servers), as explained in more detail below.

Data modifications, including modifications of metadata file objects and/or policies that affect handling/creation of metadata file objects, require appropriate security credentials. Accordingly, the security manager servers 403 may restrict/inhibit the ability of certain administrators (users) to modify and/or create policies for classes of users.

Figure 27:
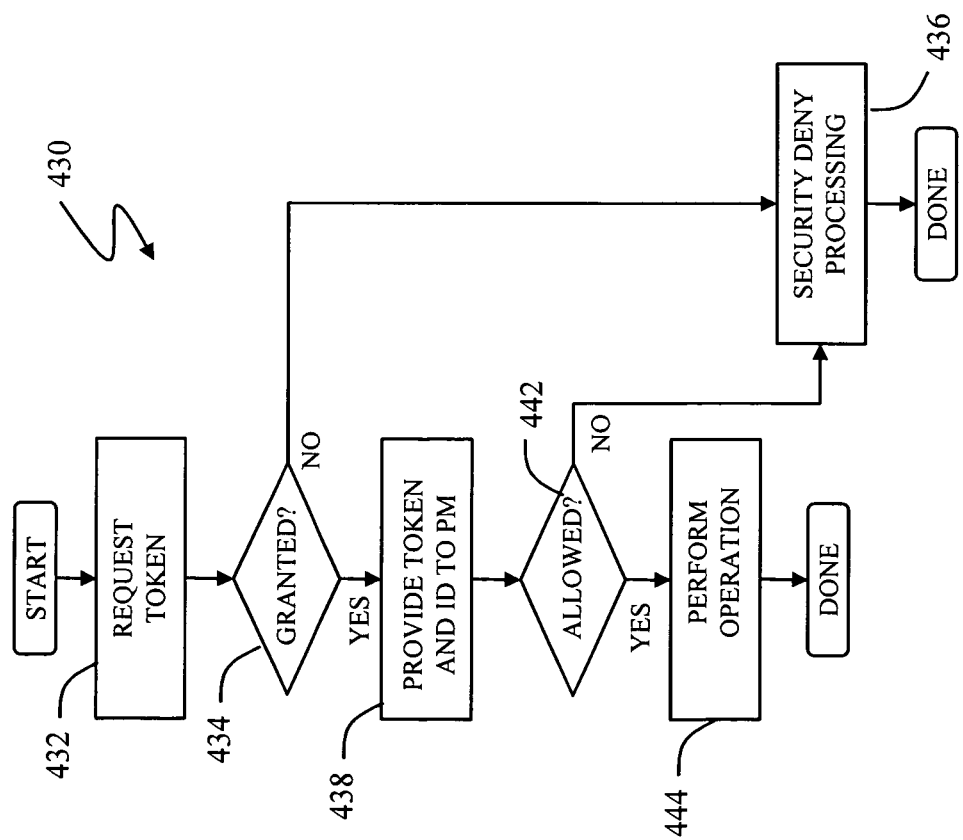
FIG. 27 is a flow chart illustrating steps performed in connection with using security managers servers to obtain credentials for using policy manager servers according to an embodiment of the system described herein.

Referring to FIG. 27, a flow chart 430 illustrates steps performed by the user management interface 412 to obtain and use security credentials for accessing the policy manager servers 402. Processing begins at a first step 432 where the user management interface 412 sends a request to the security manager servers 403 to obtain a token (or other appropriate security credentials) for the operation to be performed by the user management interface 412. Following the step 432 is a test step 434 where it is determined if the token has been granted (provided). In some instances, the security manager servers 403 may not issue a security token at all. For example, if the administrator (user) does not have sufficient rights to perform the desired function.

If the security token is not granted, then control passes from the step 434 to a step 436 where processing is performed in connection with the security token not being granted. The operations performed at the step 436 may including providing a message to the administrator (user) through the security management interface 412 indicating that the administrator does not have sufficient rights to perform the desired operation. Following the step 436, processing is complete.

If it is determined at the test step 434 that a security token has been granted (provided) by the security manager servers 403, then control passes from the test step 434 to a step 438 where the user management interface 412 provides the security token, and user id information, to the policy manager servers 402. Of course, information indicating the desired operation/modification may also be provided at the step 438. Following the step 438 is a test step 442 where it is determined if the policy manager servers 402 have allowed the requested operation. Note that, in some instances, the policy manager servers 402 may not allow a particular operation even though the security manager servers 403 have provided a security token. For example, if the user id and the user indicated by the security token do not match and/or if the requested operation and the operation indicated by the security token do not match.

If it is determined at the test step 442 that the requested operation is not allowed, then control passes from the test step 442 to the step 436, described above, where processing is performed to indicate that there are security issues. The processing performed at the step 436 may include providing a message to an administrator (user) indicating that the operation cannot be performed because of insufficient security rights. The message provided when the step 436 is reached from the step 442 may be different than the message provided when the step 436 is reached from the step 434.

If it is determined at the test step 442 that the requested operation is allowed, then control passes from the test step 442 to a step 444 where the operation is performed. Performing the operation at the step 444 may include modifying policy data, as described in more detail elsewhere herein. Following the step 444, processing is complete.

Thus, an administrator (user) accessing the policy manager servers 402 would first provide identification information to the security manager servers 403 that would return a security token (perhaps having an expiration time). The administrator presents the token and identification information to the policy manager servers 402, which would decide to grant or deny access based on the token and the identification information. Note that the security mechanism illustrated by the flow chart 430 of FIG. 27 may be extended to be used in connection with accessing any of the servers 402-408 and/or other data. For example, one of the clients 104-106 could obtain/modify file objects by first requesting a security token from the security manager servers 403 prior to performing an operation that includes operations with file objects. Accordingly, for the discussion herein, it can be assumed that access to file objects, servers, etc. includes appropriate security procedures like those illustrated in FIG. 27.

The policy manager servers 402 handle placement and protection of file objects. An administrator and/or user may input, through the user management interface 412, different policy templates that may be applied to different ones of the clients 104-106, different users, different classes of users, different object sets or any other appropriate group. For example, a policy template may indicate that, for a particular group of users, whenever a new file is created, a mirror will be created that is geographically farther from the initial data set by at least a certain distance. In such a case, when a first user of the group creates an initial data set in New York, a mirror may be automatically created in Los Angeles while, when a second user creates an initial data set in Los Angeles, a mirror may be created in New York. The policy manager servers 402 may provide other functionality, as described in more detail elsewhere herein.

The audit servers 404 may be used to provide system auditing capability. A user may communicate to the audit servers 404 through the user management interface 412. The user may indicate the type of information to be audited (tracked).

The resource manager servers 406 keep track of available system resources. In some instances, the resource manager servers 406 may interact with the policy manager servers 402 in connection with establishing policy templates and/or assigning policy templates. In some cases, a user may attempt to construct a policy template that is impossible to fulfill if assigned to a group. For example, if all of the physical data storage is in a single geographic location, then it would not be appropriate to have a policy template indicating that new files should include a mirror that is geographically distant from the initial data set.

The resource manager servers 406 receive information from other components of the system in order to be able to keep track which resources are available. Whenever a resource is added to the system, the resource or another component reports that information to the resource manager servers 406. For example, if new physical storage is added to the system, the new physical storage itself, or a corresponding one of the data storage servers 407, sends a message to the resource manager servers 406. Similarly, if a resource becomes full (e.g., a physical disk is full) or is removed from the system (planned removal or unplanned resource failure), information is provided to the resource manager servers 406. In an embodiment herein, system resources may correspond to portions of the physical storage 414 and/or data servers 407 that manage the physical storage 414.

Figure 28:
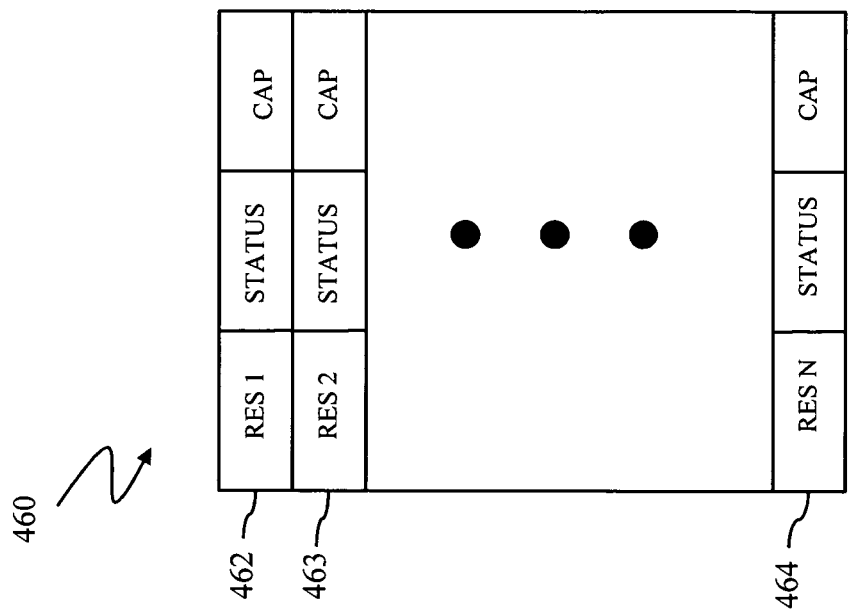
FIG. 28 is a diagram illustrating a resource manager table according to an embodiment of the system described herein.

Referring to FIG. 28, a resource table 460 is shown as including a plurality of entries 462-464, each of which corresponds to a particular storage resource. Although only three entries are shown, the table 460 may contain any number of entries. The table 460 may be implemented using any appropriate technique, including an array, linked list, etc.

Each of the entries 462-464 includes a resource field identifying a particular resource corresponding to the entry. In an embodiment herein, each of the entries 462-464 may correspond to a particular one of the data storage servers 407 and/or a portion thereof. Each of the entries 462-464 includes a status field corresponding to the status of the corresponding resource. In an embodiment herein, the status field may indicate that a resource is on-line (available) or off-line (unavailable). The status field may also indicate the percentage of used space of a resource, and perhaps indicate any performance degradation.

Each of the entries 462-464 may also include a capabilities field that indicates the capabilities of the corresponding resource. In an embodiment herein, when the resources represent storage areas, the capabilities field may indicate particular capabilities of a corresponding storage area. Particular capabilities may include the resource being green (low energy use through, for example, spinning disks down when not in use), capable of data deduplication (maintaining only a single copy of data that is otherwise duplicated), capable of various RAID configurations, etc. The capabilities field may indicate any appropriate data storage capabilities.

Figure 29:
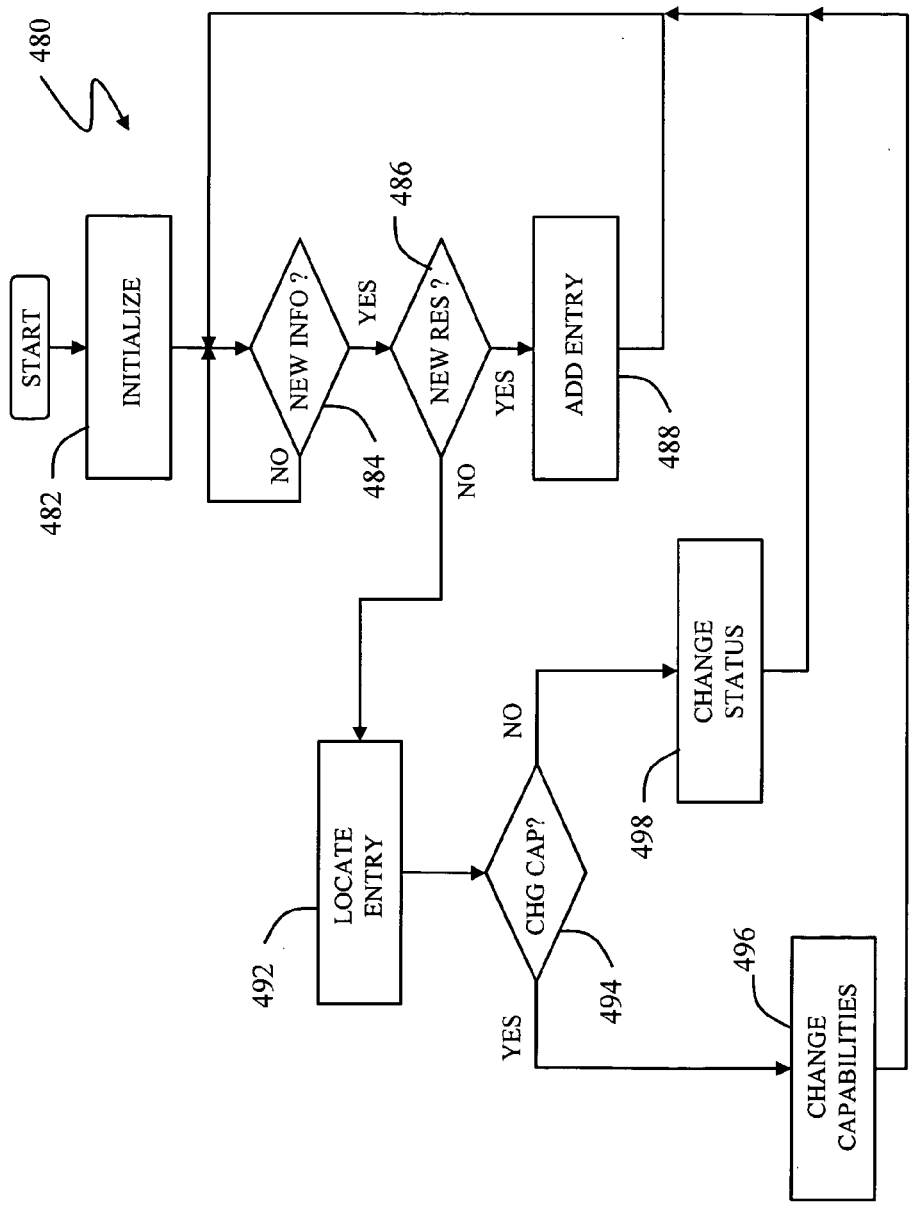
FIG. 29 is a flow chart illustrating steps performed in connection with processing resource information to update a resource table according to an embodiment of the system described herein.

Referring to FIG. 29, a flow chart 480 indicates operation of the resource manager servers 406 in connection with maintaining information about system resources. Processing begins at a first step 482 where the resource manager servers 406 are initialized with information about resources. The initialization processing performed at the step 482 may take any form, including loading a fixed table of initially available resources, having the resource manager servers 406 poll system resources, etc.

Following the step 482 is a test step 484 where the resource manager servers 406 wait for new information to be provided. In an embodiment herein, after initialization, the resource manager servers 406 wait to receive information from other system components. In other embodiments, it may be possible to have the resource manager servers 406 periodically poll system components to see if anything has changed. If it is determined at the test step 484 that no new information is available, control loops back on the test step 484 to continue polling.

Once it is determined at the test step 484 that new information is available, then control transfers from the test step 484 to a test step 486 where it is determined if the new information relates to a new resource added to the system. If so, then control transfers from the test step 486 to a step 488 where the new entry is added to the resource table that is managed by the resource manager servers 406. Following the step 488, control transfers back to the step 484 to continue waiting for new information.

If it is determined at the step 486 that the received resource information does not related to a new resource (and thus relates to a change of an existing resource), then control transfers from the step 486 to a step 492 where the existing entry is located in the resource table. Following the step 492 is a test step 494 where it is determined if the capability is being changed for the modified resource. The capability of a resource may change under many different circumstances. For example, a resource may degrade and lose capabilities, a resource may be modified/enhanced and gain capabilities, a local manager of a resource may decide to make certain capabilities available/unavailable, etc.

If it is determined at the step 494 that the capabilities of a resource have changed, then control transfers from the test step 494 to a step 496 to change the capabilities field for the resource being modified. Otherwise, control transfers from the test step 494 to a step 498 to change the status field of the resource being modified (e.g., resource is full, resource is off-line, resource is on-line, etc.). Following either the step 496 or the step 498, control transfer back to the step 484, discussed above, for another iteration.

Note that the resource manager servers 406 may represent a plurality of separate computing devices that may be dispersed throughout the system. Furthermore, each of the separate computing devices may maintain its own copy of the resource table. The separate computing devices that are used to implement the resource manager servers 406 may or may not share resource information and may or may not receive the same resource status messages. In instances where information sharing and/or receipt of status messages is not perfect, then each of the computing devices may have a somewhat different version of the resource table and it is possible for no one version of the resource table to reflect a completely accurate picture of the exact state of all of the resources of the system.

The physical storage 414 may be provided using any type of hardware, including high-end hardware, relatively inexpensive off-the-shelf mass produced storage hardware, and/or any combinations thereof. In an embodiment herein, at least some of the physical storage 414 may be implemented using serial ATA disk drives, which may be available from a number of manufactures such as Seagate and Western Digital. As discussed elsewhere herein, the physical storage may be geographically dispersed. However, each portion of the physical storage may be managed/controlled by at least one of the data storage servers 407, which may be implemented using conventional computing devices local to the corresponding portion of the physical storage 414.

In an embodiment herein, the data storage servers 407 may present an OSD Standard interface to the system. Thus, the servers 102 and/or the clients 104-106 may access physical storage 414 through the data storage servers 407 using OSD calls and may receive information/data according to the OSD protocol. In addition, the data storage servers 407 may handle managing/posting the capabilities and status of different portions of the physical storage 414. Thus, for example, when a portion of the physical storage 414 is managed by a particular server of the data storage servers 407, the particular server may send a message to the resource manager servers 406 indicating the new status.

Figure 30:
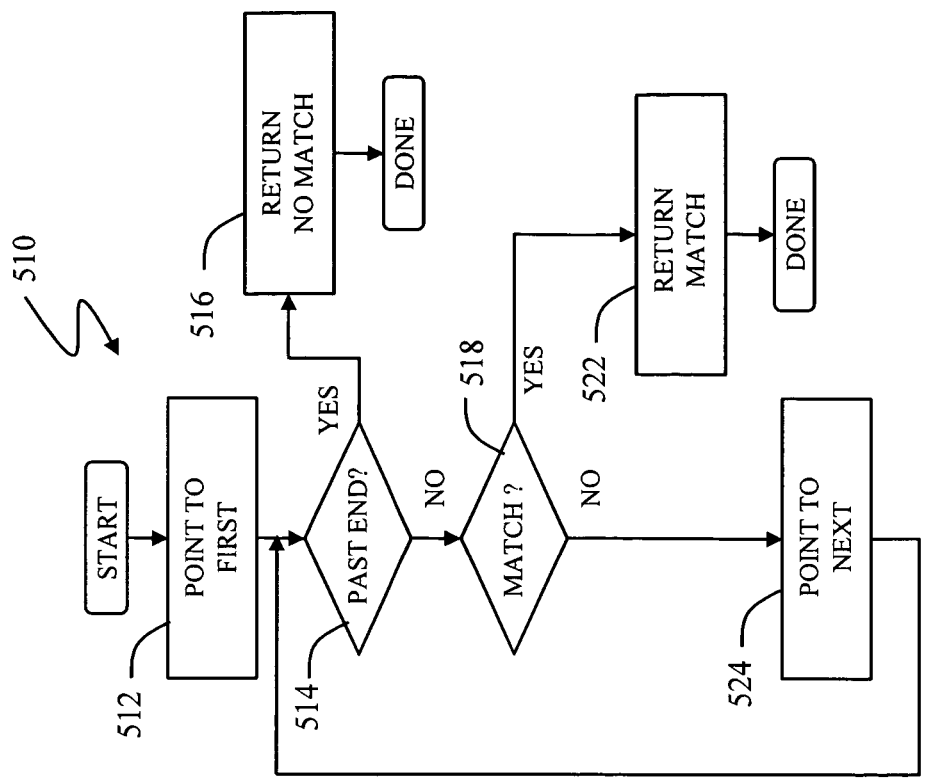
FIG. 30 is a flow chart illustrating steps performed in connection with finding a resource with a desired capability according to an embodiment of the system described herein.

Referring to FIG. 30, a flow chart 510 illustrates steps performed by the resource manager servers 406 in connection with servicing an inquiry for a resource with particular capabilities (i.e., finding a resource with particular capabilities). Processing begins at a first step 512 where a pointer, used to iterate through each entry of the resource table, is set to point to the first entry. Following the step 512 is a test step 514 where it is determined if the pointer points past the end of the table (i.e., all entries have been examined). If so, then control passes from the test step 514 to a step 516 where a result indicating no match for the requested capabilities is returned by the resource manager servers 406. Following the step 516, processing is complete.

If it is determined at the test step 514 that the pointer used to iterate through the entries does not point past the end of the table, then control transfers from the test step 514 to a test step 518 where it is determined if the entry currently indicated by the pointer is a match for the requested capability. Note that the test at the step 518 may include checking the status of a resource to ensure that the resource is on-line and not full or otherwise unusable. If it is determined at the step 518 that the resource indicated by the pointer has the requested capability, then control transfers from the test step 518 to a step 522 where the resource manager servers 406 return an indicator indicating the matching resource. Following the step 522, processing is complete.

If it is determined at the step 518 that the resource indicated by the pointer does not have the requested capability (or is off-line, full, etc.), then control transfers from the test step 518 to a step 524 where the pointer is incremented. Following the step 524, control transfers back to the step 514, discussed above, for another iteration.

The LSO trees that are part of the metadata objects for files are created, maintained, and manipulated by the metadata servers 405. The metadata servers 205 handle updates from the clients 104-106 in connection with manipulation of file objects (e.g., at the step 214 of the flow chart 200 of FIG. 9, at the step 298 of the flow chart 280 of FIG. 11, etc.). The metadata servers 205 may also handle any actions, besides modifying the LSO tree, that may need to be performed in connection with the updates. The metadata servers 205 also handle leases obtained for file objects. As discussed elsewhere herein, in some embodiments, it is possible to also allow clients to maintain the LSO trees.

Figure 31:
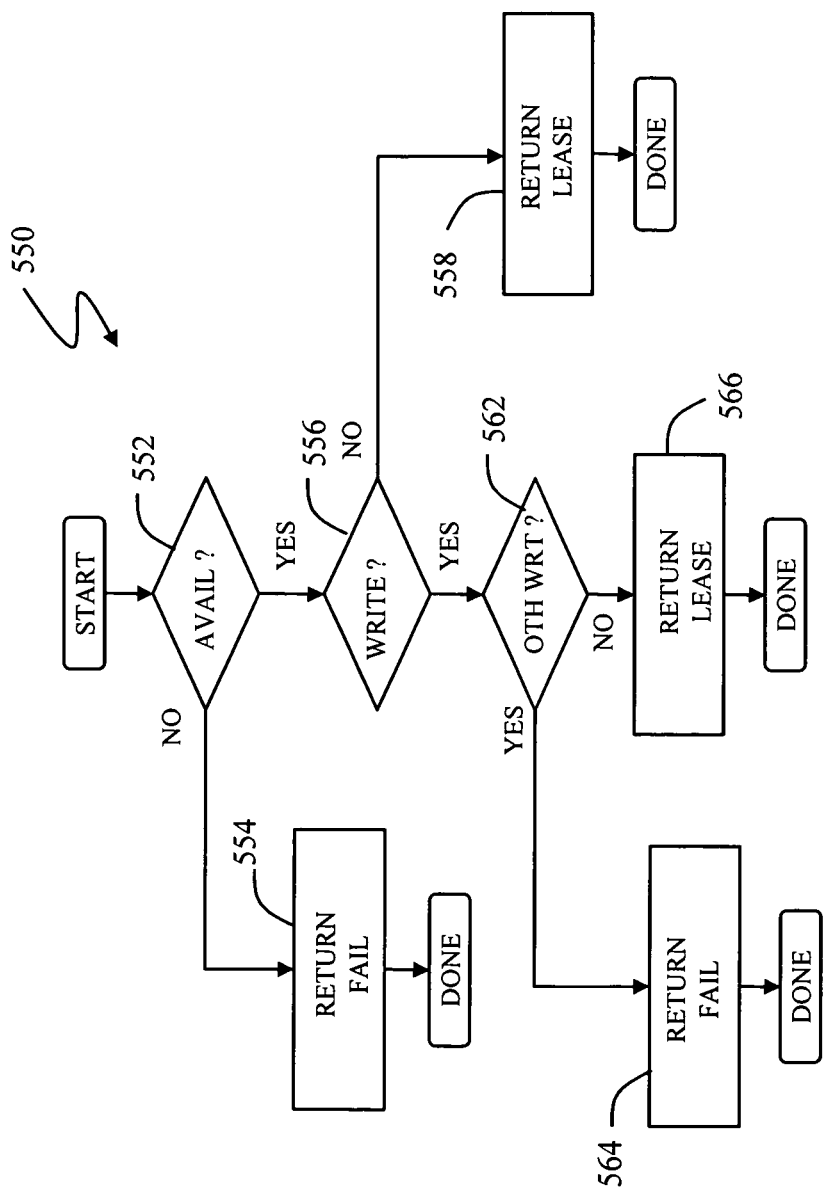
FIG. 31 is a flow chart illustrating steps performed in connection with a metadata server servicing a lease request according to an embodiment of the system described herein.

Referring to FIG. 31, a flow chart 550 illustrates steps performed by the metadata servers 205 in connection with servicing a request for a lease for a file. As discussed elsewhere herein, a lease may be requested by one of the clients 104-106. However, it is also possible for one of the components of the servers 102 to request a lease. It is even possible for one of the metadata servers 405 to request a lease. One of the metadata servers 405 may request a lease in connection with file maintenance (e.g., repairing mirrors), as described in more detail elsewhere herein. In an embodiment herein, leases are maintained by the metadata servers 405 in a table that indicates the entity that has acquired the lease, the type of lease (e.g., read or write), and possibly an expiration time.

In addition, as discussed elsewhere herein, it is possible to perform lease operations on ranges of logical addresses in a file so that, for example, one set of lease operations may be performed on logical addresses A-B for a file while another set of lease operations may be independently performed for logical addresses C-D for the same file, where A-B does not overlap C-D. In a system where only one write lease is issued at a time, it may still be possible for one entity to acquire a write lease for the A-B portion of a file while another independent entity simultaneously acquires a write lease for the C-D portion of the same file. Accordingly, for the discussion herein, in appropriate instances, a reference to a file or files should be understood to include non-overlapping portions of a file or files.

Processing begins at a first test step 552 where it is determined if the requested lease is available. The test at the step 552 determines if the requestor has appropriate security credentials, if the corresponding data file exists, etc. Also, as discussed in more detail elsewhere herein, leases may be purposely made unavailable in certain circumstances. If it is determined at the test step 552 that the lease is not available, then control transfers from the test step 552 to a step 554 where a failure indicator is returned to the requestor. The failure indicator may include a reason for the failure (e.g., improper security credentials, file does not exist, etc.). Following the step 554, processing is complete.

If it is determined at the test step 552 that the requested lease is available, then control transfers from the step 552 to a test step 556 where it is determined if the lease request is for writing data to the file corresponding to the lease. In an embodiment herein, multiple users (e.g., clients, servers) may read from the same file simultaneously while only one user may write to the same file. Accordingly, if it is determined at the test step 556 that a user is not requesting write access, then control transfers from the test step 556 to a step 558 where the metadata servers 405 return the lease (i.e., returns an appropriate indicator/identifier corresponding to granting the lease). In an embodiment herein, leases may also be provided with a predetermined expiration time after which the leases are no longer valid. Lease expirations and lease recalls are discussed in more detail elsewhere here. In addition, leases may be provided along with security credentials (generated, perhaps, by the security manager servers 403) that only allow for the requested operation (e.g., read only, read and write, etc.). The security credentials may also expire at or around the same time that the lease expires in order to enforce lease expirations. Following the step 558, processing is complete.

If it is determined at the test step 556 that the user is requesting a write lease, then control transfers from the test step 558 to a test step 562 where it is determined if another user has already obtained a write lease for the same file. As discussed elsewhere herein, only one write lease at a time is granted for a file. If it is determined at the test step 562 that another write lease has already been granted, then control transfers from the test step 562 to a step 564 where a failure indicator is returned. Just as with the step 562, the failure indicator returned at the step 564 may include information identifying the nature of the failure. Following the step 564, processing is complete. If it is determined at the test step 562 that another write lease has not been granted, then control transfers from the test step 562 to a step 566 where the metadata servers 405 return the lease, possibly along with an expiration. Following the step 566, processing is complete.

As discussed elsewhere herein, it may be desirable in some instances to issue leases with expiration dates. In an embodiment herein, a particular one of the metadata servers 405 may be responsible for a particular file and corresponding file objects. The responsible one of the metadata servers 405 issues leases for the file and corresponding file objects and handles lease expiration processing. The lease information may be stored in appropriate data structures (e.g., table(s), linked list(s), etc.) by the responsible one of the metadata servers 405. In addition, it is possible to have more than one of the metadata servers 405 be responsible for a particular file or set of files, where one of the metadata servers 405 is a primary server and other responsible metadata servers are secondary servers that maintain appropriate information, but do not otherwise provide services unless the primary server fails.

Figure 32:
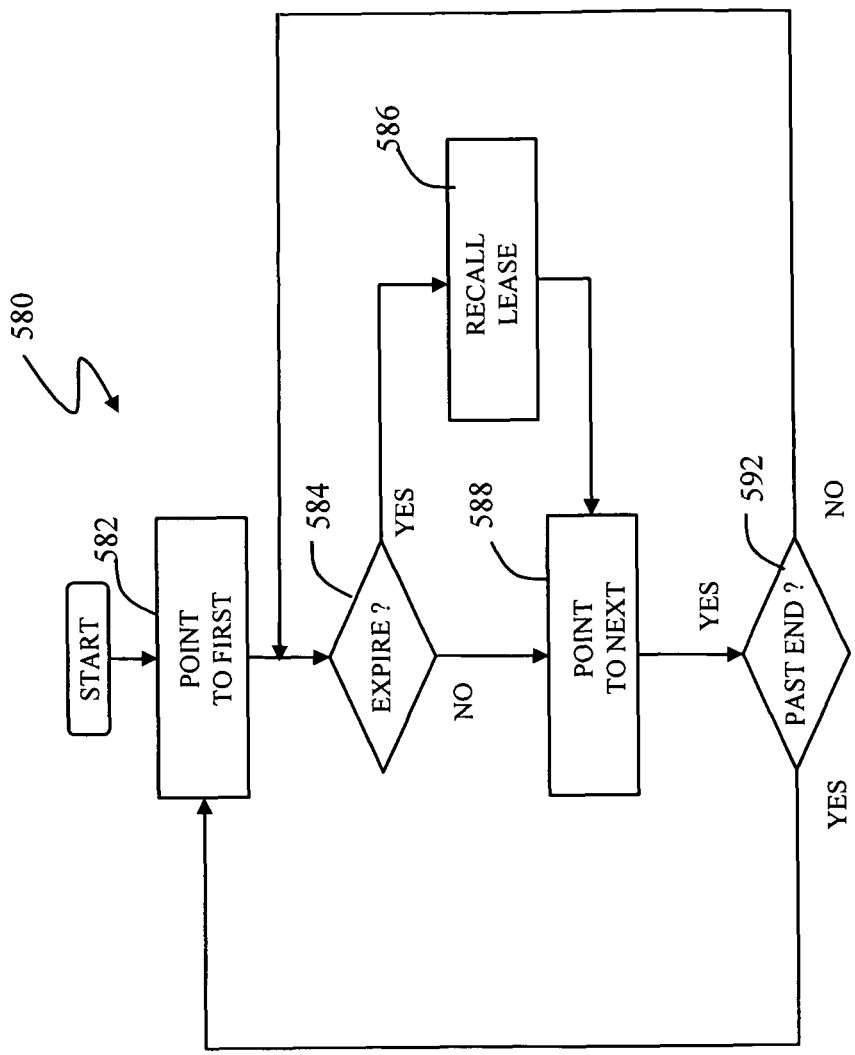
FIG. 32 is a flow chart illustrating steps performed in connection with monitoring and recalling expired leases according to an embodiment of the system described herein.

Referring to FIG. 32, a flow chart 580 illustrates steps performed by a responsible one of the metadata servers 405 in connection with monitoring lease expiration. Processing begins at a first step 582 where a pointer that iterates through all of the leases (file and lease combinations) for which the server is responsible is made to point to the first one. Following the step 582 is a test step 584 where it is determined if the lease has expired. The processing performed at the step 584 may use any appropriate technique, including comparing lease expiration times with the current time. If it is determined at the step 584 that a lease has expired, then control transfers from the step 584 to a step 586 where the lease is recalled. Recalling the lease at the step 586 is discussed in more detail elsewhere herein.

Following the step 586, or following the step 584 if the lease has not expired, is a step 588 where the pointer that iterates through the files and leases for which the server is responsible is incremented. Following the step 588 is a test step 592 where it is determined if the pointer points past the end (i.e., all files and corresponding leases have been processed). If so, then control transfers from the step 592 back to the step 582, discussed above, to reset the pointer to point to the first one and begin another pass to check for expired leases. If it is determined at the step 592 that the pointer does not point past the end, then control transfers from the test step 592 back to the step 584, discussed above, for another iteration.

In an embodiment herein, the system may provide close-to-open consistency where data consistency is provided after an entity has released write access. Said differently, consistency is provided for a file when no entity has an active write lease for the file. Conversely, while any entity has an active write lease, the state of the data may not be guaranteed for any entity reading the data. In the system described herein, leases may be recalled after expiration or may be recalled for other reasons. Recalling the leases may improve the consistency of the data being accessed by other entities.

Figure 33:
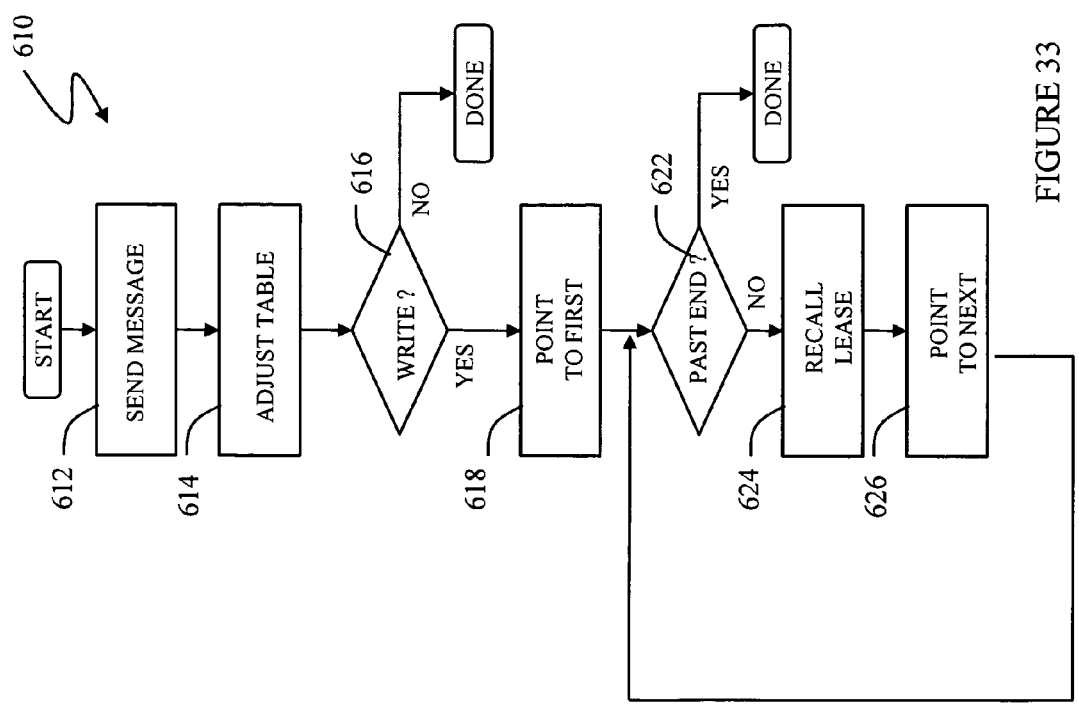
FIG. 33 is a flow chart illustrating steps performed in connection with lease recall processing according to an embodiment of the system described herein.

Referring to FIG. 33, a flow chart 610 illustrates steps performed in connection with a particular one of the metadata servers 405 recalling a lease. Processing begins at a first step 612 where a message is sent to the entity holding the lease (e.g., one of the clients 104-106) to alert the entity that the lease is being recalled. As discussed elsewhere herein, any appropriate entity may hold a lease, including clients 104-106, other servers, or even one of the metadata servers 405. In some embodiments, the step 612 may include ensuring receipt of the message by the entity (e.g., waiting for an acknowledgement) while in other embodiments the message is simply sent and it is assumed that the message is received by any operational recipient. Of course, in systems that wait for an acknowledgement, there may be a timeout and/or a limit on the number of attempts.

Following the step 612 is a step 614 where the appropriate tables are adjusted to reflect that the lease that has been recalled is no longer outstanding. Tables and other data structures used with leases are discussed in more detail elsewhere herein. Following the step 614 is a test step 616 where it is determined if the lease that was recalled was a write lease (lease to allow writing data). As discussed elsewhere herein, the system may provide close-to-open consistency so that, when a write lease is released, data reads are made consistent. This may be facilitated by recalling all read leases when a write lease is recalled. Entities for whom a read lease is recalled may flush their internal buffers prior to reacquiring the read lease after the recall. Note, by the way, that an entity for which a write lease is recalled may also flush buffers by writing unsaved data to the physical storage 414 (through the data storage servers 407) in response to receiving a recall notification. Accordingly, in some embodiments, an entity receiving a recall message for a write lease may be provided with a certain amount of time in which to write any unsaved data to physical storage. For this purpose, the security credentials provided along with a write lease may be set to expire a predetermined amount of time after the write lease expires.

If it is determined at the step 616 that the lease that is being recalled is not a write lease, then processing is complete. Otherwise, control transfers from the test step 616 to a step 618 where a pointer, used to iterate through all of the outstanding leases for the file for which the write lease is being recalled, is made to point to the first outstanding lease. Following the step 618 is a test step 622 where it is determined if the pointer points past the end (i.e., all outstanding leases have been recalled). If so, then processing is complete. Otherwise, control transfers from the test step 622 to a step 624 where the lease is recalled. The lease may be recalled by calling the processing illustrated by the flow chart 610, and thus may be recursive. Following the step 624 is a step 626 where the pointer used to iterate through entities having outstanding leases for a file is incremented. Following the step 626, control transfers back to the step 622 for another iteration.

Figure 34:
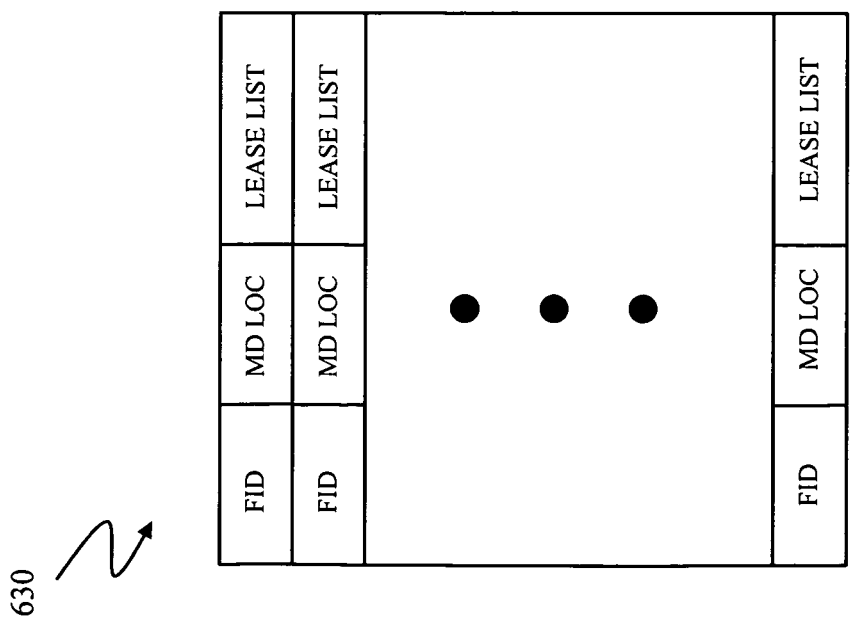
FIG. 34 is a table illustrating data maintained for files handled by a metadata server according to an embodiment of the system described herein.

Referring to FIG. 34, a table 630 is shown as including a plurality of entries used to keep track of files for which a particular one of the metadata servers 405 is responsible. Of course, other appropriate data structures may be used instead of the table 630, such as a linked list, a doubly linked list, etc. Each primary one of the metadata servers 405, and any corresponding secondary one(s) of the metadata servers 405, may contain data corresponding to specific file sets for which the particular one(s) of the metadata servers 405 are responsible. Thus, for example, a first primary one of the metadata servers 405 may contain a version of the table 630 for a first set of files for which the first primary one of the metadata servers is responsible while a second primary one of the metadata servers 405 may contain a completely different version of the table 630 for a second (different) set of files for which the second primary one of the metadata servers 405 is responsible.

Each entry of the table 630 includes a file identifier field (FID) that uniquely identifies the file corresponding to an entry. In an embodiment herein, the FID field may be the object id of the metadata object for the file (for example, the metadata object 132 in the diagram 130 of FIG. 4). Note that, as discussed elsewhere herein, the metadata object for a file may be used to locate all of the other data objects for the file.

The MD LOC field may describe the data storage location of the metadata object for the file. In an embodiment herein, the MD LOC field may contain an identifier for the one of the data storage servers 407 that stores the metadata object for the file. The MD LOC field may also contain a unique identifier (perhaps initially assigned by the one of the data storage servers 407) that may be used to retrieve and store data at the one of the data storage servers 407.

The LEASE LIST field may contain information about all entities that have active leases outstanding for the corresponding file. In an embodiment herein, the LEASE LIST field may contain a pointer to a linked list of elements that corresponding to entities having outstanding leases. Of course, any other appropriate data structure (e.g., array) may be used.

Figure 35:
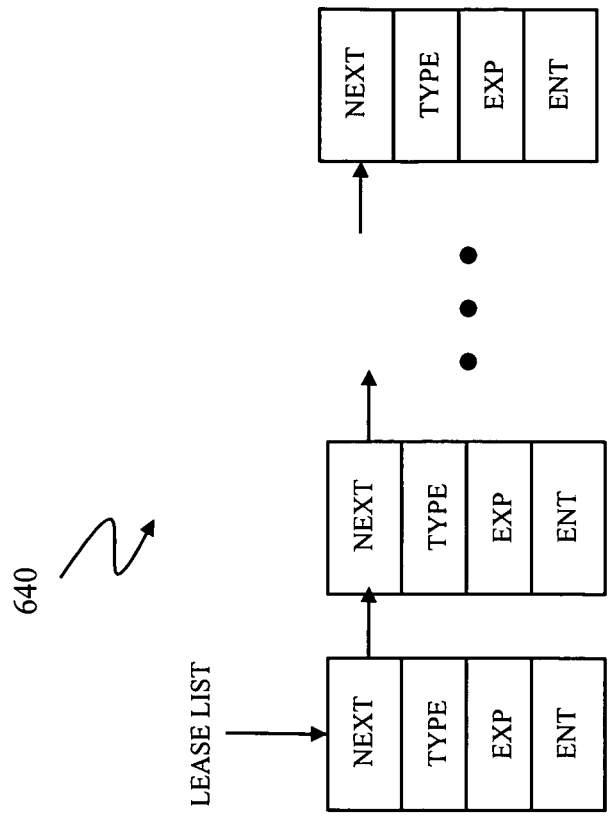
FIG. 35 illustrates a linked list for file leases handled that are by a metadata server according to an embodiment of the system described herein.

Referring to FIG. 35, a diagram 640 illustrates a linked list that may be used to keep track of entities having an outstanding active lease for a file. Each element of the list contains a NEXT field that points to the next element in the list. The element at the end of the list contains a null indicator. Thus, the list may be traversed by starting with the element pointed to by the LEASE LIST pointer and subsequently pointing to the elements pointed to by the NEXT field. (e.g., in connection with the processing illustrated in the flow chart 580 of FIG. 32). Similarly, conventional linked list operations may be used to add and remove elements.

Each element of the list also contains a TYPE field that indicates the type of lease (e.g., read or write) and includes an EXP field that indicates when the lease corresponding to the element expires. Each element also contains an ENT field that indicates the entity (e.g., one of the clients 104-106, another server, etc.) that holds the corresponding lease.

Manipulation of the linked list is fairly straight-forward. When a lease is granted, fields of an element are populated with the type, expiration, and entity corresponding to the lease and the element is then added to the list. Similarly, when a lease is recalled or otherwise returned, the corresponding element is removed from the list. Of course, other data structures may be used instead of a linked list.

Referring to FIG. 36, a table 650 is shown as containing a plurality of entries that correlate object identifiers (OID) with location information (LOC). In an embodiment herein, object identifiers are a numerical value. Each of the metadata servers 405 may be provided with a unique range of object identifiers and/or set of ranges to use/manage. Managing many small sets of ranges has the advantage of allowing ranges to be allocated and/or transferred as needed. In some embodiments, object identifiers may be reused while in other embodiments object identifiers are not reused. Of course, in instances where object identifiers are not reused, each of the metadata servers 405 needs to be provided with a sufficient range of useable object identifiers.

The LOC field is like the MD LOC field for the table 630. The LOC field describes the data storage location of the corresponding object. In an embodiment herein, the LOC field may contain an identifier for the one of the data storage servers 407 containing (handling) the object as a unique identifier (perhaps assigned by the one of the data storage servers 407) that may be used to retrieve and store data for the object. Thus, if one of the metadata servers 405 has a table entry for a particular object, an entity can pass the object identifier to the one of the metadata servers 405 and receive in return the corresponding LOC information to allow the entity to access the appropriate one of data storage servers 407 directly.

Having a number of metadata servers 405 allows for distributed servicing of file operations (and thus significant scalability) as well as providing failover/redundancy capability. In some instances, objects may be reassigned from one of the metadata servers 405 to another. However, since each of the metadata servers 405 contains information for only a subset of files (and corresponding file objects), it may be necessary to provide a mechanism for locating an appropriate one of the metadata servers 405 in connection with performing operations.

The metadata location servers 408 provide location services for an entity seeking the appropriate one of the metadata servers 405 for operations on a particular file. In an embodiment herein, each of the metadata location servers 408 may receive a call having an object identifier and can return a specific one of the metadata servers 405 that handles the particular object. In addition, as discussed in more detail elsewhere herein, the metadata location servers 408 may assist in connection with the creation of new objects by indicating to a calling entity (e.g., one of the clients 104-106) a specific one of the metadata servers 405 to be used for the new object. The metadata servers 408 may operate like Domain Name Servers on the Web, and each of the clients 104-106 (and other entities) may be provided with a primary and a secondary one of the metadata location servers 408 to consult.

Referring to FIG. 37, a table 670 is shown as containing entries for use by one of the metadata location servers 408. Each entry includes an OID RANGE field, which indicates a range of object identifiers, and an MDS ID field, which identifies a particular one of the metadata servers 405, or possibly a group of the metadata servers 405, with one being primary and the remainder being secondary. An entity may provide a particular object identifier to the metadata location server 408, which may then consult the table 670 and return the corresponding value from the MDS ID field.

In addition, the metadata location servers 408 may assign a particular one of the metadata servers 405 in connection with creation of a new object. The assignment may be based on any appropriate metric, including random assignment, assignment based on geographic proximity, load balancing, and/or a policy input by a user through the user management interface 412, discussed above. A policy may indicate, for example, that new objects created by a particular client are provided on a particular metadata server.

Referring to FIG. 38, a flow chart 680 illustrates processing by one of the metadata location servers 408 to assign a particular one of the metadata servers in connection with creation of a new file object. Processing begins at a first step 682 where the policy may be consulted. As discussed elsewhere herein, it may be possible to input policies through the user management interface 412. The policies may dictate (directly or indirectly) which of the metadata servers 405 are to be used for which of the clients 104-106. Note that other policies are possible. For example, the policies may indicate which of the metadata servers 405 are to be used at different times of the day (independent of the clients 104-106) or based on the load, the user, etc. The policy information may be stored at the user management interface 412 and accessed in connection with the step 682, or may be stored at the one of the metadata location servers 408 after having been previously passed thereto. Following the step 682 is a step 684 where identification information for a specific one of the metadata location servers 405 is returned to the calling entity. Following the step 684, processing is complete.

Figure 39:
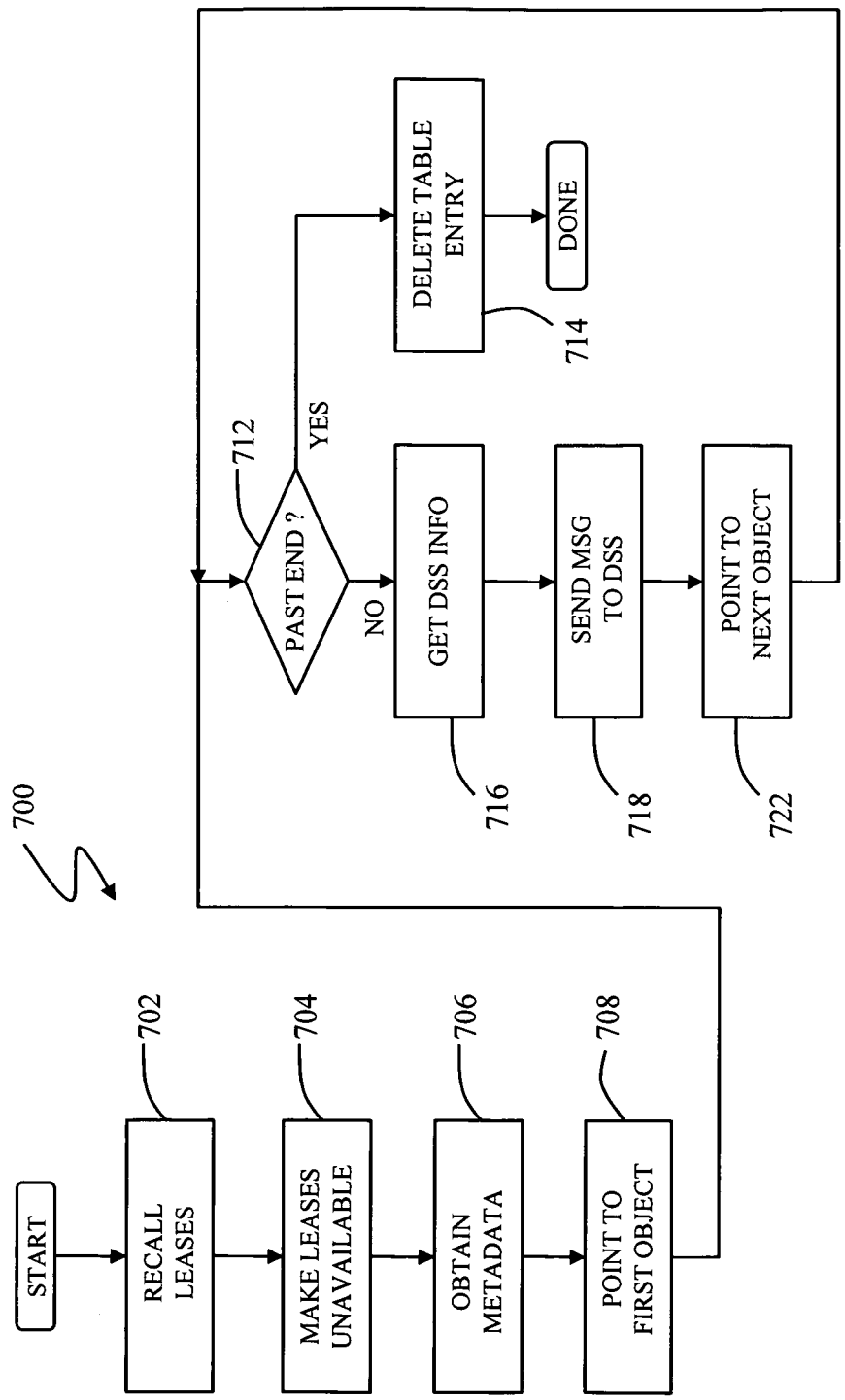
FIG. 39 is a flow chart illustrating processing performed by a metadata server in connection with deleting a file according to an embodiment of the system described herein.

Referring to FIG. 39, a flow chart 700 illustrates steps performed by one of the metadata servers 405 in connection with deleting a file for which the one of the metadata servers 405 is responsible. Processing begins at a first step 702 where all leases for the file are recalled (e.g., by iterating through the lease list 640 and providing recall processing like that illustrated by the flow chart 610 of FIG. 33). Following the step 702 is a step 704 where the leases are made unavailable for other processes (e.g., by setting an appropriate flag that prevents granting further leases for the file). Following the step 704 is a step 706 where the metadata for the file is obtained (e.g., by retrieving the metadata object for the file). Note that, as discussed elsewhere herein, the metadata object for a file contains information about the location of all the file objects used in connection with the file.

Following the step 706 is a step 708 where a pointer, used to iterate through the objects used in connection with a file, is made to point to the first object. The pointer and subsequent iterative processing uses information obtained at the step 706 to determine the objects for the file. Following the step 708 is a test step 712 where it is determined if the pointer, used to iterate through the objects, points past the end (i.e., all of the file objects have been processed). If so, then control transfers from the test step 712 to a step 714 where the table entry corresponding to the file (i.e., the entry in the table 630 of FIG. 34) is deleted (e.g., set to null). Following the step 714, processing is complete.

If it is determined at the step 712 that there are more file objects to process, then control transfers from the step 712 to a step 716 where the LOC information is obtained for the object. The LOC information is like the information stored in the table 650 of FIG. 36, discussed above. In some instances, the LOC information will be local to the one of the metadata servers 405 performing the processing. In other instances, it may be necessary to call one of the metadata location servers 408 to get the location information for the object. Following the step 716 is a step 718 where a message is sent to the appropriate one of the data storage servers 407 (i.e., the one handling the object) to cause the object to be deleted.

In an embodiment herein, it may be possible for different files to use the same object (e.g., deduplication, file aliasing, etc.), in which case the one of the data storage servers 407 would simply decrement a counter for the object indicating the number of users thereof. When the counter is decremented to zero, the data storage server may delete the data corresponding to the object. Note that the object(s) associated with a file may be deleted asynchronously. Following the step 718 is a step 722 where the pointer used to iterate through the file objects is incremented. Following the step 722, control transfers back to the step 712, discussed above, for another iteration.

Referring to FIG. 40, a flow chart 740 illustrates steps performed by one of the metadata servers 405 in connection with creating a new file. Note that, prior to performing the processing illustrated in FIG. 40, the entity creating the file (e.g., one of the clients 104-106) may first consult the metadata location servers 408 to determine the proper one of the metadata servers 405 to use to create the file.

Processing begins at a first step 742 where the policy manager servers 402 are consulted to obtain policy information for new files (e.g., new files for client X have a mirror geographically located at least a certain distance from the primary data set). Following the step 742 is a step 744 where the resource manager servers 406 are consulted to determine the available resources to meet the dictates of the policy obtained at the step 742. Following the step 744 is a test step 746 where it is determined if it is possible to meet the dictates of the policy given the available resources. For example, it may not be possible to satisfy the policy of having geographically separated mirrors if all of the remaining physical storage in a system is in one geographic location. If it is determined at the test step 746 that it is not possible to fulfill a policy, then control transfers from the test step 746 to a step 748 where alternative processing is performed. Any appropriate processing may be performed at the step 748, including returning an error indicator to the calling entity, creating the file with the next best available resources, etc. Following the step 748, processing is complete.

If it is determined at the step 746 that it is possible to fulfill the policy with available resources, then control transfers from the test step 746 to a step 752 where the metadata object for the file is created. Creating the metadata object may include populating the data fields of the metadata object and obtaining storage from an appropriate one of the data storage servers 407. In an embodiment herein, the data storage servers 407 may be a pool and, absent any other specific requirements, may provide storage space at any appropriate portion of the physical storage 414 upon request. The metadata objects created at the step 752 will be like those described herein. See, for example, FIGS. 4-8 and the corresponding description. Following the step 752 is a step 754 where a table entry is created in the table 630 for the new file. Following the step 754 is a step 756 where the object id of the metadata object for the file is returned to the calling entity. Following the step 756, processing is complete.

As discussed elsewhere herein, when a client or other entity unsuccessfully attempts a write operation, a message (update) is sent to the servers 102 by the client or other entity. Similarly, a message (update) may also be sent to the servers 102 in connection with finding a stale mirror in connection with a synchronous mirror copy (see the step 358 of the flow chart 350 of FIG. 13), and/or writing to data having an asynchronous mirror.

Referring to FIG. 41, a flow chart 760 illustrates steps performed by one of the metadata servers 405 in connection with handling a message that a write operation was unsuccessful. Processing begins at a first step 762 where all of the leases for the file are recalled. Following the step 762 is a step 764 where leases for the file are made unavailable. Following the step 764 is a step 766 where new storage space is allocated to replace the old storage space to which the write operation was unsuccessful. Following the step 766 is a step 768 where the appropriate information in the metadata object for the file is adjusted. Following the step 768 is a step 772 where a data copy operation is begun to repopulate the new data storage space with, for example, data from one of the mirrors. While the data copy operation is being performed, the data may be indicated as being stale at the step 772. Of course, if there are no mirrors or other data that can be used to repopulate the new storage space, then the processing at the step 772 would not be performed. Following the step 772 is a step 774 where the leases for the file are made available. Following the step 774, processing is complete.

Figure 42:
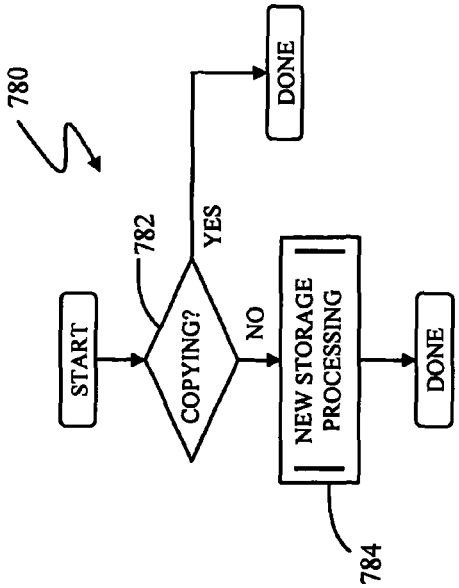
FIG. 42 is a flow chart illustrating processing performed by a metadata server in connection with responding to a stale mirror update message according to an embodiment of the system described herein.

Referring to FIG. 42, a flow chart 780 illustrates processing preformed in connection with one of the metadata servers 405 receiving an indication that a synchronous mirror was stale. Processing begins at a first test step 782 where it is determined if the mirror is currently in the process of being populated with data (perhaps in connection with a previous bad write operation). If so, then the data population operation is allowed to continue and processing is complete. Otherwise, control transfers from the test step 782 to a step 784 where processing like that illustrated in the flow chart 760 of FIG. 41, discussed above, is performed. Following the step 784, processing is complete.

Figure 43:
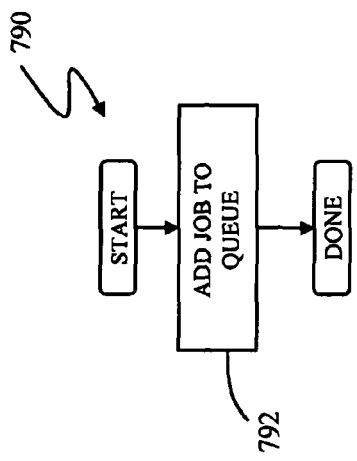
FIG. 43 is a flow chart illustrating processing performed by a metadata server in connection with adding an asynchronous copy job to a queue according to an embodiment of the system described herein.

Referring to FIG. 43, a flow chart 790 illustrates steps performed in connection with the servers 102 receiving a message that an object with asynchronous replicas has been updated and, thus, the asynchronous replicas need to be updated. Processing begins at a first step 792 where information is added to a queue (e.g., a job queue provided at the affected one of the metadata servers 405) indicating that asynchronous data needs to be copied. As discussed in more detail elsewhere herein, a process at each of the metadata servers 405 services the corresponding queue. Following the step 792, processing is complete.

Figure 44:
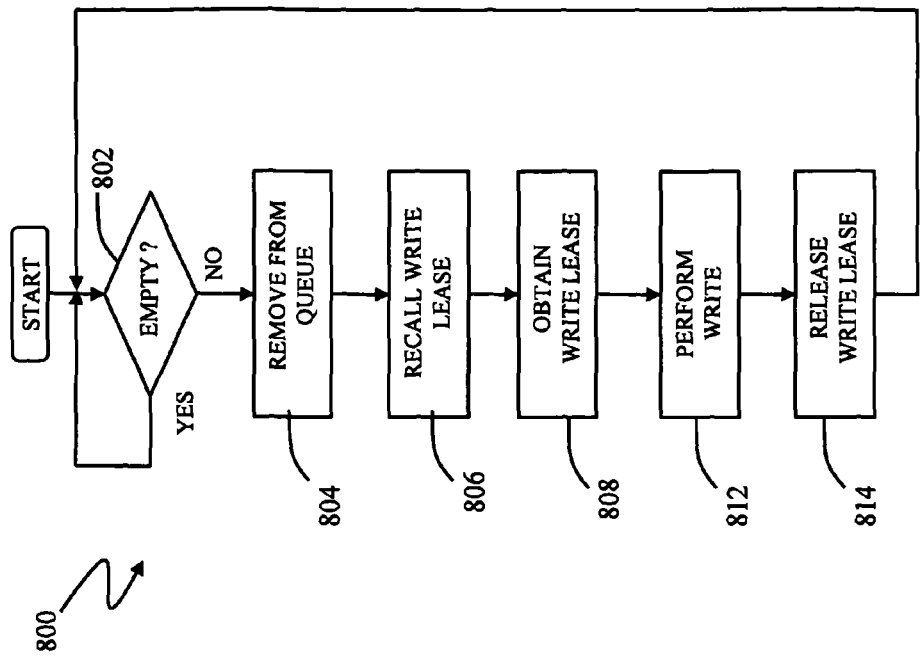
FIG. 44 is a flow chart illustrating processing performed by a metadata server in connection with servicing an asynchronous copy job according to an embodiment of the system described herein.

Referring to FIG. 44, a flow chart 800 illustrates processing performed by a process at each of the metadata servers 405 that services the corresponding queue that is populated by the processing illustrated by the flow chart 790 of FIG. 43. Processing begins at a first test step 802 where it is determined if the queue is empty. If so, then control transfers back to the test step 802 to continue to poll the queue. If the queue is not empty, then control transfers from the test step 802 to a step 804 where the next entry in the queue is removed. In an embodiment herein, queue elements may be processed on a first in first out basis. However, it is also possible to selectively remove elements from the queue in any order. For example, elements associated with files that receive higher priority may be removed before other elements (e.g., in connection with a flush operation for the file). As another example, elements may be removed according to size (of needed write operation) or according to any other appropriate criteria.

Following the step 804 is a step 806 where the write lease for the affected file is recalled. Following the step 806 is a step 808 where the write lease is obtained. Following the step 808 is a step 812 where the write operation is performed to write the asynchronous data to the mirror. Following the step 812 is a step 814 where the write lock is released. Following the step 814, control transfers back to the step 802 to continue to poll the queue.

In some instances, it may be desirable to deploy services to provide additional functionality. Such services include data immutability, RAID (including software erasure coding techniques), versioning, snapshots, backup, asynchronous replication for Disaster Recovery (DR), asynchronous space reclamation, object encryption, data-at-rest-encryption, data compression, green/spindown services, auto-deletion of objects based on object age, and others. As described in more detail elsewhere herein, the policy management system may be expanded to provide a unified framework for such services and any other services that may be desired.

In an embodiment herein, the policy management system may be used to annotate metadata objects which are then accessed by other services to perform operations related to the data. For example, the policy manager servers 402 may be used to propagate a policy whereby data objects of a certain class and a certain age are archived by annotating the metadata objects corresponding to the selected data objects so that a service that performs the archiving locates and archives the objects. Note that it is possible to invoke the service at the time the annotation is being performed (e.g., to archive the objects at the time the objects are selected for archiving). In other cases, the policy manager servers 402 may annotate metadata for an object and the corresponding service may be invoked asynchronously at a later time.

It is possible to provide policy descriptors that may be used as templates for specific policy instances. For example, a specific policy definition may be provided for compliance to a particular government regulation or in connection with a company-wide data handling policy. Users and/or administrators may then create policy instances by assigning one or more policy descriptors to particular data objects (e.g., those data objects that meet a particular criteria).

Note that, as discussed elsewhere herein, appropriate credentials need to be provided by the processes used to annotate metadata objects and/or perform related services. Thus, for the discussion herein, it may be assumed that appropriate credentials are used in connection with registering policy instances, performing services associated with policy instances, etc. In some embodiments, users/administrators that provide policy descriptors may have a higher level of authority than users/administrators that provides specific policy instances. Thus, for example, a first user/administrator with a relatively high level of authority may provide a specific policy descriptor for complying with government HIPAA requirements while other users/administrators, each possibly having a relatively lower level of authority than the first user/administrator, may provide specific policy instances corresponding to the HIPAA policy descriptor and may cause those policy instances to be applied to particular data.

It is possible for the policy manager servers 402 to interact with the resource manager servers 406 to ascertain if there are sufficient resources available prior to annotating metadata for a particular service. For example, the resource manager servers 406 may indicate to the policy manager servers 402 that there is no service that archives data, in which case the policy manager servers 402 may return an error when a user/administrator attempts to provide a policy instance that causes data objects to be archived. In other embodiments, the policy manager servers 402 may annotate metadata irrespective of whether corresponding services currently exist, in which case the metadata may remain annotated waiting for a future time when a corresponding service is provided.

Figures 45, 46:
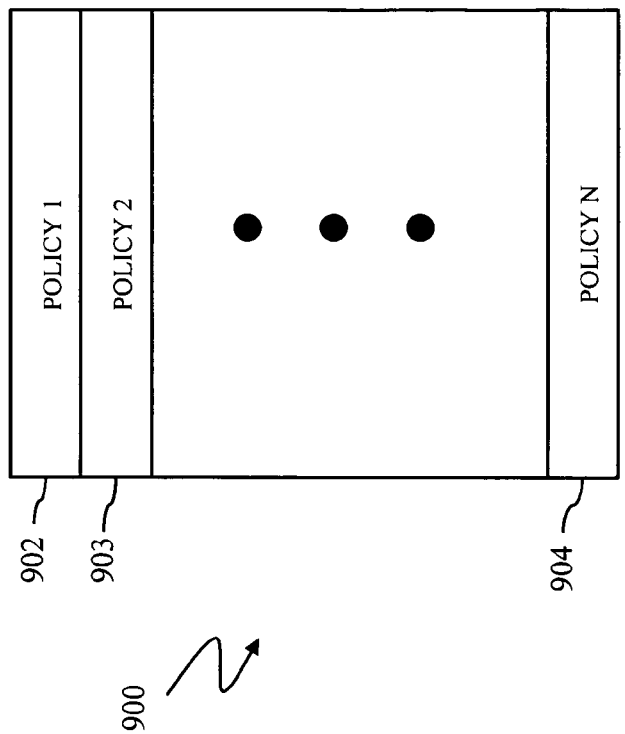
FIG. 45 is a diagram illustrating a table of policy instances according to an embodiment of the system described herein.
FIG. 46 is a diagram illustrating a policy instance in detail according to an embodiment of the system described herein.

Referring to FIG. 45, a table 900 includes a plurality of policy instances 902-904 that may be used to provide expanded functionality to the system described herein. The table 900 may be maintained and used by one or more of the policy management servers 402. The contents of the table 900 may be specified by one or more users through the user management interface 412 using appropriate specification techniques, such as providing a command file, using a GUI to select and specify options, etc. In an embodiment herein, the policy management servers 402 handle management and use of the table 900. However, in other embodiments, it is possible to shift at least some of the functionality described herein to other ones of the servers 102 and/or possibly to processors/servers outside of the servers 102.

Referring to FIG. 46, the policy instance 902 is shown as including a plurality of fields, such as an object definition field, a service type field, an action field, an SLO (service level objective) field, a trigger event field, an object count limit field, and an armed field. In an embodiment herein, the policy instances 902-904 may be generated from policy descriptors that may or may not specify initial values for some or all of the fields. The policy instances 902-904 may be generated using a policy descriptor and modifying some or all of the initial field values. In some embodiments, policy descriptors may be loaded, cached, and later consulted by the policy management servers 402 to deploy policy instances. The policy management servers 402 may be directed to reload policy descriptors when the corresponding service(s) need to be re-configured, or to unload the policy descriptor when the corresponding service(s) are taken down.

The object definition field may define an object set that includes zero or more objects. The set may be defined as $\{x|P(m(x))\}$, where x is a storage object, $m(x)$ is metadata for x, including both system and extended attributes, and $P(m(x))$ is a predicate that, when evaluated as true for a particular object, indicates that the object belongs to the set. Thus, object sets are defined in terms of metadata attributes, and it is fairly straightforward to determine whether a particular object is part of the object set or not (i.e., whether $P(M(x))$ is true or false). Users and applications may control object set membership programmatically by way of creating/modifying object's metadata through standard APIs (e.g. POSIX setxattr( ), lsetxattr( ), and fsetxattr( ) APIs). Storage systems that allow for extended sets of user/application-defined object metadata (a.k.a. extended attributes) may enable rich collections of object sets, and thus provide users/applications with the means of flexible and dynamic control over object sets.

In an embodiment herein, the policy manager servers 402 act as selectors that use the predicate (regular expression) $P(M(x))$ to select or reject objects for which corresponding services(s) are to be provided. Thus, for example, the policy instance 902 may have a $P(M(x))$ indicating that all email messages created by an email application are archived six months after creation. In such a case, the policy manager servers 402 would interact with the metadata servers 405 to obtain appropriate information about objects and annotate appropriate objects for archiving.

The service type field may be used to indicate that the service is interested in a certain subset of system lifecycle events. Some services, such as replication and erasure coding for instance, may need to be notified of system events that affect data durability, availability, and integrity. Such events include system component and system service faults and failures, as well as maintenance events for system services and components. These events may not need to be specified explicitly, provided that the service type is specified. Some pre-defined service types may include data protection, compliance (e.g. retention and deletion), and security (e.g. encryption). Other service types may be referred to as external.

The action field indicates the service(s) to be invoked in connection with invoking the policy instances. In some instances, the service may be provided by a service designer, who might be an end user. In other embodiments, the service may be already provided by the system. In an embodiment herein, the particular services(s) that may be invoked are not restricted. The action field may include a section that contains service-specific parameters that are used to configure the service functional module. Examples of services include services for data protection, availability and integrity, e.g. synchronous replication, data immutability, RAID (including software erasure coding techniques), versioning, snapshots, backup, and services that improve application performance and take on some aspects of application functionality, e.g. asynchronous space reclamation, object encryption, and auto-deletion of objects based on object age.

The SLO field provides information regarding the service level objective of the user, and indicates the relative importance of the services, as well as shares of system resources the services are allowed to consume, so that an infrastructure provider has the information necessary to properly schedule the services. Additionally, the SLO may specify the order (priority) in which multiple services execute. Use of the SLO field is described in more detail elsewhere herein.

The trigger event field indicates an event that causes the corresponding service to be invoked. Examples of trigger events include object lifecycle and object access related events (create, open, data read/write, metadata, including attributes read/write, ACL changes, close, delete), events generated on a pre-defined schedule (in which case, the schedule may become a part of the policy definition), events that describe changes in the state of the storage system (faults, load changes, utilization thresholds, component failure events, etc.) as well as events that are asynchronous with respect to the internal storage system activities (external to the system), and that are delivered through the user management interface 412 (or a similar/related mechanism) along with the indication of the object set the event relates to (e.g. using the predicates P(M(x)) discussed above).

The object count limit field indicates a maximum number of objects per invocation that may be provided in connection with invoking a service. Although it is possible to invoke a service once for each object, it may be more efficient to pass one or more references to multiple objects in connection with a single service invocation. However, in some cases, there may be a maximum number of objects (or references thereof) that may be passed in a single service invocation. The object counts field may indicate that maximum number. In other embodiments and/or in some policy instances, the object count field is not used at all.

The armed field contains a Boolean value indicating whether or not the policy is in force. When the armed field is true for a particular policy instance, the service(s) corresponding to the particular policy instance are invoked. When the armed field is false, the service(s) are not invoked. Use of the armed field is described in more detail elsewhere herein.

Note that, in some embodiments, it is possible to use UUID's to identify various components, such as policy instances, object sets, etc. Using UUID's may facilitate avoiding collisions.

Figure 47:
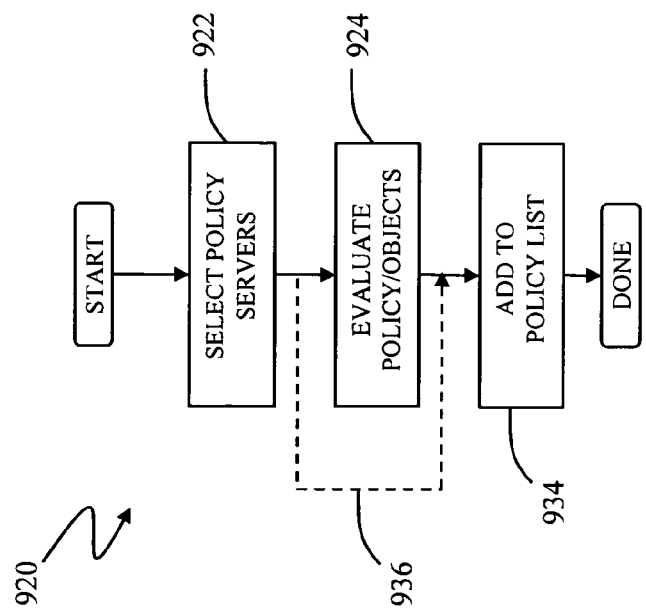
FIG. 47 is a flow chart illustrating processing performed in connection with registering policy instances according to an embodiment of the system described herein.

Referring to FIG. 47, a flow chart 920 illustrates steps performed in connection with creating a new policy instance. As discussed elsewhere herein, a specific policy instance may be initiated using one of a plurality of policy templates. For example, a user desiring to provide a snapshot service may start with a policy descriptor that contains initial values in the fields corresponding to providing snapshot services. The user could then modify some of the fields, such as the object definition field and the trigger field, to provide a particular snapshot policy instance. At least some of the policy instance information may be provided through the user management interface 412. The information may be provided in any appropriate form, including a command/text file or through an appropriate graphical user interface.

Processing begins at a first step 922 where a one or more of the policy manager servers 402 is selected to provide the services specified by the policy instance being specified. In an embodiment herein, one of the policy manager servers 402 may be selected as a primary policy server to provide services for a particular policy instance while another one of the policy manager servers 402 may be selected as a backup policy server to provide policy services if the primary policy server fails. Of course, other configurations are possible, including having multiple ones of the policy manager servers 402 share processing for a single policy instance. In an embodiment herein, one of the resource manager servers 406 may select which of the policy manager servers 402 to use for the primary policy server and the backup policy server using appropriate criteria, such as the proximity of objects stored in the object definition. In other embodiments, the user may select specific ones of the policy manager servers 402 in connection with specifying the policy instance.

Following the step 922 is a step 924 where the new policy instance is evaluated to determine the objects that correspond to the policy instance. This is discussed in more detail elsewhere herein.

Following the step 924 is a step 934 where the policy instance is placed in a list of policy instances that are processed by the particular one of the policy manager servers 402 handling the policy instance. In an embodiment herein, the list of policy instances may be ordered according to the relative ordering provided in the SLO field (if any) in each of the policy instances managed by a policy server. Alternatively, the policy instances may be placed in a list in any order, and the SLO field may be examined and used for ordering the policy instance services at the time the services for the policy instances are provided. Alternatively still, the information from the SLO field may be used by the service provider(s) to control service ordering in any manner that is appropriate for a particular service or group of services. Following the step 934, processing is complete.

In some embodiments, it is possible to forgo evaluating a policy when the policy is first added. For example, it may be possible to initially add a new policy and then evaluate that policy at a later time, such as when a particular event occurs or when objects are added. This illustrated by an alternative path 936, which provides that control transfers from the step 922 to the step 934 without executing the step 934.

Figure 48A:
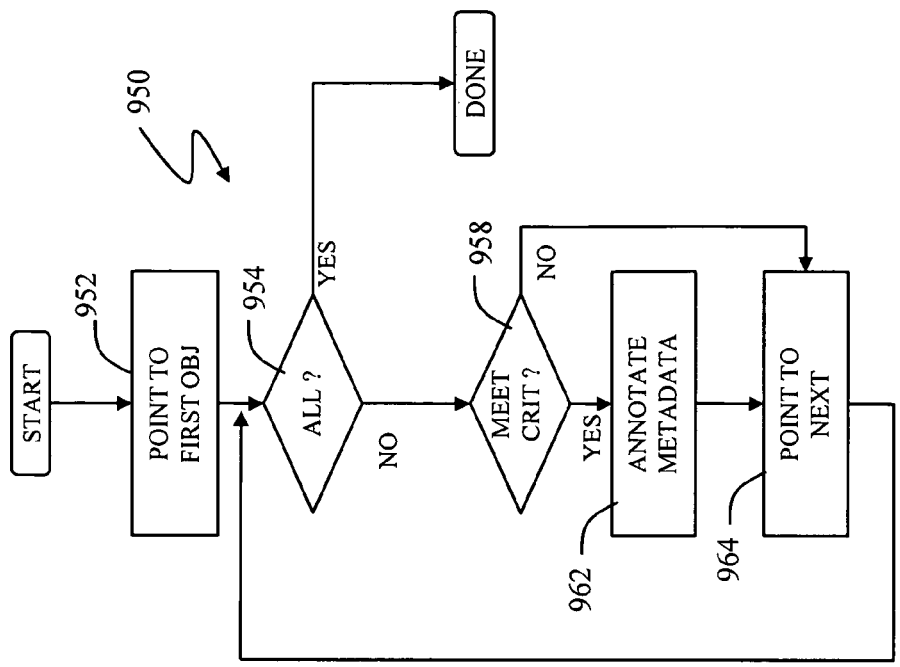
FIG. 48A is a flow chart illustrating iterating through objects to annotate for a service according to an embodiment of the system described herein.

Referring to FIG. 48A, a flow chart 950 illustrates selecting objects corresponding to an object definition field of a policy instance. The processing illustrated by the flow chart 950 iterates through a set of objects to determine if one or more of the objects should be annotated for inclusion with a particular service. This may be useful, for example, when a new service is added or an existing service is modified. See, for example, the step 924 in the flow chart 920, discussed above.

Processing begins at a first step 952 where a pointer, used to iterate through all of the objects being tested for inclusion, is set to point to the first one of the objects. Following the step 952 is a test step 954 where it is determined if the pointer has iterated through all of the objects being tested. If so, then processing is complete. Otherwise, control transfers from the test step 954 to a test step 958 where it is determined if the particular object (object metadata) being pointed to by the pointer used to iterate through all of the objects meets the criteria set forth in the object definition field for the policy instance (i.e., if P(m(x)) is true, as discussed elsewhere herein). If so, then control transfers from the test step 958 to a step 962 where the metadata for the object is annotated for inclusion of the object in the object set that will be processed when the corresponding service is invoked. Note that, in some embodiments, it is also possible to cause the object (object metadata) to point to the policy instance at the step 962. Having each object point to corresponding policy instance(s) is an optimization that may facilitate processing for the system. In addition, it is also possible at the step 962 to have a component that manages the object being annotated subscribe to a trigger event that is specified for the policy instance being registered. Subscribing to a trigger event causes the policy instance to be reevaluated and/or the corresponding service to be invoked whenever the trigger event occurs. For example, if a service is to be invoked whenever a particular portion of the storage system changes state (e.g., transitions from off-line to on-line), then subscribing to the trigger event at the step 962 causes the managing component to receive an appropriate notification when the state change occurs. In an embodiment herein, trigger event notifications may be provided by appropriate ones of the servers 102 that handle parts of the system relating to the events. Thus, for example, if a trigger event relates to changes in object metadata, then the event notification may be provided by one or more of the metadata servers 405. Alternatively, if the trigger event is periodic (e.g. perform service x every hour), then event notifications may be provided by one or more of the servers 102 that maintain periodic scheduling information/time. In some instances, it may be possible for trigger events to relate, at least in part, to data outside the servers 102 (e.g., a service that is performed when a UPS indicates a power outage).

Following the step 962 is a step 964 where the pointer that iterates through the objects is incremented. Following the step 964, control transfer back to the test step 954 for another iteration. Note that the step 964 may also be reached directly from the test step 958 if the object (object metadata) being examined does not meet the criteria set forth in the object definition field for the policy instance (i.e., $P(m(x))$ is false).

Figure 48B:
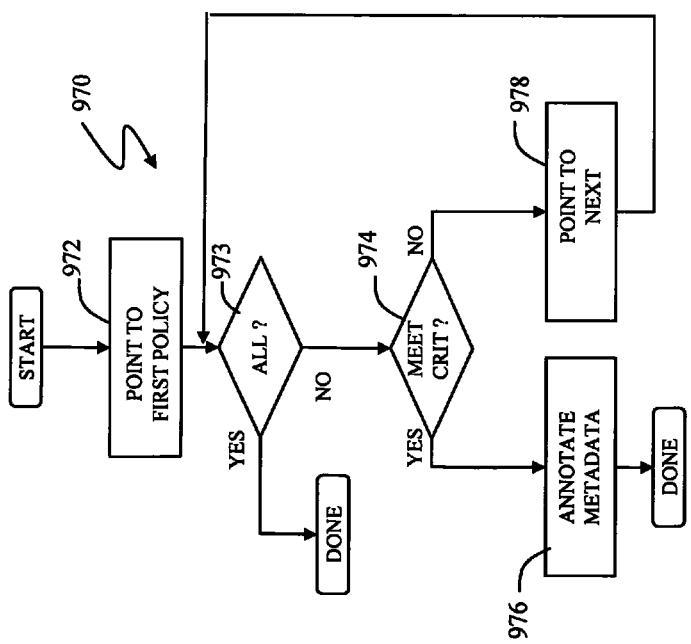
FIG. 48B is a flow chart illustrating iterating through services to annotate an object for a service according to an embodiment of the system described herein.

Referring to FIG. 48B, a flow chart 970 illustrates annotating object metadata that corresponds to an object definition field of a policy instance. The processing illustrated by the flow chart 970 iterates through a set of policies (possibly all policies) to determine if a particular object should be annotated for inclusion with a service according to a policy definition. This may be useful, for example, when a new object is added or an existing object is modified.

Processing begins at a first step 972 where a pointer, used to iterate through all of the policies, is set to point to the first one of the policies. Following the step 972 is a test step 973 where it is determined if the pointer has iterated through all of the policies being tested. If so, then processing is complete. Otherwise, control transfers from the test step 973 to a test step 974 where it is determined if the object (object metadata) under examination meets the criteria set forth in the object definition field for the policy instance of the particular policy pointed to by the pointer used to iterate through the policies. If so, then control transfers from the test step 974 to a step 976 where the metadata for the object is annotated for inclusion of the object in the object set that will be processed when the corresponding service is invoked. Note that, in some embodiments, it is also possible to cause the object (object metadata) to point to the policy instance at the step 976. It is also possible to register trigger events at the step 976 in a manner similar to that described above for the step 962. Following the step 976, processing is complete.

If it is determined at the test step 974 that the object (object metadata) under examination does not meet the criteria set forth in the object definition field for the policy instance of the particular policy pointed to by the pointer used to iterate through the policies, then control transfers from the test step 974 to a step 978 where the pointer that iterates through the policies is incremented. Following the step 978, control transfer back to the test step 973 for another iteration. Note that the processing illustrated by the flow chart 970 annotates the object being examined according to a single policy. In other embodiments, it may be possible to annotate an object according to multiple policies.

In an embodiment herein, an appropriate mechanism may be used to keep track of the objects (object metadata) corresponding to particular service(s). In such a case, a service may access objects of interest using the mechanism instead of needing to examine all of the object metadata to find appropriate annotation. For example, a background process could construct, for each service, an index or a linked list of objects that are operated upon by the service. For embodiments that do not include such a mechanism, then a service being invoked could examine all object metadata for specific annotation indicating inclusion for the service.

The annotated metadata may be used in a number of ways. One way that the annotated metadata may be used is by client or server software components when applications access data in the system. The software components may examine the object metadata in the process of handling the operation. For any synchronous operations specified by a policy, the client may directly invoke the corresponding services. On the other hand, for any asynchronous operations specified, the software components may post a message to a job service queue that causes the action to be performed when appropriate. Another way that the annotated metadata may be used is on time-based triggers. When an object is created, the policy may indicate that something should happen in the future. At create time, a timer may be set to perform that event. Upon firing, routine initiated by the timer may first check that its action should still be performed. Alternatively, a mechanism may be provided to cancel timers that become obsolete. Another way that policy annotations could be used is in responding to event triggers. When an object comes under management by some component, that component may register for any triggers specified by one or more policies associated with the object. If the event occurs, the component may locate all objects interested in the trigger and respond appropriately. Different mechanisms for using annotated data are discussed in more detail elsewhere herein.

Figure 49:
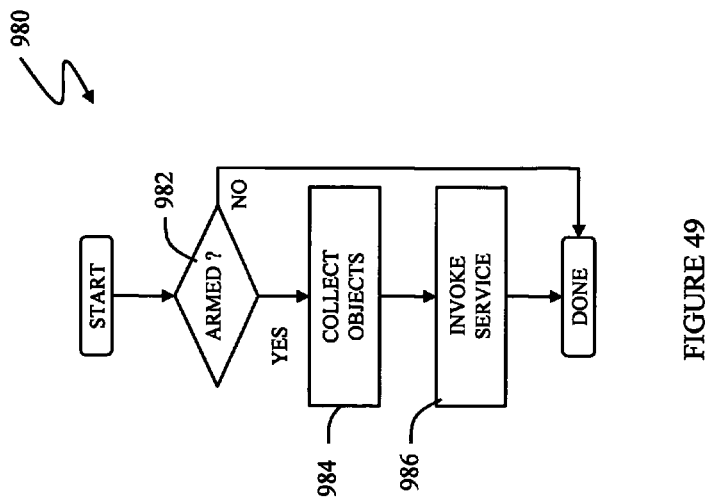
FIG. 49 is a flow chart illustrating processing performed in connection with invoking a service according to an embodiment of the system described herein.

Referring to FIG. 49, a flow chart 980 illustrates steps performed in connection with invoking a service. As discussed elsewhere herein, a service may be invoked for any of a number of reasons, including being invoked periodically (e.g., a data archiving service), because a policy is being reevaluated (e.g., redetermining which objects are affected by a particular service), when particular objects are added (e.g., file creation), synchronously or asynchronously by a client, a server, etc. In an embodiment herein, at least some services may be invoked periodically by the metadata servers 405. The period may be once per day, but the frequency may be increased in response to registering a policy instance corresponding to a service that requests more frequent periodic running. Particular mechanisms for invoking one or more of the services are discussed in more detail elsewhere herein.

Processing begins at a test step 982 where it is determined if the corresponding policy instance is armed. As discussed elsewhere herein, it is possible for a policy instance, and thus a corresponding service, to be armed (operational) or not armed (not being invoked). If it is determined at the test step 982 that the policy is armed, then control passes from the test step 982 to a step 984 where objects that are affected by the service are collected. As discussed elsewhere herein, the policy managers 402 may annotate objects for operation by the services and some or all of the objects may include pointers to the policies/services that operate on the objects.

The processing at the step 984 may simply locate metadata that has been annotated for operation by the service.

Alternatively, the processing at the step 984 may be like that illustrated by the flow chart 950, discussed above. Following the step 984 is a step 986 where the service is invoked. Invoking the service at the step 986 is discussed in more detail elsewhere herein. Following the step 986, processing is complete. Note that the steps 984, 986 are not performed if it is determined at the test step 982 that the corresponding policy is not armed.

Referring to FIG. 50, a flow chart 1050 illustrates in more detail the step 986 in which a service is invoked for one or more objects. Processing begins at a first step 1052 where a timer is set for the service based on the number of shares provided for the policy instance in the SLO field. As discussed elsewhere herein, it is possible to use the SLO field to specify both a relative ordering of services and a relative number of shares (amount of processing resources) used by each of the services. Thus, for example, a service that is allocated two shares may use half of the resources of a service allocated four shares. The value used for the timer at the step 1052 may be proportional to the number of shares allocated for the service so that, for example, the time may be set to a value N for a service that is allocated two shares and may be set to a value 2×N for a different service that is allocated four shares.

Following the step 1052 is a step 1058 where the service specified in the action field of the policy instance is initiated (invoked) for the object(s). The processing at the step 1058 causes the service to be invoked and to run concurrently with the processing illustrated by the flow chart 1050. Initiating the service at the step 1058 may use any one or more appropriate mechanisms, such as spawning a task that performs a direct function call, making an RPC call, etc. In some embodiments, objects (i.e., collected at the step 982, discussed above) may be passed to the function/RPC/etc. being called by, for example, passing one or more pointers to the objects corresponding to the service.

Following the step 1058 is a test step 1062 where it is determined if the timer (initially set at the step 1052, discussed above) has expired (timed out). As discussed elsewhere herein, the timer may be used to ration resources to each service based on the number of shares allocated to each service, as set forth in the SLO field. If it is determined at the step 1062 that the timer has expired, then control transfers from the test step 1062 to a step 1064 to disengage the service that was initiated at the step 1058. Any appropriate mechanism may be used at the step 1064 to disengage the service, including issuing an appropriate abort command. Following the step 1064, processing is complete.

If it is determined at the test step 1062 that the timer has not expired, then control transfers from the test step 1062 to a test step 1066 where it is determined if the service initiated at the step 1058 has completed for the objects. If so, then processing is complete. Otherwise, control transfers from the test step back to the test step 1062 for another iteration.

Referring to FIG. 51, a flow chart 1100 illustrates steps performed in connection with modifying a policy instance. Processing begins at a first step 1102 where the armed field of the policy instance is set to false, thus preventing the service(s) associated with the policy instance from being invoked while the policy instance is being modified. Following the step 1102 is a step 1106 where the modification is made to the policy instance. The modification could be anything, including modifying the action field to change the services that are performed in connection with the policy instance. In some embodiments, modification of a policy instance causes a reevaluation of the objects associated with the corresponding service (i.e., causes processing like that illustrated by the flow chart 950, discussed above, to be performed). Following the step 1106 is a step 1108 where the armed field of the policy instance is set to true so that the services associated with the policy instance will be performed when the services are invoked. Following the step 1108, processing is complete. Note that, as discussed elsewhere herein, in some embodiments modifying the policy may cause the policy to be reevaluated. Also, in some cases, it is possible to modify the policy without first disarming the policy, in which case the steps 1102, 1108 are not performed.

Note that other appropriate mechanisms, different from that illustrated by the flow chart 1050, may be used to operate services according to guidelines provided in the SLO, including providing relative service ordering and/or resource shares. In an embodiment herein, relative service ordering and/or share values are provided in the SLO field and passed to a system mechanism that handles running services. In other embodiments, there may be no mechanism for providing relative service ordering and/or for providing service resources according to share values, in which case the all or part of the value(s) in the SLO field are not used.

Figure 52:
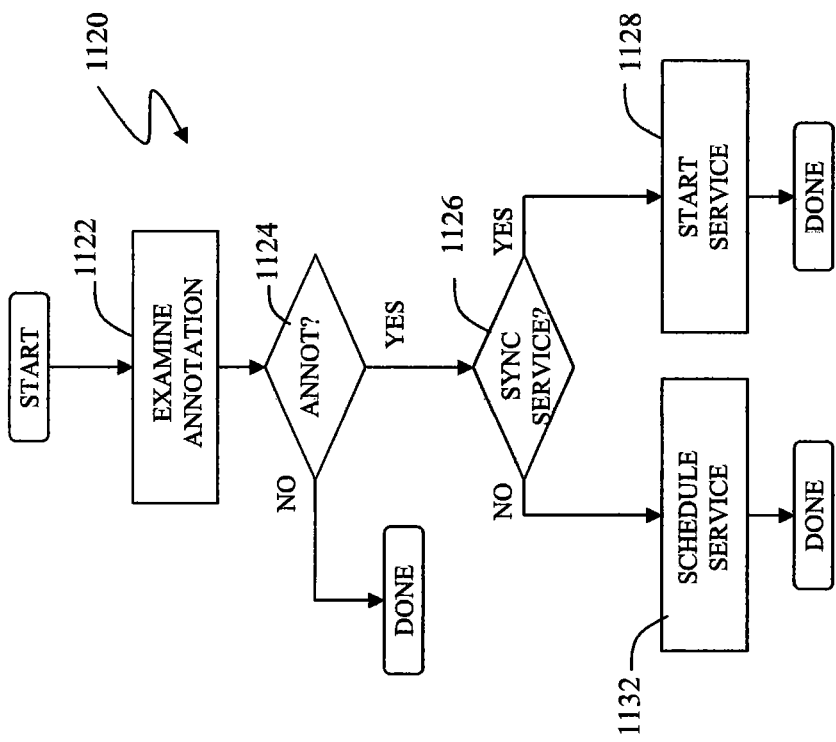
FIG. 52 is a flow chart illustrating steps performed in connection with a client using a metadata annotation mechanism according to an embodiment of the system described herein.

Referring to FIG. 52, a flow chart 1120 illustrates steps performed in connection with a client or server component using the metadata annotation mechanism described herein. Processing begins at a first step 1122 where the software component examines the metadata annotation of an object. Following the step 112 is a test step 1124 where it is determined if the metadata is annotated for handling by a service. If not, then processing is complete. Otherwise, control transfers from the test step 1124 to a test step 1126 where it is determined if the service for the object is a synchronous service. If so, then control transfers from the test step 1126 to a step 1128 where the software component causes the service to be invoked (e.g., using an RPC, sending an appropriate message to one of the servers 102, etc.). Following the step 1128, processing is complete. If it is determined at the test step 1126 that the service for the object is an asynchronous service, then control transfers from the test step 1126 to a step 1132 where the software component causes the service to be scheduled (e.g., using an appropriate mechanism to cause the service to be placed in a job queue). Following the step 1132, processing is complete.

Figure 53:
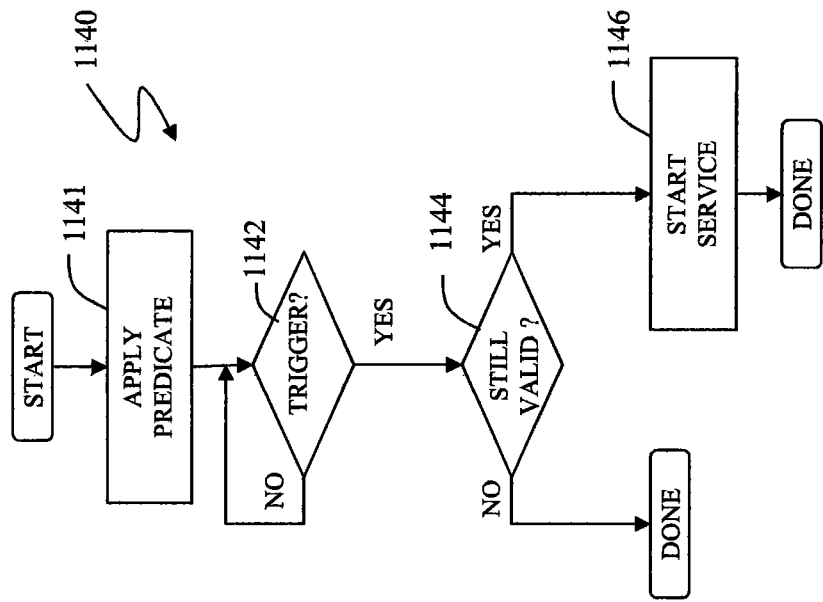
FIG. 53 is a flow chart illustrating steps performed in connection with a trigger causing a service to be invoked according to an embodiment of teh system described herein.

Referring to FIG. 53, a flow chart 1140 illustrates steps performed in connection with a trigger (time based or event trigger) causing a service to be invoked. Processing begins at a first step 1141 where a predicate is applied to select or reject objects for which corresponding services(s) are to be provided. Following the step 1141 is a test step 1142 where it is determined if a trigger event has occurred. The test step 1142 represents polling for a trigger event, but of course any other appropriate mechanism may be used to cause particular processing to be performed in response to a trigger event. If it is determined at the test step 1142 that a trigger event has occurred, then control transfers from the test step 1142 to a test step 1144 where it is determined if the service/object/trigger association is still valid. In an embodiment herein, intervening events may cause the associate to become invalid between the time the association is initially made but before the trigger occurs. If it is determined at the step 1144 that the event is no longer valid, then processing is complete. Otherwise, control transfers from the test step 1144 to a step 1146 where the service is invoked for the subset of objects selected at the step 1141 according to the predicate. Following the step 1146, processing is complete.

In an embodiment herein, services may be classified into one of two groups: core/system services and external services. The core services include services whose function is tightly coupled with that of the storage system. Such services may be responsible for data integrity, availability, and durability. Examples of such services are synchronous/asynchronous replication, erasure coding, retention, versioning, snapshots, asynchronous space reclamation, scheduled object deletion, background de-duplication, and data encryption. The core services may execute in performance-critical code paths and may be triggered based on certain well-defined set of events closely related to object lifecycles. The core services may be deployed, upgraded, and taken down as a part of the system lifecycle.

External services may be extensions of the storage system's functionality implemented as applications that use storage system interfaces, such as the user management interface 412. External services may also use storage service management framework interfaces to integrate with other storage services and be managed in a uniform fashion. Thus, for example, one or more external services may be deployed across a plurality of the groups of servers 112-114. External services may run in a storage system cluster, but not be tightly coupled with the storage system or the core services. The external services may be executed based on the trigger events that are asynchronously communicated to the external services by the policy management servers 402 of at least one of the groups 112-114. External services may be configured to be triggered by a wide range of event types. In addition, the functionality of external services may be limited only by the available storage system and policy management server interfaces.

In some embodiments, the core services may use efficient "back channels/interfaces" with more options for optimizations (because the interfaces between the service and the system are tightly coupled and can be changed without any impact on the external system interfaces). The non-core services, on the other end, may be limited to the well-defined (and hard to change) interfaces that the system exposes externally such as the user management interface 412.

Note that various optimizations may be provided. For example, at runtime, it may be possible to keep track of the following:

object-object set-event-action relationships

The relationships may be maintained in a table indexed by object set, by event type, and perhaps by action (service) if needed. The table indices may be used to dispatch actions based on object set memberships and the events. Additional work may be needed to rearrange the tables/indices when object memberships and/or policies change either because of changes in objects, or because of changes in policy definitions. It is useful to strike a balance between optimizing runtime application of policies vs. what happens when the policies change. In some cases, the former may be more important than the latter as it occurs much more frequently. However, specific system requirements may steer to various design points that strike a different kind of balance.

The system described herein may be used with any server, or any group of servers, capable of providing the functionality described herein. The particular form of the file objects may vary without departing from the spirit and scope of the invention. In some instances, the order of steps in the flow charts may be modified, where appropriate. The system described herein may be implemented using a computer program product/software provided in a computer-readable storage medium (e.g., a fixed computer-readable storage medium) and executed on one or more processors.

While the invention has been disclosed in connection with various embodiments, modifications thereon will be readily apparent to those skilled in the art. Accordingly, the spirit and scope of the invention is set forth in the following claims.

What is claimed is:

1. A method of providing a service in a storage system, comprising:

providing a policy definition that corresponds to a subset of storage objects in a set of storage objects stored in the storage system, wherein the policy definition includes a service level objective and is used to select or reject objects to which a service-related action corresponding to the service is to be provided, wherein the service level objective indicates a relative importance of the services and shares of system resources that services are allowed to consume;

applying the policy definition to the set of storage objects to obtain the subset of storage objects, wherein applying the policy definition includes annotating preexisting metadata for the subset of storage objects;

invoking the service for the subset of storage objects, wherein a trigger event causes invoking the service and wherein the subset of storage objects is determined based on annotation of the preexisting metadata; and posting a message to a job service queue that causes the service-related action to be performed for storage objects having annotated preexisting metadata indicating service-related asynchronous operations on the storage objects, wherein the service-related action corresponds to at least one of: services for data protection, availability and integrity, services for data immutability, and services that improve application performance and take on some aspects of application functionality.

2. A method, according to claim 1, wherein the trigger event is periodic.

3. A method, according to claim 2, wherein a routine periodically determines if the service is to be invoked.

4. A method, according to claim 1, wherein the trigger event is one of: a storage object lifecycle event, a storage object access related event, an event corresponding to a state change of the storage system, and an event that is external to the storage system.

5. A method, according to claim 1, wherein the trigger event includes an event that corresponds to the policy definition being modified.

6. Computer software, that provides a service in a storage system, the software being provided in a computer-readable storage medium and comprising:

executable code that provides a policy definition that corresponds to a subset of storage objects in a set of storage objects stored in the storage system, wherein the policy definition includes a service level objective and is used to select or reject objects to which a service-related action corresponding to the service is to be provided, wherein the service level objective indicates a relative importance of the services and shares of system resources that services are allowed to consume;

executable code that applies the policy definition to the set of storage objects to obtain the subset of storage objects, wherein applying the policy definition includes annotating preexisting metadata for the subset of storage objects;

executable code that invokes the service for the subset of storage objects, wherein a trigger event causes the executable code that invokes the service to be executed and wherein the subset of storage objects is determined based on annotation of the preexisting metadata; and executable code that posts a message to a job service queue that causes the service-related action to be performed for storage objects having annotated preexisting metadata indicating service-related asynchronous operations on the storage objects, wherein the service-related action corresponds to at least one of: services for data protection, availability and integrity, services for data immutability, and services that improve application performance and take on some aspects of application functionality.

7. Computer software, according to claim 6, wherein the trigger event is periodic.

8. Computer software, according to claim 7, further comprising:
executable code that periodically determines if the service is to be invoked.

9. Computer software, according to claim 6, wherein the trigger event is one of: a storage object lifecycle event, a storage object access related event, an event corresponding to a state change of the storage system, and an event that is external to the storage system.

10. Computer software, according to claim 6, wherein the trigger event includes an event that corresponds to the policy definition being modified.

11. A data storage system, comprising:
a plurality of clients that access storage objects; and
a plurality of interconnected servers, coupled to the clients, at least one of the servers providing a policy definition that corresponds to a subset of storage objects in a set of storage objects stored in the storage system, wherein the policy definition includes a service level objective and is used to select or reject objects to which a service-related action corresponding to the service is to be provided and wherein the service level objective indicates a relative importance of the services and shares of system resources that services are allowed to consume and wherein at least one of the clients and the servers applies the policy definition to the set of storage objects to obtain the subset of storage objects and invokes the service for the subset of storage objects and wherein a trigger event causes invoking the service and wherein the subset of storage objects is determined based on annotation of preexisting metadata and a message is posted to a job service queue that causes the service-related action to be performed for storage objects having annotated preexisting metadata indicating service-related asynchronous operations on the storage objects, wherein the service-related action corresponds to at least one of: services for data protection, availability and integrity, services for data immutability, and services that improve application performance and take on some aspects of application functionality.

12. A data storage system, according to claim 11, wherein the trigger event includes an event that corresponds to the policy definition being modified.

13. A method, according to claim 1, wherein the service is selected from the group consisting of: data immutability, RAID, versioning, snapshots, backup, asynchronous replication for disaster recovery, asynchronous space reclamation, object encryption, data-at-rest-encryption, data compression, and green/spindown services.

14. Computer software, according to claim 6, wherein the service is selected from the group consisting of: data immutability, RAID, versioning, snapshots, backup, asynchronous replication for disaster recovery, asynchronous space reclamation, object encryption, data-at-rest-encryption, data compression, and green/spindown services.

15. A data storage system, according to claim 11, wherein the service is selected from the group consisting of: data immutability, RAID, versioning, snapshots, backup, asynchronous replication for disaster recovery, asynchronous space reclamation, object encryption, data-at-rest-encryption, data compression, and green/spindown services.

\* \* \* \* \*